(12) United States Patent
Lu et al.

(10) Patent No.: US 11,847,314 B2
(45) Date of Patent: Dec. 19, 2023

(54) MACHINE TRANSLATION METHOD AND ELECTRONIC DEVICE

(71) Applicant: Huawei Technologies Co., Ltd., Shenzhen (CN)

(72) Inventors: Wenjun Lu, Shanghai (CN); Zunwei Ke, Shanghai (CN); Yujie Wu, Shanghai (CN); Yong Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/762,169

(22) PCT Filed: Sep. 18, 2020

(86) PCT No.: PCT/CN2020/116128
§ 371 (c)(1),
(2) Date: Mar. 21, 2022

(87) PCT Pub. No.: WO2021/052458
PCT Pub. Date: Mar. 25, 2021

(65) Prior Publication Data
US 2022/0382448 A1    Dec. 1, 2022

(30) Foreign Application Priority Data
Sep. 20, 2019    (CN) .................. 201910895234.X

(51) Int. Cl.
*G06F 3/04883*  (2022.01)
*G06F 9/451*  (2018.01)
(Continued)

(52) U.S. Cl.
CPC ........ *G06F 3/04883* (2013.01); *G06F 3/0484* (2013.01); *G06F 9/454* (2018.02); *G06F 40/42* (2020.01); *G06F 2203/04808* (2013.01)

(58) Field of Classification Search
CPC .. G06V 30/153; G06V 30/10; G06F 3/04883; G06F 3/0484; G06F 2203/04808;
(Continued)

(56) References Cited

U.S. PATENT DOCUMENTS

2010/0138209 A1    6/2010   Harrenstien et al.
2011/0216095 A1    9/2011   Rydenhag
(Continued)

FOREIGN PATENT DOCUMENTS

CN    102265271 A    11/2011
CN    103294665 A    9/2013
(Continued)

OTHER PUBLICATIONS

TechSmith Snagit™ Snagit Help. Version 2018.1, Feb. 2018. 85 pages. (Year: 2018).*
(Continued)

*Primary Examiner* — Tadesse Hailu
(74) *Attorney, Agent, or Firm* — Conley Rose, P.C.

(57) ABSTRACT

A machine translation method includes: an electronic device displays a first user interface, where source text content is displayed in the first user interface; after detecting an operation of triggering scrolling screenshot taking by a user, the electronic device automatically starts to take a scrolling screenshot; the electronic device obtains a first picture through scrolling screenshot taking; the electronic device obtains translation content corresponding to the source text content displayed on the first picture; and the electronic device automatically displays a second user interface, where a part or all of the translation content is displayed in the second user interface.

20 Claims, 62 Drawing Sheets

(51) Int. Cl.
*G06F 40/42* (2020.01)
*G06F 3/0484* (2022.01)

(58) Field of Classification Search
CPC .... G06F 3/0481; G06F 3/0482; G06F 3/0485; G06F 3/0483; G06F 3/04845; G06F 3/0488; G06F 40/42; G06F 40/58; G06F 9/454

See application file for complete search history.

(56) References Cited

U.S. PATENT DOCUMENTS

| | | | | |
|---|---|---|---|---|
| 2013/0246039 | A1* | 9/2013 | Duneau | G06T 11/60 345/619 |
| 2016/0352674 | A1 | 12/2016 | Strom | |
| 2017/0277625 | A1 | 9/2017 | Shtuchkin et al. | |
| 2018/0060309 | A1* | 3/2018 | He | G06F 40/263 |
| 2020/0026766 | A1* | 1/2020 | Ji | G06V 30/153 |

FOREIGN PATENT DOCUMENTS

| | | | | |
|---|---|---|---|---|
| CN | 104636326 | A | | 5/2015 |
| CN | 105094628 | A | * | 11/2015 |
| CN | 105094628 | A | | 11/2015 |
| CN | 105487766 | A | | 4/2016 |
| CN | 106776582 | A | | 5/2017 |
| CN | 107832311 | A | | 3/2018 |
| CN | 108829686 | A | | 11/2018 |
| CN | 108959274 | A | | 12/2018 |
| CN | 109271081 | A | | 1/2019 |
| CN | 110209456 | A | | 9/2019 |
| CN | 110209456 | A | * | 9/2019 ......... G06F 3/04845 |
| CN | 110442879 | A | * | 11/2019 ........... G06F 3/0481 |
| CN | 110781688 | A | | 2/2020 |
| EP | 0762298 | A2 | | 3/1997 |
| EP | 3944129 | A1 | | 1/2022 |
| JP | H0981566 | A | | 3/1997 |
| WO | 2004092338 | A2 | | 10/2004 |
| WO | 2018072413 | A1 | | 4/2018 |

OTHER PUBLICATIONS

Screenpresso. Feature Tour. Web article posted at [/https://www.screenpresso.com/features/] available to public on Feb. 1, 2019. Retrieved via Internet Archive on [Jan. 20, 2023]. 7 pages. (Year: 2019).*

Douwenya, "Press the screen with two fingers and translate in full screen. Can you scroll to translate?," Feb. 13, 2019, XP055749706, 3 pages.

ITU-T H.264, Jun. 2019, "Series H: Audiovisual and Multimedia Systems, Infrastructure of audiovisual services—Coding of moving video, Advanced video coding for generic audiovisual services," 836 pages.

Use Youdao dictionary screenshots to translate large foreign language texts, 2019, with the English Translation, 5 pages.

Gesture and operation, Huawei nova lite 2 operation manual, Sep. 19, 2019, 9 pages.

* cited by examiner

MACHINE TRANSLATION METHOD AND ELECTRONIC DEVICE

CROSS-REFERENCE TO RELATED APPLICATIONS

This is a national stage of International Patent Application No. PCT/CN2020/116128 filed Sep. 18, 2020, which claims priority to Chinese Patent Application No. 201910895234.X filed Sep. 20, 2019, both of which are hereby incorporated by reference in their entireties.

This application claims priority to Chinese Patent Application No. 201910895234.X, filed with the China National Intellectual Property Administration on Sep. 20, 2019 and entitled "MACHINE TRANSLATION METHOD AND ELECTRONIC DEVICE", which is incorporated herein by reference in its entirety.

TECHNICAL FIELD

This application relates to the field of artificial intelligence, and more specifically, to a machine translation method and an electronic device.

BACKGROUND

Currently, text translation is widely applied to a plurality of types of electronic devices such as a mobile phone, a tablet computer, and a personal computer (personal computer, PC), to provide convenient translation services for users.

Text translation includes a single picture-based translation manner. When a user expects to translate current interface content when photographing a page of a foreign book or viewing a foreign news application (application, APP), the user needs to take a screenshot of the current interface content, and then enter a picture obtained after screenshot taking to a translation APP to obtain a translation result. If a user is viewing a relatively long news post, the user needs to constantly take a screenshot in the news APP, and then switch to the translation APP to enter a corresponding picture to obtain a translation result. The user can complete reading the foreign news post through such repeated actions. In this manner, operations of the user are cumbersome, user experience is relatively poor, and efficiency is relatively low.

SUMMARY

This application provides a machine translation method and an electronic device, and relates to fields of artificial intelligence, natural language processing, and machine translation, to improve intelligence of the electronic device and user experience.

According to a first aspect, a machine translation method is provided. The method is applied to an electronic device with a touchscreen, and the method includes: The electronic device displays a first user interface on the touchscreen. The first user interface includes first content, and a language of the first content is a first language. The electronic device detects a first operation in the first user interface. The first operation includes a user operation of triggering scrolling translation by a user. In response to the first operation, the electronic device takes a scrolling screenshot starting from a first location of the first user interface. In the scrolling screenshot process, when a second operation of the user is detected in the second user interface, or when an end location is reached through scrolling in the second user interface, the electronic device stops taking the scrolling screenshot at a second location of the second user interface to obtain a first picture. The first picture is a picture corresponding to second content, the second content includes content from the first location to the second location, and a language of the second content is the first language. The electronic device automatically obtains a translation result of the second content based on the first picture. A language of the translation result of the second content is a second language. The electronic device automatically displays a third user interface after automatically obtaining a part or all of the translation result of the second content. The third user interface includes a part or all of the translation result of the second content.

In this embodiment of this application, when expecting to view translation content corresponding to source text content on the electronic device, the user may perform a user operation of triggering scrolling translation, so that the electronic device first takes a scrolling screenshot, and then obtains the translation content corresponding to the source text content obtained through scrolling screenshot taking. In this way, cumbersome operations of viewing a translation by the user can be avoided, and multi-screen translation content can be obtained through one time of scrolling translation, to make it easier for the user to browse the translation content, thereby improving intelligence of the electronic device and also improving user experience of viewing the translation by the user.

With reference to the first aspect, in some implementations of the first aspect, the method further includes: The electronic device detects a third operation in a fourth user interface. The fourth user interface includes an end part of the translation result of the second content, and the third operation includes a user operation of triggering scrolling translation by the user. In response to the third operation, the electronic device automatically displays a fifth user interface and takes a scrolling screenshot starting from a third location of the fifth user interface. The fifth user interface includes third content, the third location is associated with the first picture, and a language of the third content is the first language. In the scrolling screenshot process, when a fourth operation of the user is detected in a sixth user interface, or when an end location is reached through scrolling, the electronic device stops taking the scrolling screenshot at a fourth location of the sixth user interface to obtain a second picture. The second picture is a picture corresponding to fourth content, the fourth content includes content from the third location to the fourth location, and a language of the fourth content is the first language. The electronic device automatically obtains a translation result of the fourth content based on the second picture. A language of the translation result of the fourth content is the second language. The electronic device automatically displays a seventh user interface after automatically obtaining a part or all of the translation result of the fourth content. The seventh user interface includes a part or all of the translation result of the fourth content.

In this embodiment of this application, when the user further expects to view more translation content after performing the first scrolling translation, the user may trigger scrolling translation again. In this way, cumbersome operations of viewing a translation by the user can be avoided, and multi-screen translation content can be obtained through one time of scrolling translation, to make it easier for the user to browse the translation content, thereby improving intelligence of the electronic device and also improving user experience of viewing the translation by the user.

With reference to the first aspect, in some implementations of the first aspect, the method further includes: The electronic device detects a fifth operation in an eighth user interface. The eighth user interface includes an end part of the translation result of the second content, and the fifth operation includes a user operation of triggering further translation by the user. The electronic device automatically obtains a translation result of fifth content in response to the fifth operation. The fifth content includes a part or all of content other than the second content in all content corresponding to the first language, and a language of the translation result of the fifth content is the second language. The electronic device automatically displays a ninth user interface after automatically obtaining a part or all of the translation result of the fifth content, or displays the ninth user interface after receiving a sliding operation of the user. The ninth user interface includes a part or all of the translation result of the fifth content.

In this embodiment of this application, if the user further expects to view more translation content after performing the first scrolling translation, the user may trigger further translation, and the electronic device may jump to a source-text interface to automatically obtain more source text content for translation to obtain more translation content. Alternatively, the electronic device does not need to jump to a source-text interface, but automatically loads more translation content in the background, to display more translation content to the user, thereby making it easier for the user to browse the translation content.

With reference to the first aspect, in some implementations of the first aspect, the method further includes: in response to the fifth operation, automatically taking a screenshot to obtain a third picture. The third picture is a picture corresponding to the fifth content.

In some possible implementations, the automatic screenshot taking may be screenshot taking, or may be scrolling screenshot taking.

With reference to the first aspect, in some implementations of the first aspect, the automatically obtaining a translation result of fifth content includes: The electronic device sends the third picture or a picture corresponding to a part of the third picture to a server. The electronic device receives a translation result that is of the third picture or the picture corresponding to the part of the third picture and that is returned by the server.

In this embodiment of this application, after obtaining the third picture, the electronic device sends the third picture or a picture corresponding to a part of the third picture to the server, so that the server translates source text content displayed on the third picture or the picture corresponding to the part of the third picture to obtain a translation result. The server may send the translation result to the electronic device, so that the electronic device displays the translation result to the user. The third picture or the picture corresponding to the part of the third picture may include a multi-screen picture. Compared with the conventional technology in which only a one-screen picture can be sent at a time, this can improve translation efficiency, so that user experience of browsing a translation by the user can be improved.

With reference to the first aspect, in some implementations of the first aspect, the automatically taking a screenshot to obtain a third picture includes: automatically capturing content of one or more screens to obtain the third picture. The automatic screenshot process is visible or invisible to the user.

In some possible implementations, the electronic device may capture one-screen content through screenshot taking.

In some possible implementations, the electronic device may alternatively capture multi-screen content through scrolling screenshot taking.

In this embodiment of this application, the automatic screenshot process may be invisible to the user. If the user expects to continue to view more translations after obtaining a translation through the first full-screen translation or scrolling translation, the user may directly trigger further translation to obtain more translations. The user directly views more translations on the basis of a previous translation without requiring the electronic device to jump to a source text to display a screenshot or scrolling screenshot process, so that user experience of browsing a translation by the user can be further improved.

With reference to the first aspect, in some implementations of the first aspect, before the automatically obtaining a translation result of the second content, the method further includes: The electronic device automatically segments the first picture into a plurality of pictures. The third location is related to a specific location in the last picture in the plurality of pictures, and the specific location is a start location, an end location, an intermediate location, or a predetermined-proportion location of the last picture; or a start location of the last paragraph or a start location of the last n lines in the last picture, where n is a positive integer, and n is greater than or equal to 1.

In this embodiment of this application, the electronic device enables long screenshot taking in an interface that currently displays the first language (which may also be referred to as the source text), and automatically scrolls down a screen, and the electronic device stops taking a long screenshot when detecting that the user can tap the screen. Then text data translated into the second language (which may also be referred to as a translation) is displayed in a new interface, and the user may view the text data through upward/downward sliding. Then the user may directly choose, in a translation interface, to continue to view subsequent content (a "Scrolling translation" button is provided in the interface for the user to tap). After the user taps the "Scrolling translation" button again, the electronic device jumps to the source-text interface, and jumps to a vicinity of a location at which previous long screenshot taking is stopped (the electronic device has memorized the location). The electronic device may enable scrolling screenshot taking and translation again starting from the vicinity of the location at which the previous long screenshot taking is stopped (or several lines before the location, where by retaining some redundant content, the user can recall where previous reading is stopped). The method is not limited to translation of a web-based browser client, but may be further used in a non-browser scenario such as a third-party information APP, so that applicable scenarios are greatly expanded, and continuity of reading experience of the user is further ensured.

With reference to the first aspect, in some implementations of the first aspect, the automatically obtaining a translation result of the second content includes: The electronic device sends the plurality of pictures to the server. The electronic device receives a translation result of the server for each of the plurality of pictures. The electronic device generates a part of the translation result of the second content from translation results of some of the plurality of pictures, or generates the translation result of the second content from translation results of all of the plurality of pictures.

In this embodiment of this application, after obtaining the first picture, the electronic device may segment the first picture into a plurality of pictures, and send the plurality of pictures to the server for translation. The server may send translation results of the plurality of pictures to the electronic device, so that the electronic device displays the translation results to the user. The first picture may include a plurality of pictures. Compared with the conventional technology in which only a one-screen picture can be sent at a time, this can improve translation efficiency, thereby improving user experience of browsing a translation by the user.

With reference to the first aspect, in some implementations of the first aspect, that the third location is associated with the first picture includes: The third location is related to a specific location in the first picture. The specific location is an end location, an intermediate location, or a predetermined-proportion location of the first picture; or a start location of the last paragraph or a start location of the last n lines in the first picture, where n is a positive integer, and n is greater than or equal to 1.

In this embodiment of this application, the electronic device may segment the first picture, or may not segment the first picture. A start location of the second scrolling screenshot taking may be related to the first picture.

With reference to the first aspect, in some implementations of the first aspect, that the third location is associated with the first picture includes: The third location is related to the second content. The third location is related to an end location, an intermediate location, or a predetermined-proportion location of the second content; or the third location is related to a start location of the last paragraph or a start location of the last n lines in the second content, where n is a positive integer, and n is greater than or equal to 1.

In this embodiment of this application, the electronic device may segment the first picture, or may not segment the first picture. A start location of the second scrolling screenshot taking may be related to the second content displayed on the first picture.

With reference to the first aspect, in some implementations of the first aspect, the automatically obtaining a translation result of the second content includes: sending the first picture or a picture corresponding to a part of the first picture to the server; and receiving a translation result that is of the first picture or the picture corresponding to the part of the first picture and that is returned by the server.

With reference to the first aspect, in some implementations of the first aspect, the translation result of the second content includes content obtained after text content obtained by performing optical character recognition (OCR) text recognition on the first picture is translated from the first language to the second language.

In this embodiment of this application, the electronic device may determine, through OCR, whether a word or a picture is truncated. If the mobile phone determines that a word or a picture is truncated at a segmentation location, the mobile phone may move the segmentation location up to a blank line location. The electronic device sends text content obtained through OCR to the server, and the server may translate the corresponding text content.

With reference to the first aspect, in some implementations of the first aspect, the automatically obtaining a translation result of the second content includes: The electronic device sends the first picture or a picture corresponding to a part of the first picture to the server. The electronic device receives a translation result that is of the first picture or the picture corresponding to the part of the first picture and that is returned by the server.

With reference to the first aspect, in some implementations of the first aspect, the translation result of the second content includes content obtained after text content obtained by performing optical character recognition (OCR) text recognition on the first picture is translated from the first language to the second language.

In this embodiment of this application, the electronic device may determine, through OCR, whether a word or a picture is truncated. If the mobile phone determines that a word or a picture is truncated at a segmentation location, the mobile phone may move the segmentation location up to a blank line location.

It should be understood that in this embodiment of this application, OCR text recognition may be performed by the electronic device, and text translation may be performed by the server; or OCR text recognition and text translation may be completed by the server; or OCR text recognition and text translation may be completed by a same server or completed by different servers together.

With reference to the first aspect, in some implementations of the first aspect, the method further includes: displaying first prompt information at the third location or near the third location, where the first prompt information is used to indicate a start location of scrolling screenshot taking to the user; and/or displaying second prompt information at the second location or near the second location, where the second prompt information is used to indicate, to the user, that previous reading is stopped at the second location.

By displaying the first prompt information and/or the second prompt information, before reading a translation of the second scrolling screenshot taking, the user may be familiar with source text content in the second scrolling screenshot taking again. This has functions of evoking a memory and assisting in continuous reading for the user.

With reference to the first aspect, in some implementations of the first aspect, the first operation includes tapping, by the user, a first control that can trigger a scrolling translation function or entering, by the user, a voice instruction that can trigger a scrolling translation function.

With reference to the first aspect, in some implementations of the first aspect, the third operation includes tapping, by the user, a first control that can trigger a scrolling translation function or entering, by the user, a voice instruction that can trigger a scrolling translation function.

With reference to the first aspect, in some implementations of the first aspect, the method further includes: displaying a tenth user interface after a sliding operation of the user is received in the third user interface, where the tenth user interface includes a subsequent translation result associated with the translation result included in the third user interface.

With reference to the first aspect, in some implementations of the first aspect, before the detecting a third operation, the method further includes: displaying, in the fourth user interface, a control that can trigger scrolling translation.

With reference to the first aspect, in some implementations of the first aspect, before the detecting a fifth operation, the method further includes: displaying, in the eighth user interface, a control that can trigger further translation.

With reference to the first aspect, in some implementations of the first aspect, the detecting a first operation in the first user interface includes: displaying a plurality of function controls after a multi-finger pressing operation of the user is detected in the first user interface, where the plurality of function controls include a first control that can trigger scrolling translation; and detecting that the user taps the first control or the user enters a voice instruction that can trigger a scrolling translation function.

With reference to the first aspect, in some implementations of the first aspect, the second content includes the first content and a part or all of content other than the first content in all content corresponding to the first language.

With reference to the first aspect, in some implementations of the first aspect, the third content includes a part of content other than the second content in all the content corresponding to the first language, and the fourth content includes a part or all of the content other than the second content in all the content corresponding to the first language.

With reference to the first aspect, in some implementations of the first aspect, the method further includes: displaying an eleventh user interface after a sliding operation of the user is received in the ninth user interface, where the eleventh user interface includes a subsequent translation result associated with the translation result included in the ninth user interface.

According to a second aspect, a machine translation method is provided. The method is applied to an electronic device with a touchscreen, and the method includes: The electronic device displays a first user interface on the touchscreen. The first user interface includes first content, and a language of the first content is a first language. The electronic device detects a first operation of a user in the first user interface. The first operation includes a user operation of triggering full-screen translation by the user. In response to the first operation, the electronic device obtains a first picture obtained by taking a screenshot of the first user interface. The electronic device automatically obtains a translation result of the first content based on the first picture. A language of the translation result of the first content is a second language. The electronic device automatically displays a second user interface after automatically obtaining the translation result of the first content. The second user interface includes a part or all of the translation result of the first content. The electronic device detects a second operation of the user in the second user interface. The second operation includes a user operation of triggering scrolling translation by the user. In response to the second operation, the electronic device automatically displays a third user interface and takes a scrolling screenshot starting from a first location of the third user interface. The third user interface includes second content, the first location is associated with the first picture, and a language of the second content is the first language. In the scrolling screenshot process, when a third operation of the user is detected in a fourth user interface, or an end location is reached through scrolling in the fourth user interface, the electronic device stops taking the scrolling screenshot at a second location of the fourth interface to obtain a second picture. The second picture is a picture corresponding to third content, the third content includes content from the first location to the second location, and a language of the third content is the first language. The electronic device automatically obtains a translation result of the third content based on the second picture. A language of the translation result of the third content is the second language. The electronic device automatically displays a fifth user interface after automatically obtaining a part or all of the translation result of the third content. The fifth user interface includes a part or all of the translation result of the third content.

This embodiment of this application provides a process of first performing full-screen translation and then performing scrolling translation. To be specific, the user may first perform full-screen translation, a "Scrolling translation" control may be displayed in a translation interface of full-screen translation, and then the user may perform scrolling translation. In this way, after performing full-screen translation, the user may first determine whether the user is interested in source text content. If the user is interested in the source text content, the user may subsequently perform scrolling translation to view more translation content. If the user is not interested in the source text content, the user may stop reading a current source text, and then search for a source text in which the user is interested.

In some possible implementations, the second content and the first content may be the same; or the second content includes a part of the first content.

With reference to the second aspect, in some implementations of the second aspect, before the automatically obtaining a translation result of the third content, the method further includes: The electronic device automatically segments the second picture into a plurality of pictures. The electronic device sends the plurality of pictures to a server. The electronic device receives a translation result of the server for each of the plurality of pictures. The electronic device generates a part of the translation result of the third content from translation results of some of the plurality of pictures, or generates the translation result of the third content from translation results of all of the plurality of pictures.

With reference to the second aspect, in some implementations of the second aspect, the translation result of the third content includes content obtained after text content obtained by performing OCR text recognition on the second picture is translated from the first language to the second language.

In this embodiment of this application, the electronic device may determine, through OCR, whether a word or a picture is truncated. If the mobile phone determines that a word or a picture is truncated at a segmentation location, the mobile phone may move the segmentation location up to a blank line location. The electronic device sends text content obtained through OCR to the server, and the server may translate the corresponding text content.

With reference to the second aspect, in some implementations of the second aspect, the method further includes: The electronic device displays first prompt information at the first location or near the first location, where the first prompt information is used to indicate a start location of scrolling screenshot taking to the user; and/or the electronic device displays second prompt information at an end location of the first picture, where the second prompt information is used to indicate, to the user, that previous reading is stopped at the end location.

In this embodiment of this application, by displaying the first prompt information and/or the second prompt information, before reading a translation of the second scrolling screenshot taking, the user may be familiar with source text content in the second scrolling screenshot taking again. This has functions of evoking a memory and assisting in continuous reading for the user.

With reference to the second aspect, in some implementations of the second aspect, the second operation includes tapping, by the user, a first control that can trigger a scrolling translation function or entering, by the user, a voice instruction that can trigger a scrolling translation function.

With reference to the second aspect, in some implementations of the second aspect, that the first location is associated with the first picture includes: The first location is related to a specific location in the first picture. The specific location is an end location, an intermediate location, or a predetermined-proportion location of the first picture; or a start location of the last paragraph or a start location of the last n lines in the first picture, where n is a positive integer, and n is greater than or equal to 1.

With reference to the second aspect, in some implementations of the second aspect, that the first location is associated with the first picture includes: The first location is related to an end location, an intermediate location, or a predetermined-proportion location of the first content; or the first location is related to a start location of the last paragraph or a start location of the last n lines in the first content, where n is a positive integer, and n is greater than or equal to 1.

In this embodiment of this application, the electronic device may enable scrolling screenshot taking and translation starting from a location on the first picture obtained through previous screenshot taking (or several lines before the location, where by retaining some redundant content, the user can recall where previous reading is stopped). The method is not limited to translation of a web-based browser client, but may be further used in a non-browser scenario such as a third-party information APP, so that applicable scenarios are greatly expanded, and continuity of reading experience of the user is further ensured.

With reference to the second aspect, in some implementations of the second aspect, the method further includes: The electronic device displays a sixth user interface after receiving a sliding operation of the user in the fifth user interface, where the sixth user interface includes a subsequent translation result associated with the translation result included in the fifth user interface.

With reference to the second aspect, in some implementations of the second aspect, before the detecting a second operation of the user in the second user interface, the method further includes: The electronic device displays, in the second user interface, a control that can trigger scrolling translation.

With reference to the second aspect, in some implementations of the second aspect, the detecting a first operation of a user in the first user interface includes: The electronic device displays a plurality of function controls after detecting a multi-finger pressing operation of the user in the first user interface. The plurality of function controls include a first control that can trigger full-screen translation. The electronic device detects that the user taps the first control or the user enters a voice instruction that can trigger a full-screen translation function.

With reference to the second aspect, in some implementations of the second aspect, the automatically obtaining a translation result of the second content includes: The electronic device sends the second picture or a picture corresponding to a part of the second picture to the server. The electronic device receives a translation result that is of the second picture or the picture corresponding to the part of the second picture and that is returned by the server.

According to a third aspect, a machine translation method is provided. The method is applied to an electronic device with a touchscreen, and the method includes: The electronic device displays a first user interface on the touchscreen. The first user interface includes first content, and a language of the first content is a first language. The electronic device detects a first operation of a user in the first user interface. The first operation includes a user operation of triggering full-screen translation by the user. In response to the first operation, the electronic device takes a screenshot of the first user interface to obtain a first picture. The electronic device automatically obtains a translation result of the first content based on the first picture. A language of the translation result of the first content is a second language. The electronic device automatically displays a second user interface after automatically obtaining the translation result of the first content. The second user interface includes a part or all of the translation result of the first content. The electronic device detects a second operation of the user in the second user interface, where the second operation includes a user operation of triggering further translation by the user; and automatically obtains a translation result of second content in response to the second operation, where the second content includes a part or all of content other than the first content in all content corresponding to the first language, and a language of the translation result of the second content is the second language. The electronic device automatically displays a third user interface after automatically obtaining a part or all of the translation result of the second content, or displays the third user interface after receiving a sliding operation of the user. The third user interface includes a part or all of the translation result of the second content.

In this embodiment of this application, after the electronic device performs full-screen translation once, the electronic device may provide a "Continue to translate" control for the user. After detecting that the user taps the "Continue to translate" control, the electronic device may directly load, in the background, all or a part of a translation corresponding to a remaining part of source text. In this way, the electronic device does not need to jump to a source-text interface for scrolling screenshot taking, so that user experience of reading a translation by the user can be further improved.

With reference to the third aspect, in some implementations of the third aspect, the method further includes: in response to the second operation, automatically taking a screenshot to obtain a second picture. The second picture is a picture corresponding to the second content. The automatically obtaining a translation result of the second content includes: automatically obtaining the translation result of the second content based on the second picture.

With reference to the third aspect, in some implementations of the third aspect, the automatically obtaining a translation result of the second content includes: The electronic device sends the second picture or a picture corresponding to a part of the second picture to a server. The electronic device receives a translation result that is of the second picture or the picture corresponding to the part of the second picture and that is returned by the server.

With reference to the third aspect, in some implementations of the third aspect, the automatically taking a screenshot to obtain a second picture includes: The electronic device automatically captures content of one or more screens to obtain the second picture. The automatic screenshot process is visible or invisible to the user.

In this embodiment of this application, after the user triggers a scrolling screenshot operation, the electronic device may not jump to a source-text interface for screenshot taking, but may automatically load, in the background, a part or all of a translation corresponding to a remaining part of source text, thereby avoiding impact on the user that is caused by switching between a source text and a translation.

With reference to the third aspect, in some implementations of the third aspect, the automatically obtaining a translation result of the second content includes: The electronic device automatically segments the second picture into a plurality of pictures. The electronic device sends the plurality of pictures to the server. The electronic device receives a translation result of the server for each of the plurality of pictures. The electronic device generates a part of the translation result of the second content from translation results of some of the plurality of pictures, or generates the translation result of the second content from translation results of all of the plurality of pictures.

With reference to the third aspect, in some implementations of the third aspect, the second operation includes tapping, by the user, a first control that can trigger a further translation function or entering, by the user, a voice instruction that can trigger a further translation function.

With reference to the third aspect, in some implementations of the third aspect, the method further includes: The electronic device displays a fourth user interface after receiving a sliding operation of the user in the third user interface, where the fourth user interface includes a subsequent translation result associated with the translation result included in the third user interface.

With reference to the third aspect, in some implementations of the third aspect, before the detecting a first operation of a user in the first user interface, the method further includes: The electronic device displays, in the first user interface, a control that can trigger full-screen translation.

With reference to the third aspect, in some implementations of the third aspect, before the detecting a second operation of the user in the second user interface, the method further includes: displaying, in the second user interface, a control that can trigger further translation.

With reference to the third aspect, in some implementations of the third aspect, the detecting a first operation of a user in the first user interface includes: displaying a plurality of function controls after a multi-finger pressing operation of the user is detected in the first user interface, where the plurality of function controls include a first control that can trigger full-screen translation; and detecting that the user taps the first control or the user enters a voice instruction that can trigger a full-screen translation function.

According to a fourth aspect, an apparatus is provided. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function.

According to a fifth aspect, an electronic device is provided, including a touchscreen, one or more processors, a memory, and one or more computer programs. The one or more computer programs are stored in the memory, and the one or more computer programs include instructions. When the instructions are executed by the electronic device, the electronic device performs the machine translation method in any possible implementation of the first aspect, the second aspect, or the third aspect.

According to a sixth aspect, the technical solutions provide a computer storage medium, including computer instructions. When the computer instructions are run on an electronic device, the electronic device performs the machine translation method in any possible implementation of any one of the foregoing aspects.

According to a seventh aspect, the technical solutions provide a computer program product. When the computer program product runs on an electronic device, the electronic device performs the machine translation method in any possible design of any one of the foregoing aspects.

According to an eighth aspect, this technical solution provides a chip system. The chip system includes at least one processor, and when program instructions are executed by the at least one processor, a function of any one of the foregoing possible methods of the first aspect on an electronic device is implemented.

DESCRIPTION OF EMBODIMENTS

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include plural forms such as "one or more", unless otherwise specified in the context clearly. It should be further understood that, in the following embodiments of this application, "at least one" or "one or more" means one, two, or more. The term "and/or" is used to describe an association relationship between associated objects, and represents that three relationships may exist. For example, A and/or B may represent the following cases: Only A exists, both A and B exist, and only B exists. A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized in other ways. The terms "include", "comprise", "have", and variants of the terms all mean "include but are not limited to", unless otherwise specifically emphasized in other ways.

The following describes an electronic device, a user interface used for the electronic device, and embodiments used for using the electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smart watch). An example embodiment of the portable electronic device includes but is not limited to a portable electronic device using iOS®, Android®, Microsoft®, or another operating system. The portable electronic device may alternatively be another portable electronic device, such as a laptop computer (Laptop). It should be further understood that, in some other embodiments, the foregoing electronic device may not be the portable electronic device but a desktop computer.

Figure 1:
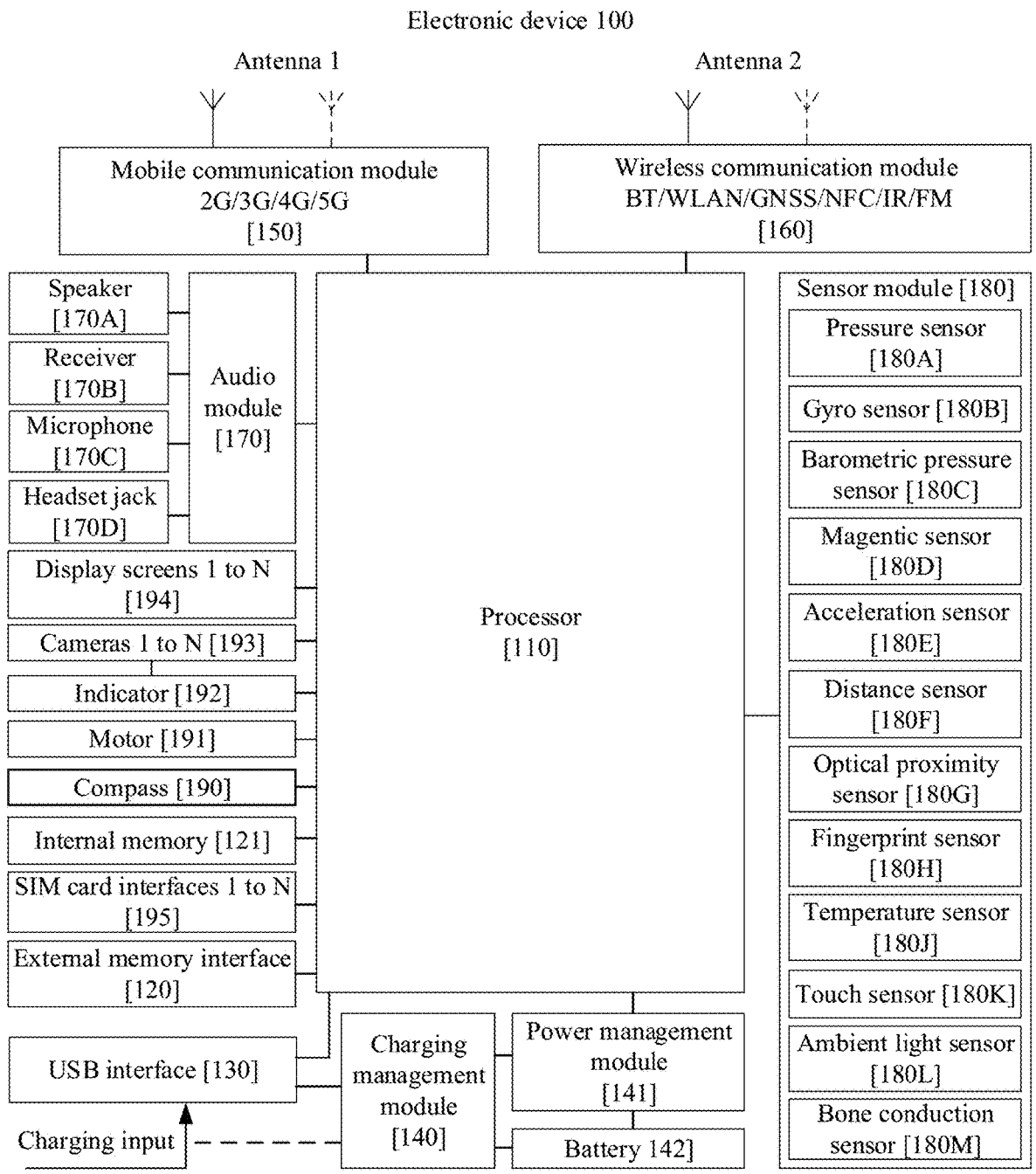
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a compass 190, a motor 191, an indicator 192, a camera 193, a display screen 194, a subscriber identification module (subscriber identification module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. In some embodiments, the electronic device 101 may alternatively include one or more processors 110. The controller may generate an operation control signal based on instruction operation code and a time sequence signal, to complete control of instruction reading and instruction execution. In some other embodiments, a memory may be further disposed in the processor 110, to store instructions and data. For example, the memory in the processor 110 may be a cache memory. The memory may store instructions or data just used or cyclically used by the processor 110. If the processor 110 needs to use the instructions or the data again, the processor 110 may directly invoke the instructions or the data from the memory. In this way, repeated access is avoided, a waiting time of the processor 110 is reduced, and efficiency of processing data or executing instructions by the electronic device 101 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, the SIM card interface, the USB interface, and/or the like. The USB interface 130 is an interface that conforms to a USB standard specification, and may be specifically a mini USB interface, a micro USB interface, a USB Type-C interface, or the like. The USB interface 130 may be configured to connect to a charger to charge the electronic device 101, or may be configured to transmit data between the electronic device 101 and a peripheral device. The USB interface 130 may alternatively be configured to: connect to a headset, and play audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display screen 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution, applied to the electronic device 100, to wireless communication including 2G, 3G, 4G, 5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The wireless communication module 160 may provide a solution, applied to the electronic device 100, to wireless communication including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and render an image. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or more display screens 194.

In some embodiments of this application, when the display panel is made of a material such as an OLED, an AMOLED, or an FLED, the display screen 194 in FIG. 1 may be bent. Herein, that the display screen 194 may be bent means that the display screen may be bent to any angle at any part, and may be held at the angle. For example, the display screen 194 may be folded left and right from the middle. Alternatively, the display screen 194 may be folded up and down from the middle.

The display screen 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device configured with the foldable display.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this case, the electronic device 100 can play or record videos in a plurality of encoding formats, for example, a moving picture experts group (moving picture experts group, MPEG)-1 format, an MPEG-2 format, an MPEG-3 format, and an MPEG-4 format.

The NPU is a neural network (neural network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store one or more computer programs, and the one or more computer programs include instructions. The processor 110 may run the instructions stored in the internal memory 121, so that the electronic device 101 performs a machine translation method provided in some embodiments of this application, various applications, data processing, and the like. The internal memory 121 may include a program storage area and a data storage area. The program storage area may store an operating system. The program storage area may further store one or more applications (such as Gallery and Contacts), and the like. The data storage area may store data (for example, a photo and a contact) created during use of the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory that is disposed in the processor 110, so that the electronic device 101 performs the machine translation method provided in this embodiment of this application, other applications, and data processing. The electronic device 100 can implement an audio function, for example, a music playing function and a recording function, by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, or a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display screen 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyro sensor 180B may be configured to determine a motion posture of the electronic device 100. In some embodiments, angular velocities of the electronic device 100 around three axes (namely, axes X, Y, and Z) may be determined by using the gyro sensor 180B. The gyro sensor 180B may be configured to perform image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The acceleration sensor 180E may detect magnitudes of accelerations in various directions (usually on three axes) of the electronic device 100, and may detect a magnitude and a direction of gravity when the electronic device 100 is still. The acceleration sensor 180E may be further configured to identify a posture of the electronic device, and is used in an application such as switching between a landscape mode and a portrait mode or a pedometer.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor 180K. The touch sensor may transfer a detected touch operation to the application processor, to determine a type of a touch event. The display screen 194 may provide a visual output related to the touch operation. In some other embodiments, the touch sensor 180K may alternatively be disposed on a surface of the electronic device 100 at a location different from that of the display screen 194.

Figure 2:
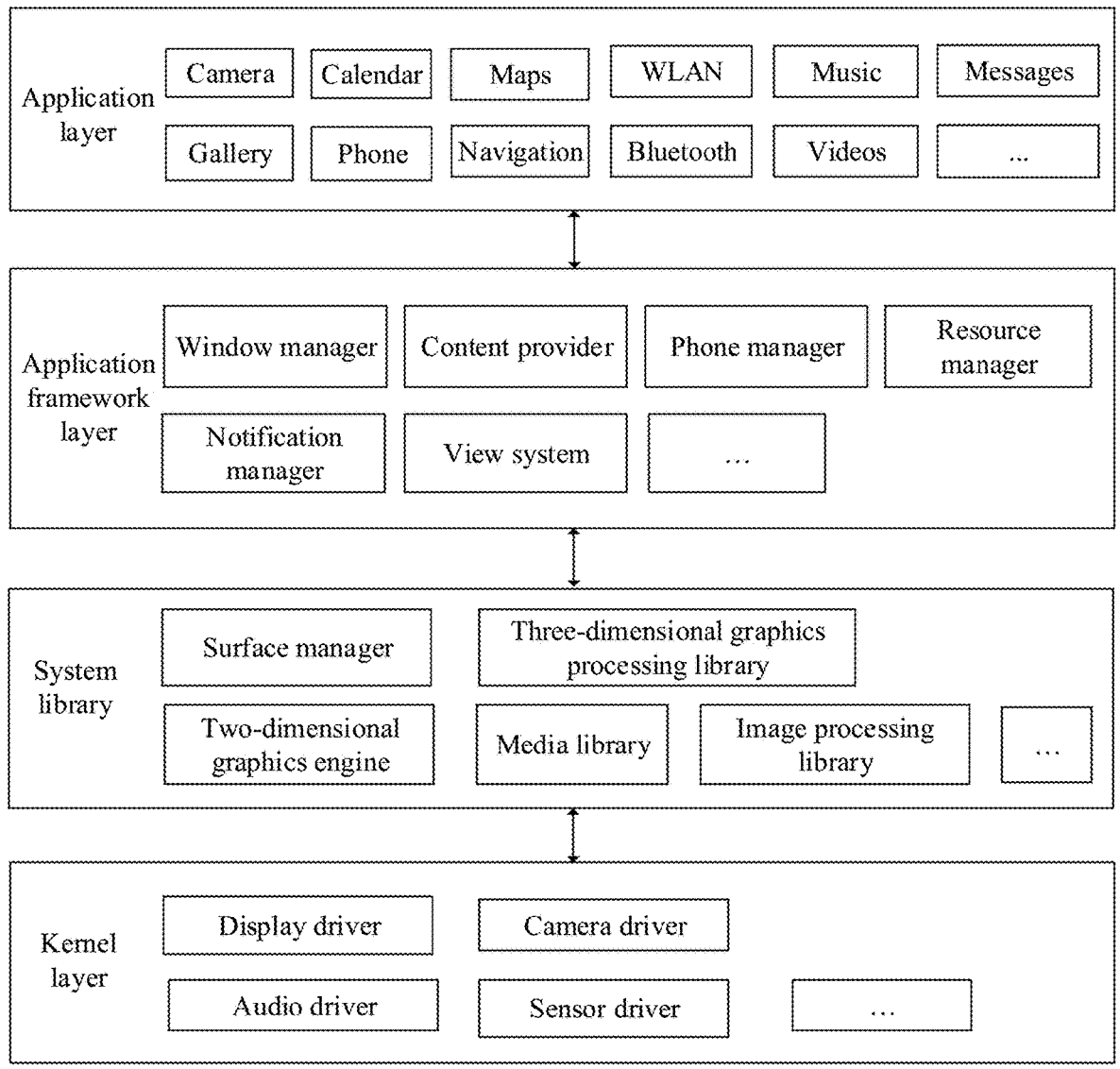
FIG. 2 is a block diagram of a software structure of an electronic device according to an embodiment of this application.

FIG. 2 is a block diagram of a software structure of the electronic device 100 according to this embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as "camera", "gallery", "calendar", "phone", "maps", "navigation", "WLAN", "Bluetooth", "music", "videos", and "messages".

The application framework layer provides an application programming interface (application programming interface, API) and a programming framework for an application at the application layer, and the application framework layer includes some predefined functions.

As shown in FIG. 2, the application framework layer may include a window manager, a content provider, a view system, a phone manager, a resource manager, a notification manager, and the like.

The window manager is configured to manage a window program, and the window manager may obtain a display screen size, determine whether there is a status bar, lock a screen, capture the screen, and the like.

The content provider is configured to: store and obtain data, and enable the data to be accessed by an application. The data may include a video, an image, audio, calls that are made and received, a browsing history, a bookmark, an address book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, an image, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The system library may include a plurality of function modules such as a surface manager (surface manager), a media library (media library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Before the machine translation method in the embodiments of this application is described, several concepts related to the embodiments of this application are first described.

Full-screen screenshot taking: Full-screen screenshot taking is to perform a "snapshot" operation on content displayed on a current electronic device to obtain a picture with a same length and width and same content as a screen. For example, a full-screen screenshot may be taken by pressing a home button and a power button at the same time in iPhone, or full-screen screenshot taking may be triggered by pressing a volume up button and a power button at the same time for a model without a home button. For another example, full-screen screenshot taking may be triggered by knocking a screen with a knuckle twice on a Huawei mobile phone. Another vendor may have another manner of enabling full-screen screenshot taking.

Long screenshot taking: After being triggered in an interaction manner, long screenshot taking is to generate, for content displayed on an electronic device, a picture whose length exceeds a height of a screen, where content is a long picture whose length exceeds a length of one screen and content is coherent and that is captured downward starting from a currently displayed location. For example, on a Huawei mobile phone, long screenshot taking is enabled by drawing "S" on a screen with a knuckle and is stopped after tapping. Another vendor may have another manner of enabling long screenshot taking.

For ease of understanding, a mobile phone having the structures shown in FIG. 1 and FIG. 2 is used as an example in the following embodiments of this application, and the machine translation method provided in the embodiments of this application is specifically described with reference to the accompanying drawings.

FIG. 3(a) to FIG. 3(m) show a group of graphical user interfaces (graphical user interfaces, GUIs) of a mobile phone. FIG. 3(a) to FIG. 3(m) show a process in which a user performs full-screen translation and scrolling translation.

Figure 3A:
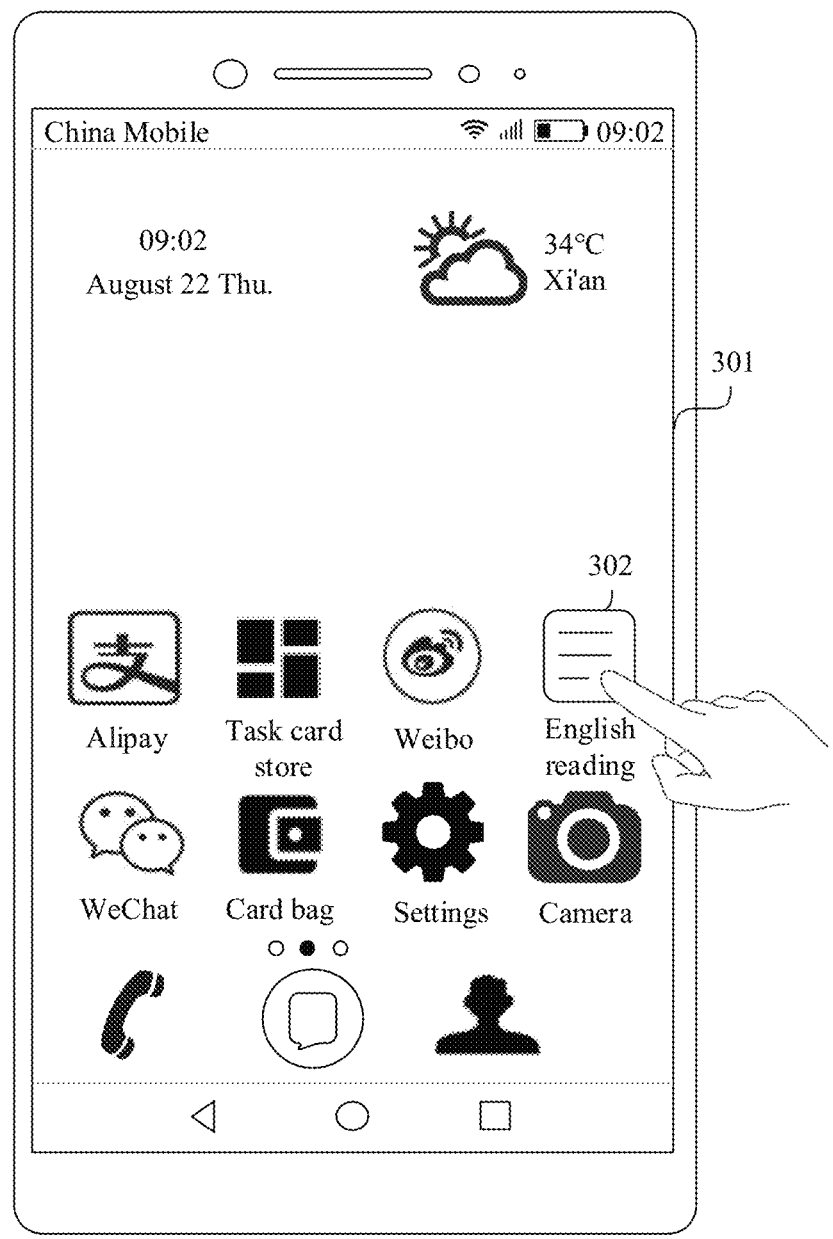
FIG. 3(a) to FIG. 3(m) show a group of GUIs according to an embodiment of this application.

Referring to a GUI shown in FIG. 3(a), the GUI is a desktop of a mobile phone. The desktop of the mobile phone includes three desktop pages, and each of the desktop pages includes icons of one or more applications. A current desktop displayed by the mobile phone is a second desktop page 301, and the desktop page includes an icon of Alipay, an icon of Task card store, an icon of Weibo, an icon 302 of English reading, an icon of WeChat, an icon of Card bag, an icon of Settings, and an icon of Camera. When detecting an operation of tapping the icon 302 by the user, the mobile phone may display a GUI shown in FIG. 3(b).

Figure 3B:
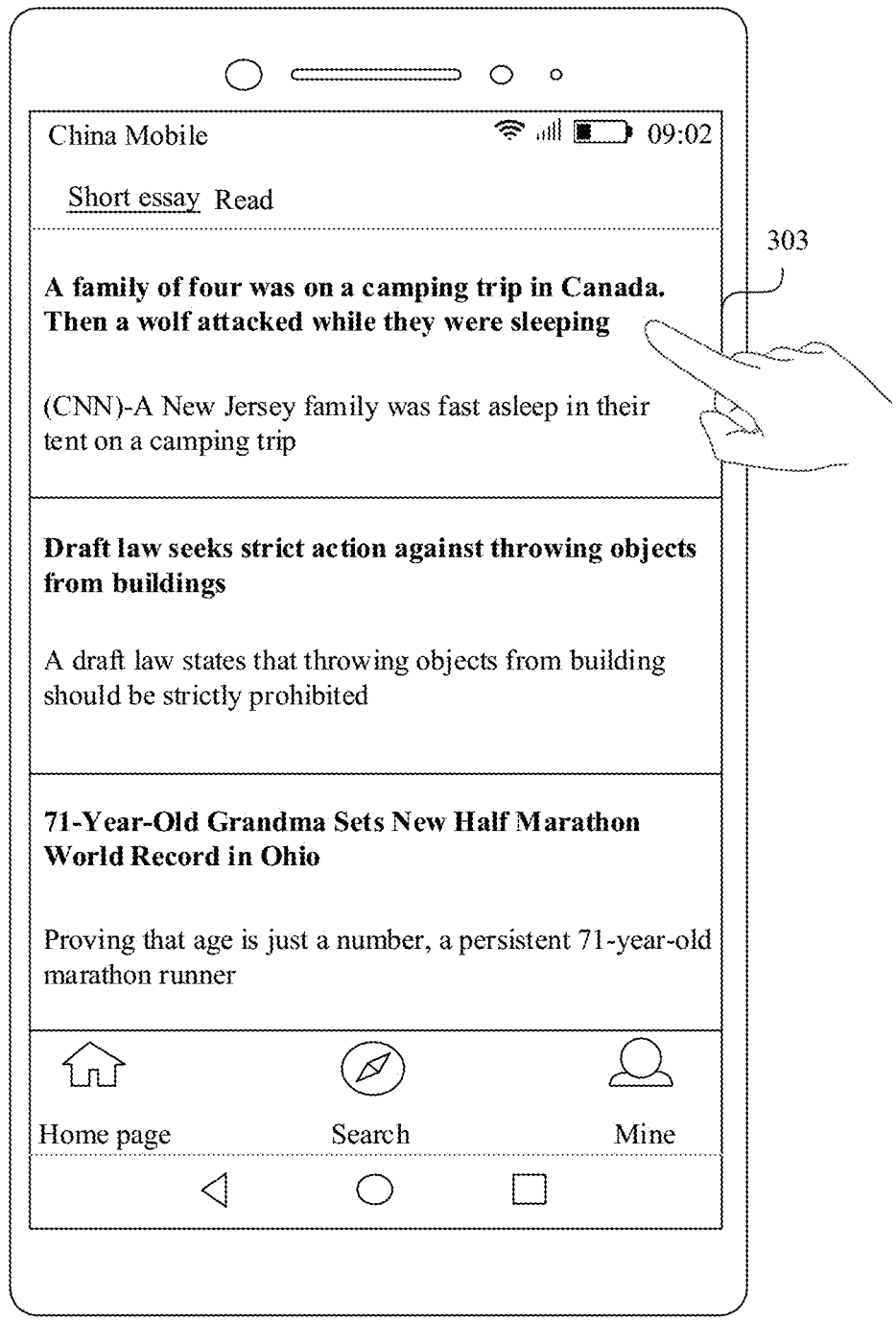

Referring to the GUI shown in FIG. 3(b), the GUI is a display interface of an English reading APP. The display interface includes a plurality of English essays, including an English essay 303 entitled "A family of four was on a camping trip in Canada. Then a wolf attacked while they were sleeping", an English essay entitled "Draft law seeks strict action against throwing objects from buildings", and an English essay entitled "71-Year-Old Grandma Sets New Half Marathon World Record in Ohio". After detecting an operation of tapping the English essay 303 by the user, the mobile phone may display a GUI shown in FIG. 3(c).

Figure 3C:
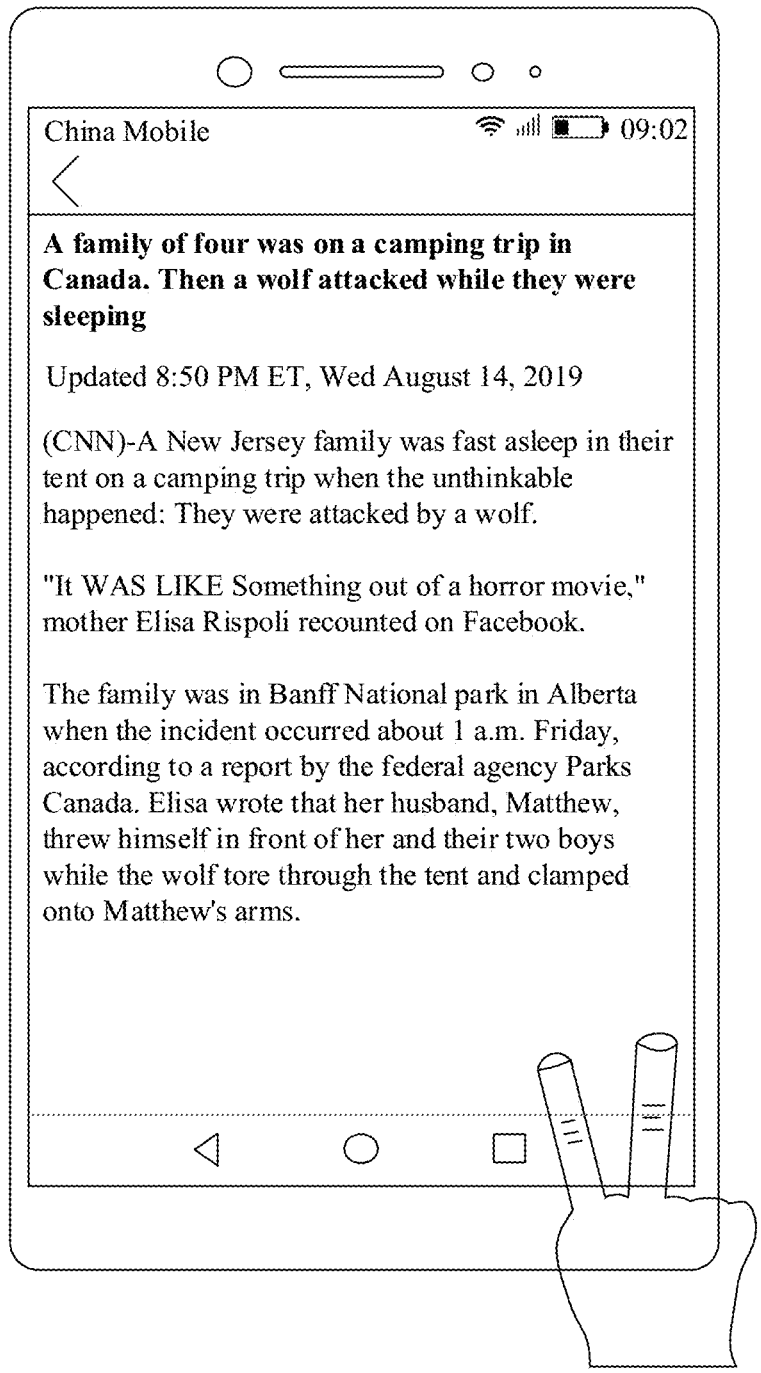

Referring to the GUI shown in FIG. 3(c), the GUI is a display interface of the English essay 303. The user may read a source text of the English essay by performing upward/downward sliding on a screen. As shown in FIG. 3(c), when the mobile phone detects an operation of pressing the interface with two fingers by the user, the mobile phone may display a GUI shown in FIG. 3(d).

Figure 3D:
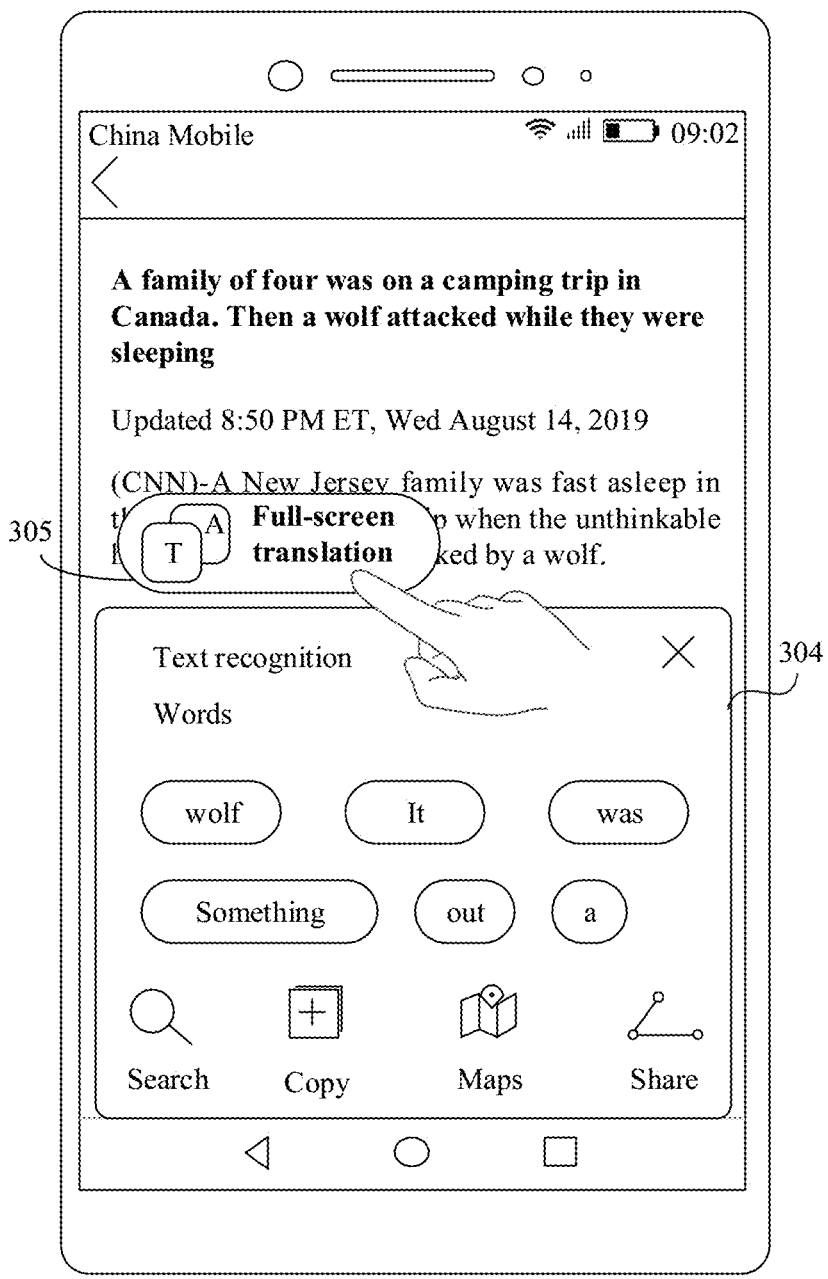

Referring to the GUI shown in FIG. 3(d), the GUI is a display interface of AI touch. When the mobile phone detects an operation of pressing the screen with two fingers by the user, the mobile phone may automatically display a prompt box 304. The prompt box 304 may be a display interface of AI touch. The mobile phone may automatically identify words such as "wolf", "It", "was", "Something", "out", and "a" in the English essay. The prompt box 304 may further include controls such as "Search", "Copy", "Map", "Share", and "Full-screen translation". When detecting an operation of tapping a control 305 by the user, the mobile phone may display a GUI shown in FIG. 3(e).

In this embodiment of this application, the mobile phone may have an AI touch function. The AI touch function may include: After the mobile phone detects that two fingers press a text, the mobile phone may automatically extract text content in a pressed area, analyze a keyword, and the like. The AI touch function may further include: After the mobile phone detects that two fingers press a picture, the mobile phone extracts picture content in a pressed area and analyzes an article in the picture.

It should be understood that in this embodiment of this application, full-screen translation may be further understood as translating a source text displayed on the current screen, or translating one-screen content displayed after a screenshot operation is performed on the current screen. When the mobile phone detects that the user taps the control 305, the mobile phone may automatically translate the source text on the screen shown in FIG. 3(c).

Figure 3E:
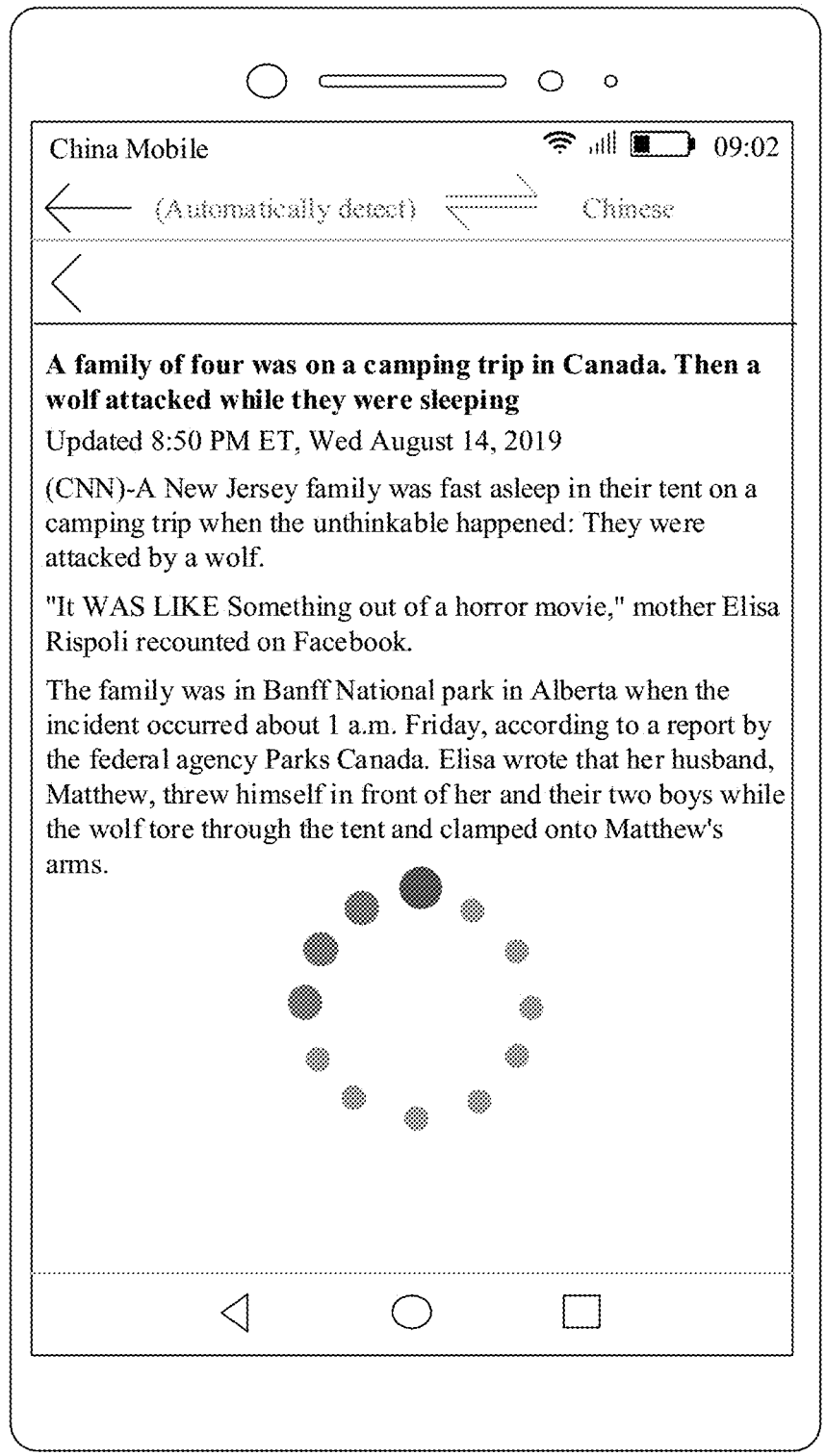

Referring to the GUI shown in FIG. 3(e), the GUI is a loading interface of full-screen translation. The mobile phone translates English on the current screen into Chinese by default. When completing translating content displayed on the current screen, the mobile phone may automatically display a GUI shown in FIG. 3(f).

Figure 3F:
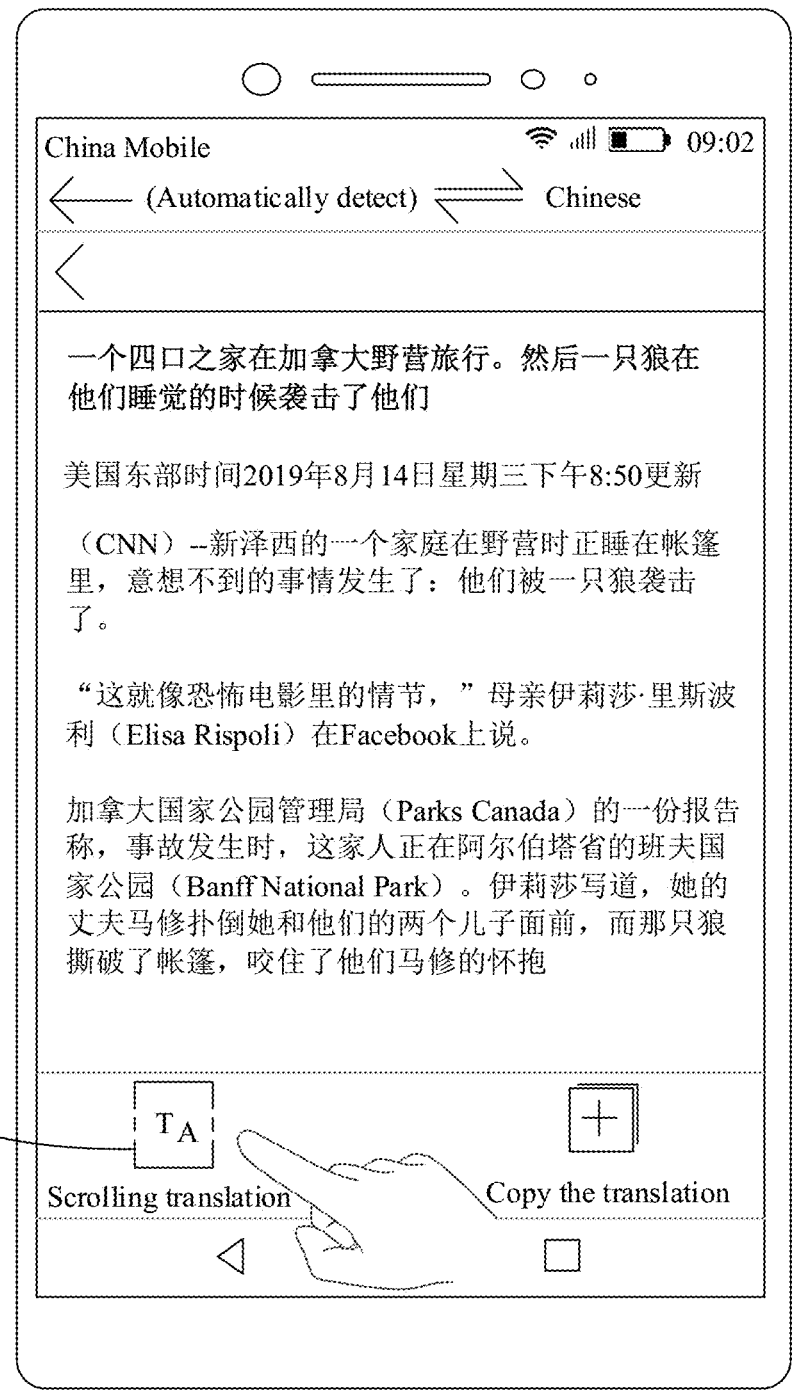

Referring to the GUI shown in FIG. 3(f), the GUI is a translation interface of full-screen translation. The mobile phone translates the English essay displayed in FIG. 3(c) into corresponding Chinese. The user may further tap a translation language in the translation interface. For example, when the user taps "Chinese", a plurality of other foreign languages may be displayed, and the user may select another translation language. The translation interface further includes a "Scrolling translation" control 306 and a "Copy the translation" control. When detecting an operation of tapping the control 306 by the user, the mobile phone may display a GUI shown in FIG. 3(g).

It should be understood that in this embodiment of this application, scrolling translation may be further referred to as long-screenshot translation. A difference between scrolling translation and full-screen translation is as follows: For scrolling translation, the mobile phone may first take a long screenshot of source text content, and then may automatically translate content (which may be multi-screen content) on the long screenshot, and for full-screen translation, the mobile phone may translate, for example, only content (one-screen content) displayed in the current source text shown in FIG. 3(c).

Figure 3G:
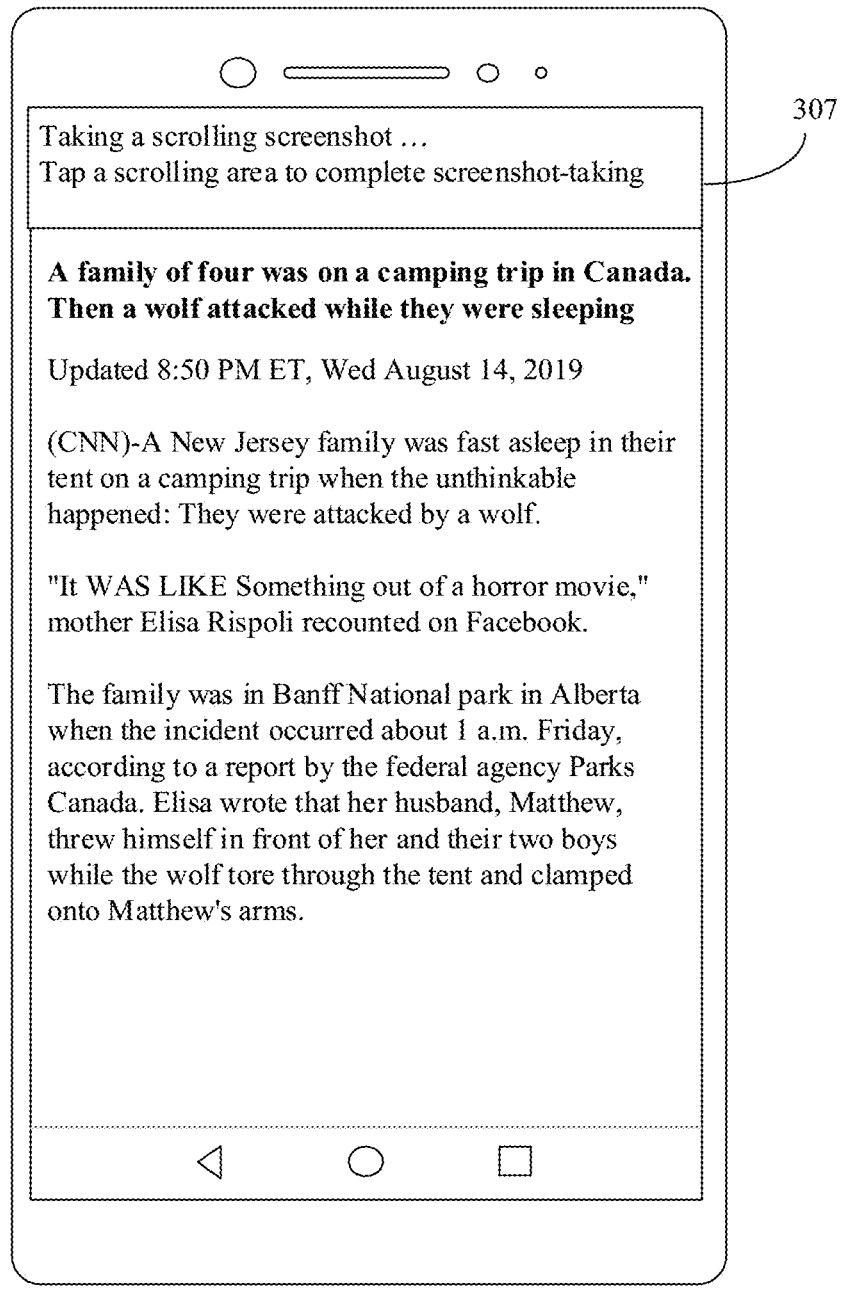

Referring to the GUI shown in FIG. 3(g), the GUI is a scrolling display interface of long screenshot taking. As shown in FIG. 3(g), the scrolling display interface of long screenshot taking may include a prompt box 307. In the prompt box 307, a text "Taking a scrolling screenshot . . . Tap a scrolling area to complete screenshot-taking" may be indicated to the user. The mobile phone may automatically scroll down the screen. For example, the process in which the mobile phone automatically scrolls down the screen is shown from FIG. 3(g) to FIG. 3(h) and then to FIG. 3(i).

Figure 3H:
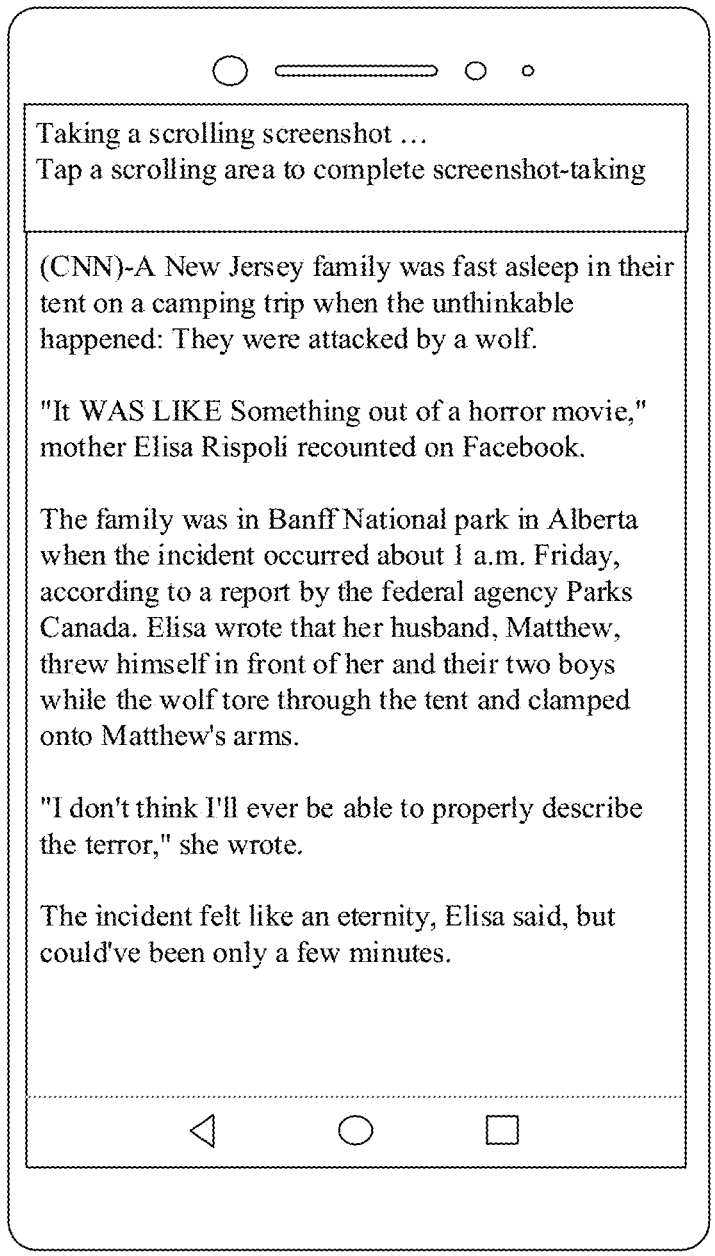
Figure 3I:
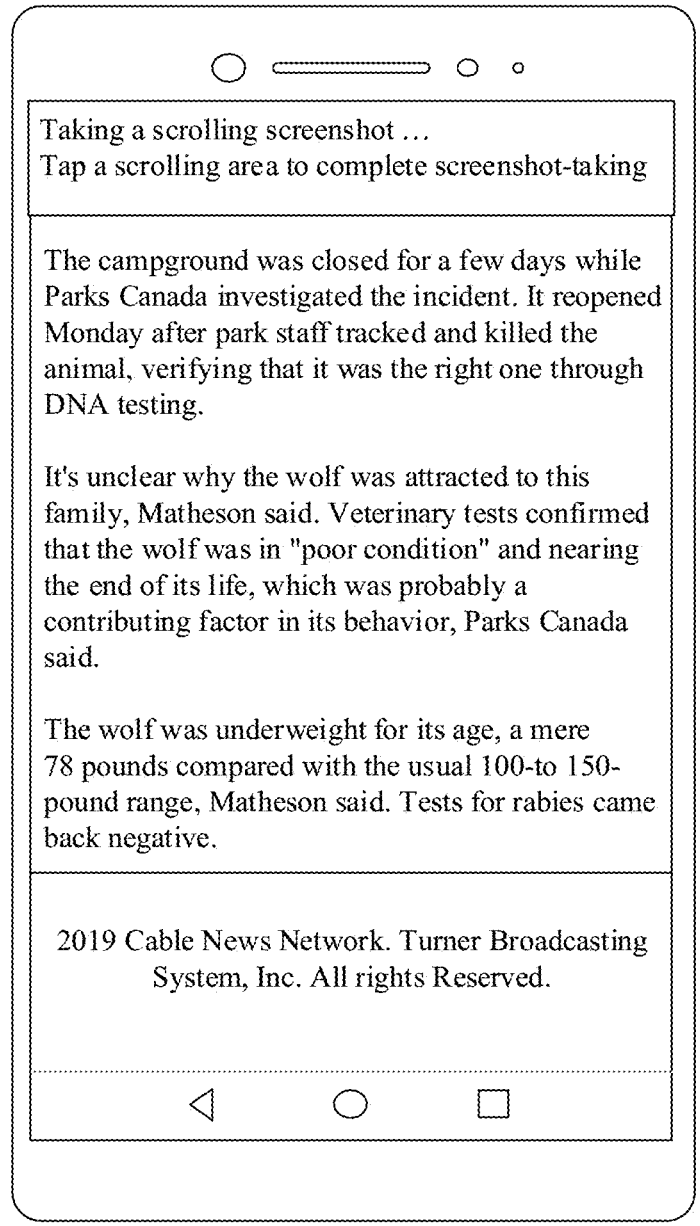

Referring to a GUI shown in FIG. 3(i), when the bottom of the English essay (or the end of the English essay) is reached through scrolling during scrolling screenshot taking on the mobile phone, the mobile phone may automatically complete taking a screenshot. In this case, a start location of long screenshot taking may be the start of the English essay shown in FIG. 3(c), and an end location of long screenshot taking may be the end of the English essay. When the mobile phone completes taking a long screenshot, the mobile phone may automatically display an interface shown in FIG. 3(j).

Figure 3J:
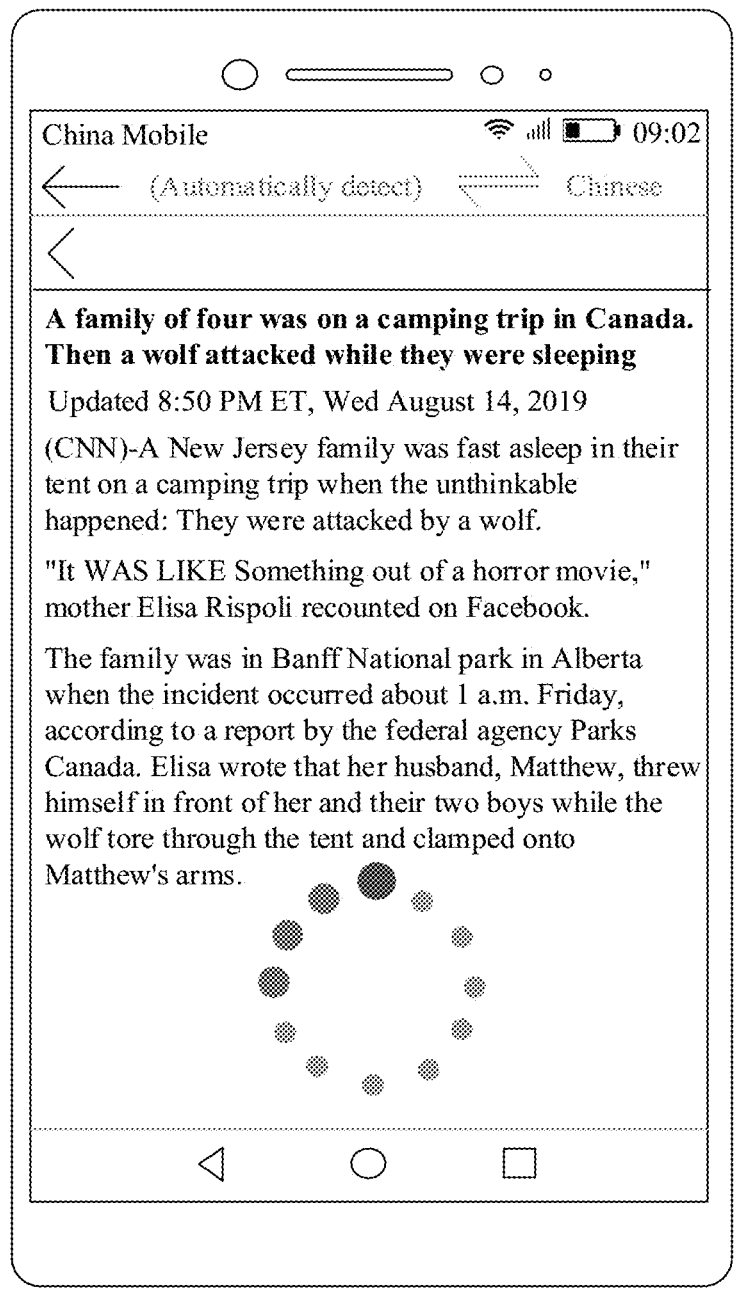

Referring to the GUI shown in FIG. 3(j), the GUI is a loading interface of scrolling translation. The mobile phone may translate English on the long screenshot into corresponding Chinese. When translation is completed, the mobile phone may automatically display a GUI shown in FIG. 3(k).

Figure 3K:
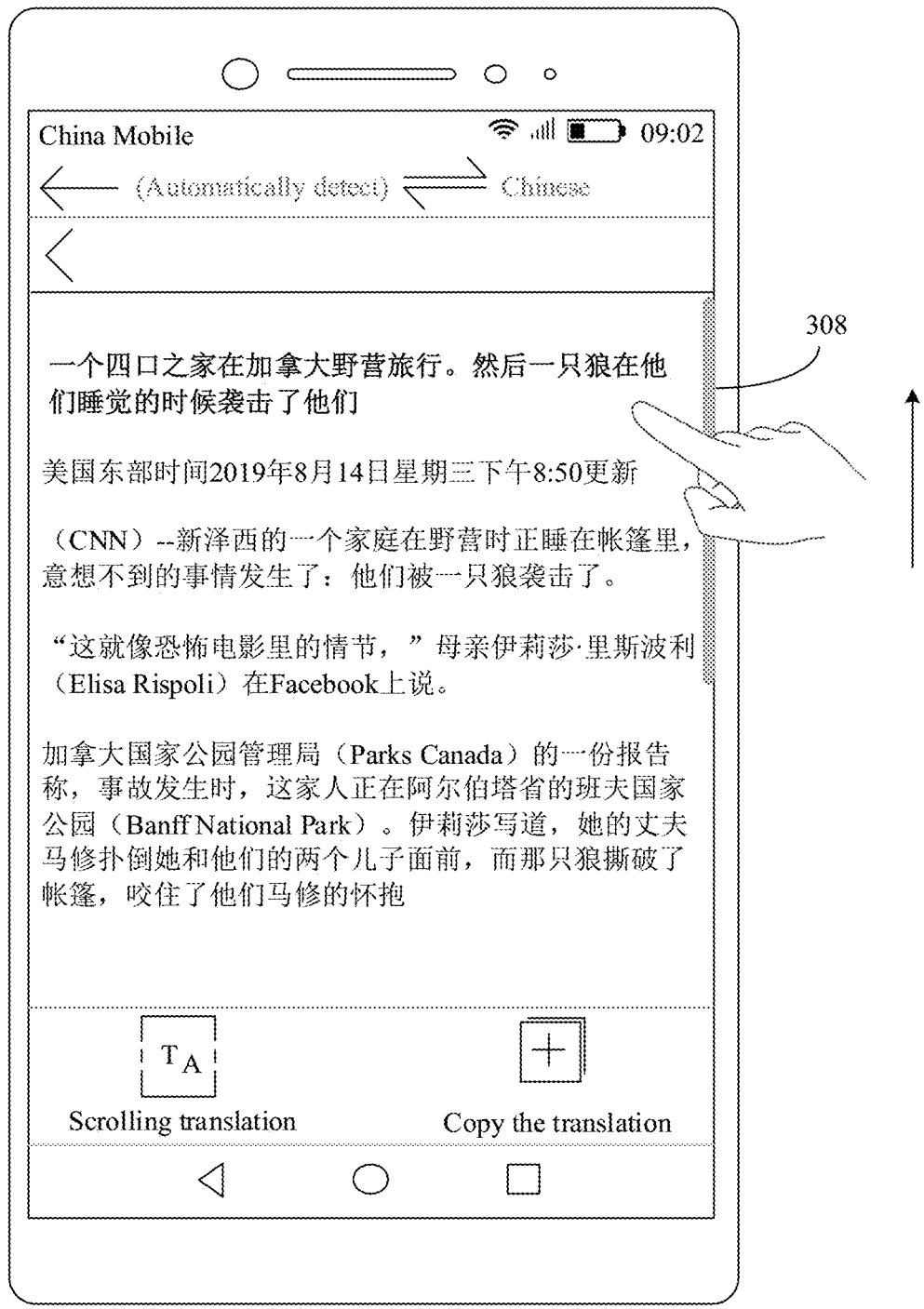

Referring to the GUI shown in FIG. 3(k), the GUI is a translation interface of scrolling translation. The mobile phone has translated the English essay on the long screenshot into corresponding Chinese. After the mobile phone detects an upward sliding operation of the user on the screen, the mobile phone may display the translation content through scrolling. In the process of displaying the translation content through scrolling, a scroll bar 308 may further appear in the translation interface of scrolling translation. When the mobile phone displays the translation content through downward scrolling, the scroll bar 308 may also slide down accordingly. A location of the scroll bar 308 may correspond to a location, in the entire translation, of a translation in the current interface.

Figure 3L:
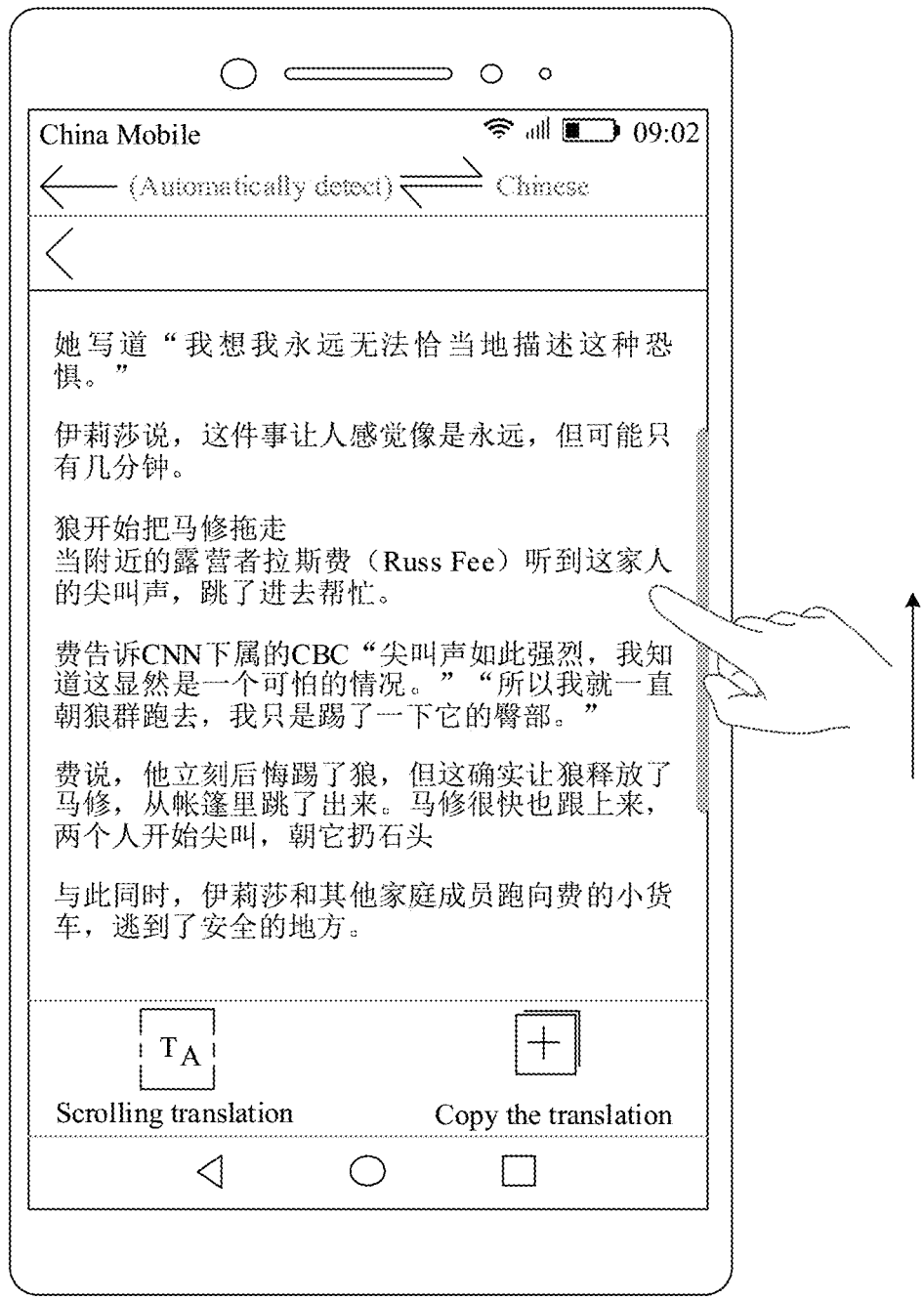
Figure 3M:
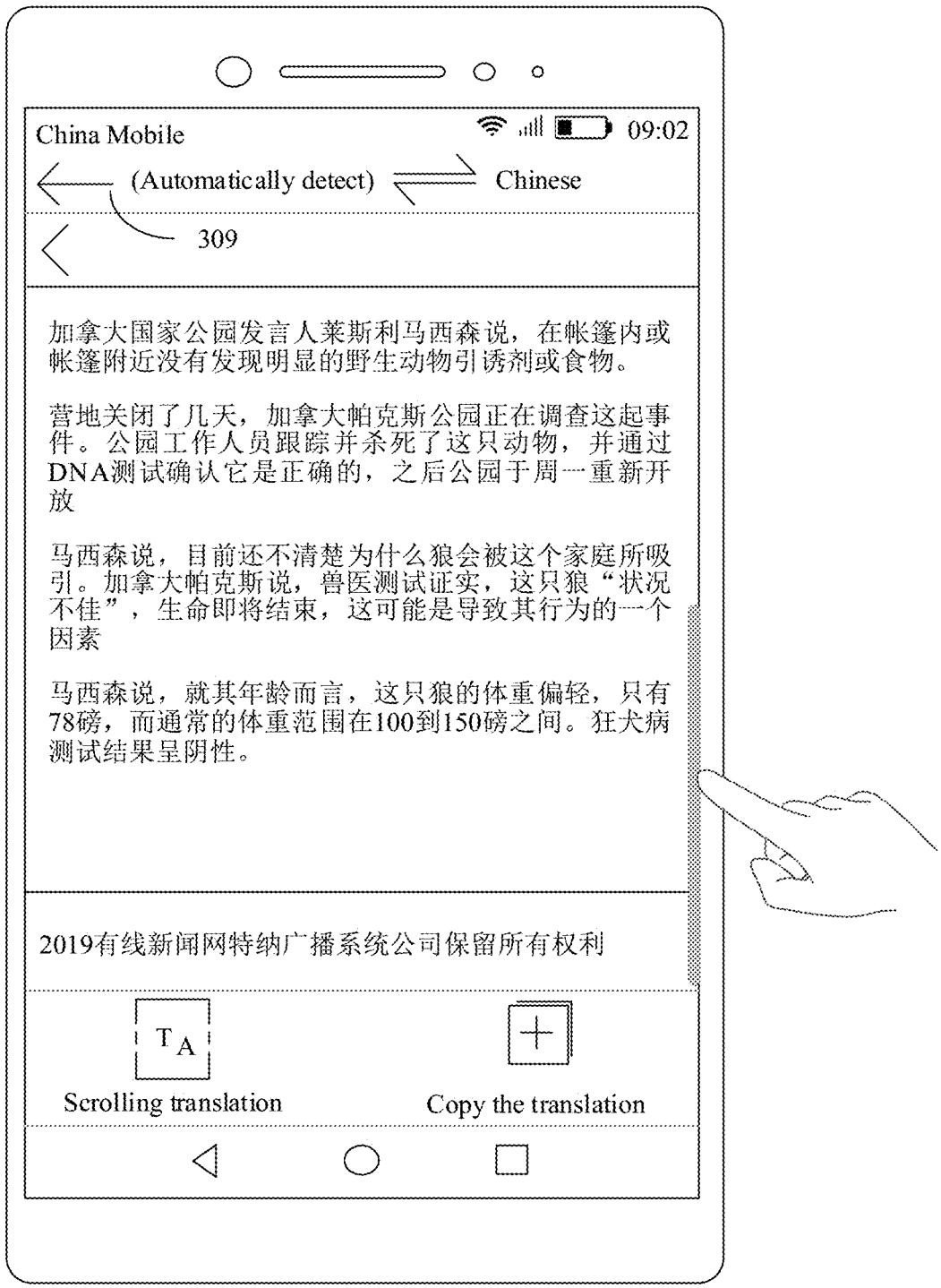

FIG. 3(k) to FIG. 3(m) show a change process in which the mobile phone displays the translation content through scrolling. The user may view a corresponding translation by performing upward or downward sliding.

In an embodiment, when the user completes viewing the translation corresponding to the long screenshot, the user may tap a control 309 to exit the translation interface of scrolling translation. In this embodiment of this application, after detecting an operation of tapping the control 309 by the user, the mobile phone may display a source-text interface. The source-text interface may be a source text content display interface existing when the electronic device starts to take a scrolling screenshot. For example, when detecting the operation of tapping the control 309 by the user, the mobile phone may display the GUI shown in FIG. 3(c).

It should be understood that FIG. 3(i) is described by using an example in which long screenshot taking is automatically stopped after the end of the English essay is reached through scrolling during scrolling screenshot taking. Alternatively, before the screen of the mobile phone is automatically scrolled to the end of the English essay, the mobile phone may automatically stop taking a long screenshot after detecting a tap operation of the user. For a corresponding process, refer to GUIs in FIG. 4(a) to FIG. 4(l).

It should be further understood that in the translation interfaces in FIG. 3(k) to FIG. 3(i), the "Scrolling translation" control 306 may be further displayed. Alternatively, after the mobile phone determines that all content of the English essay has been translated (or when the mobile phone determines that long screenshot taking is automatically stopped when the end of the English essay is reached through scrolling), the mobile phone may not display the "Scrolling translation" control 306 in the translation interface.

With reference to FIG. 3(a) to FIG. 3(i), the foregoing describes a process in which the user opens the English essay, performs full-screen translation, and then performs scrolling translation. To be specific, the user may first perform full-screen translation, the "Scrolling translation" control may be displayed in a translation interface of full-screen translation, and then the user may perform scrolling translation. In this way, after performing full-screen translation, the user may first determine whether the user is interested in source text content. If the user is interested in the source text content, the user may subsequently perform scrolling translation to view more translation content. If the user is not interested in the source text content, the user may stop reading a current source text, and then search for a source text in which the user is interested.

With reference to FIG. 4(a) to FIG. 4(l), the following describes another group of GUIs provided in an embodiment of this application.

Figure 4A:
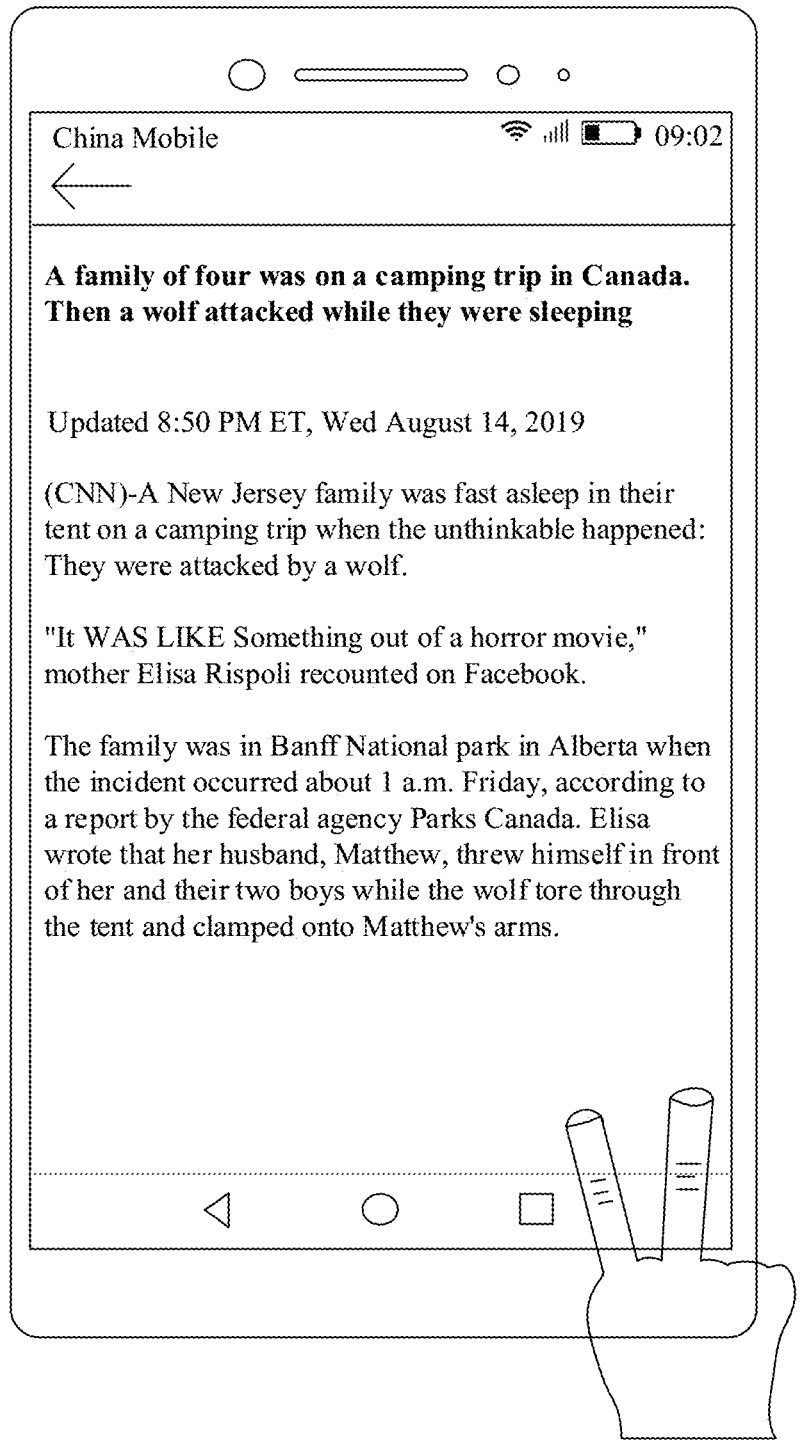
FIG. 4(a) to FIG. 4(l) show another group of GUIs according to an embodiment of this application.

Referring to a GUI shown in FIG. 4(a), the GUI is a display interface of AI touch. The user may read the source text of the English essay by performing upward/downward sliding on the screen. As shown in FIG. 4(a), when the mobile phone detects an operation of pressing the interface with two fingers by the user, the mobile phone may display a GUI shown in FIG. 4(b).

Figure 4B:
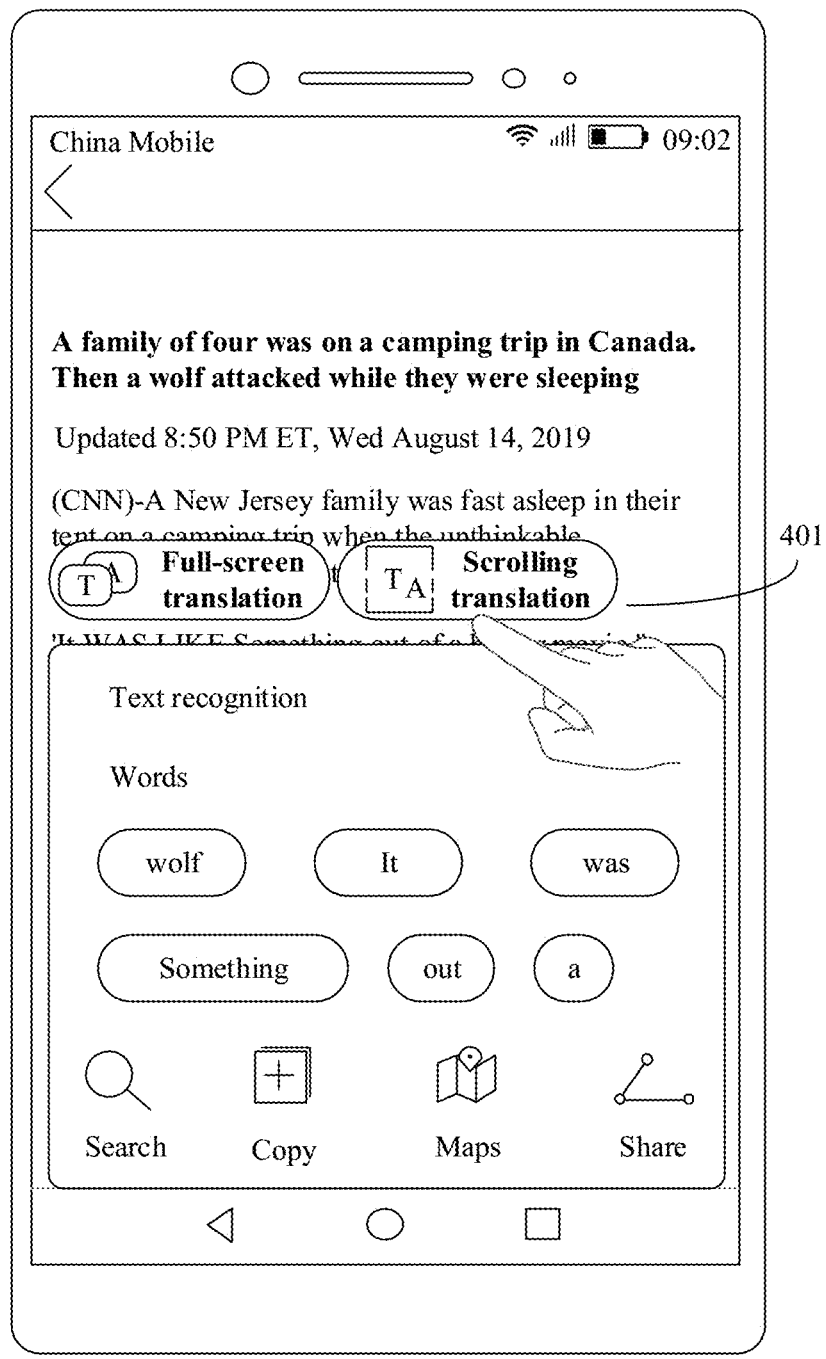

Referring to the GUI shown in FIG. 4(b), the GUI is another display interface of AI touch. In comparison with FIG. 3(d), the AI touch interface in FIG. 4(b) includes two controls: full-screen translation and scrolling translation. The user may select full-screen translation, to be specific, translation is performed on source text content (one-screen content) in the interface shown in FIG. 4(a). Alternatively, the user may select scrolling translation, to be specific, a long screenshot may be taken first, and source text content (which may be multi-screen content) displayed on a long screenshot is translated. When detecting an operation of tapping a control 401 performed by the user, the mobile phone displays a GUI shown in FIG. 4(c).

Figure 4C:
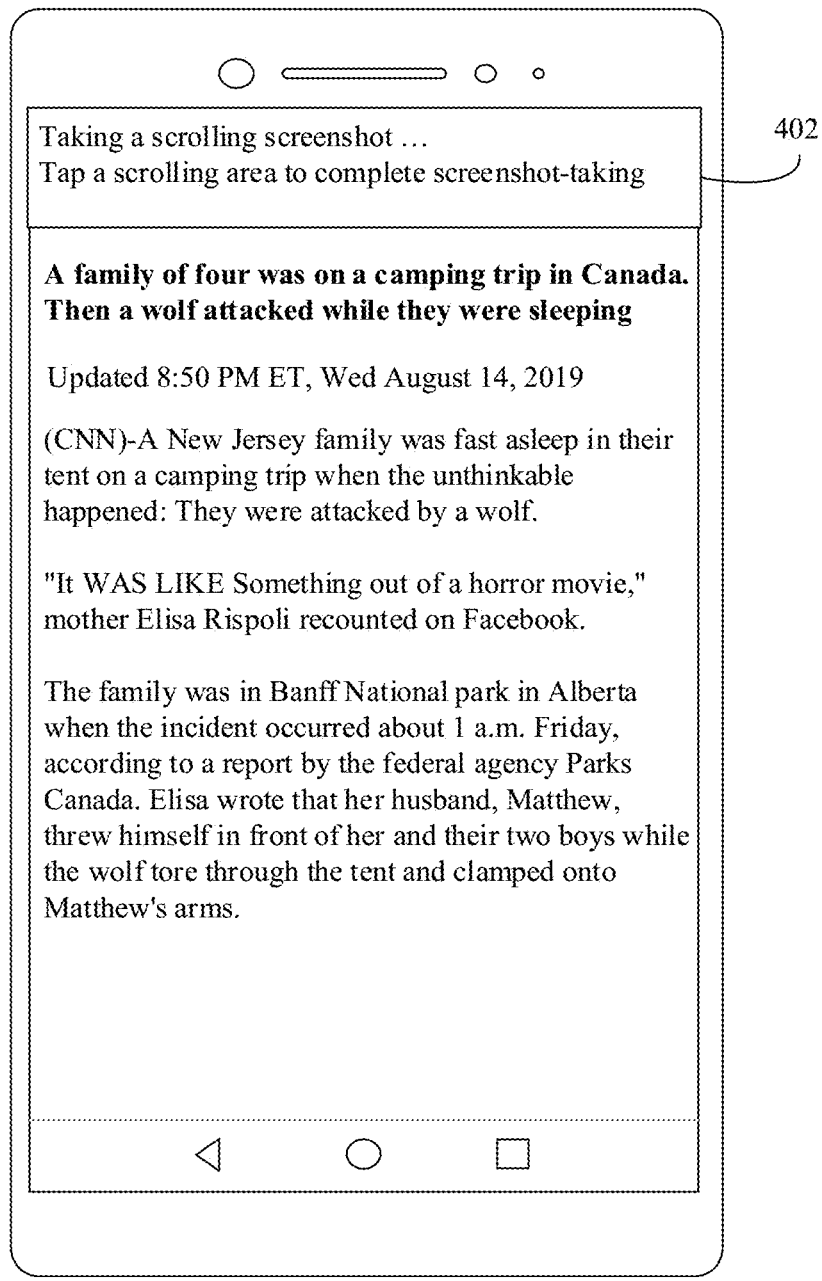

Referring to the GUI shown in FIG. 4(c), the GUI is a scrolling display interface of long screenshot taking. As shown in FIG. 4(c), the scrolling display interface of long screenshot taking may include a prompt box 402. In the prompt box 402, a text "Taking a scrolling screenshot . . . Tap a scrolling area to complete screenshot-taking" may be indicated to the user. The mobile phone may automatically scroll down the screen. For example, FIG. 4(c) and FIG. 4(d) show a process of automatically scrolling down the English essay.

Figure 4D:
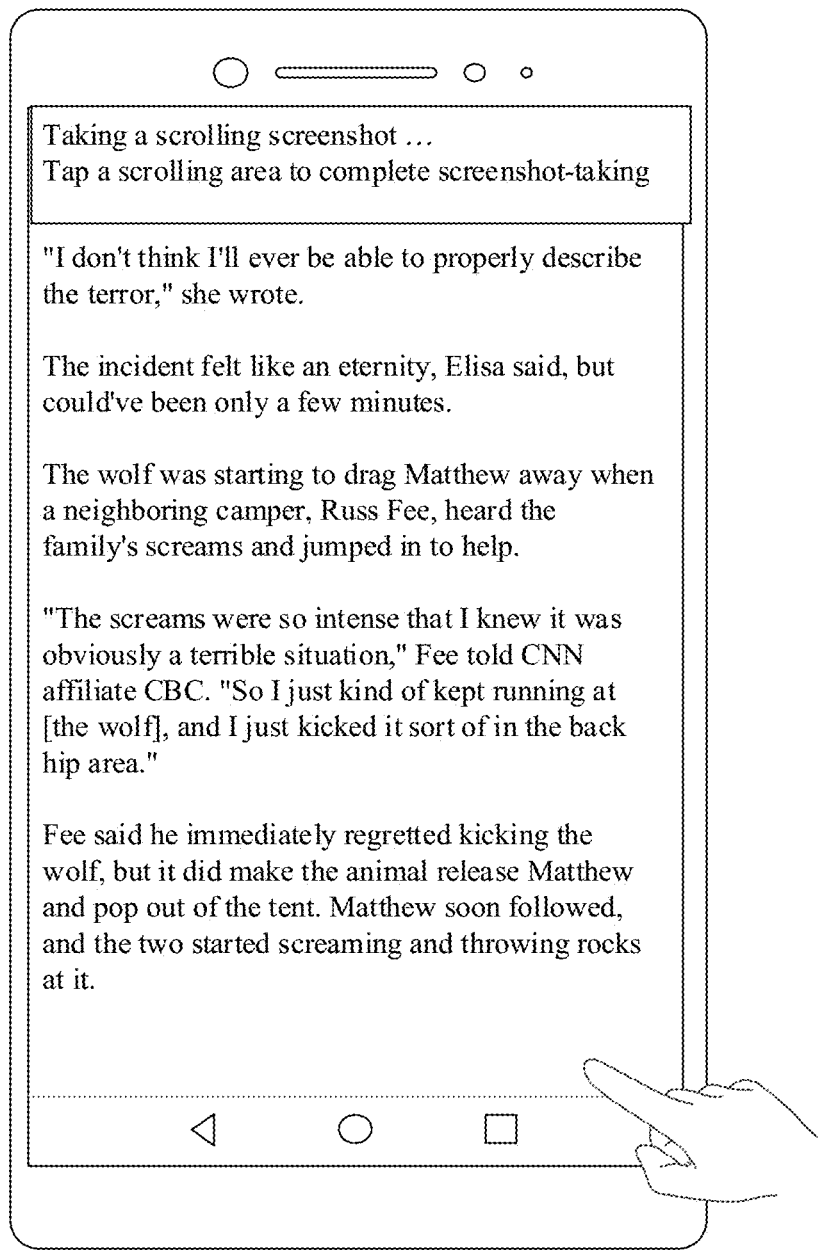

Referring to a GUI shown in FIG. 4(d), the GUI is another scrolling display interface of long screenshot taking. When the mobile phone detects a tap action of the user on the screen, the mobile phone may complete a long-screenshot operation. The mobile phone may automatically display a GUI shown in FIG. 4(e).

Figure 4E:
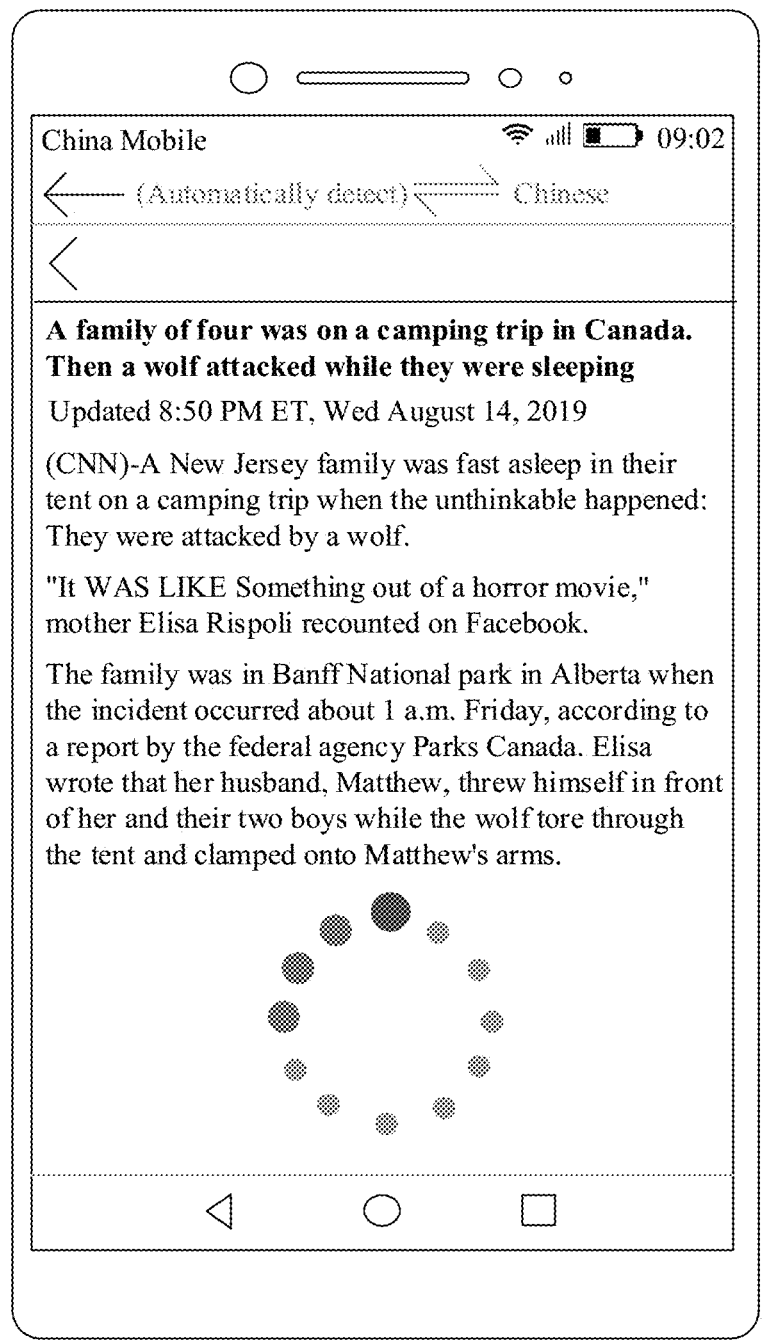

Referring to the GUI shown in FIG. 4(e), the GUI is a loading interface of scrolling translation. The mobile phone may translate English on the long screenshot into corresponding Chinese. When translation is completed, the mobile phone may automatically display a GUI shown in FIG. 4(f).

Figure 4F:
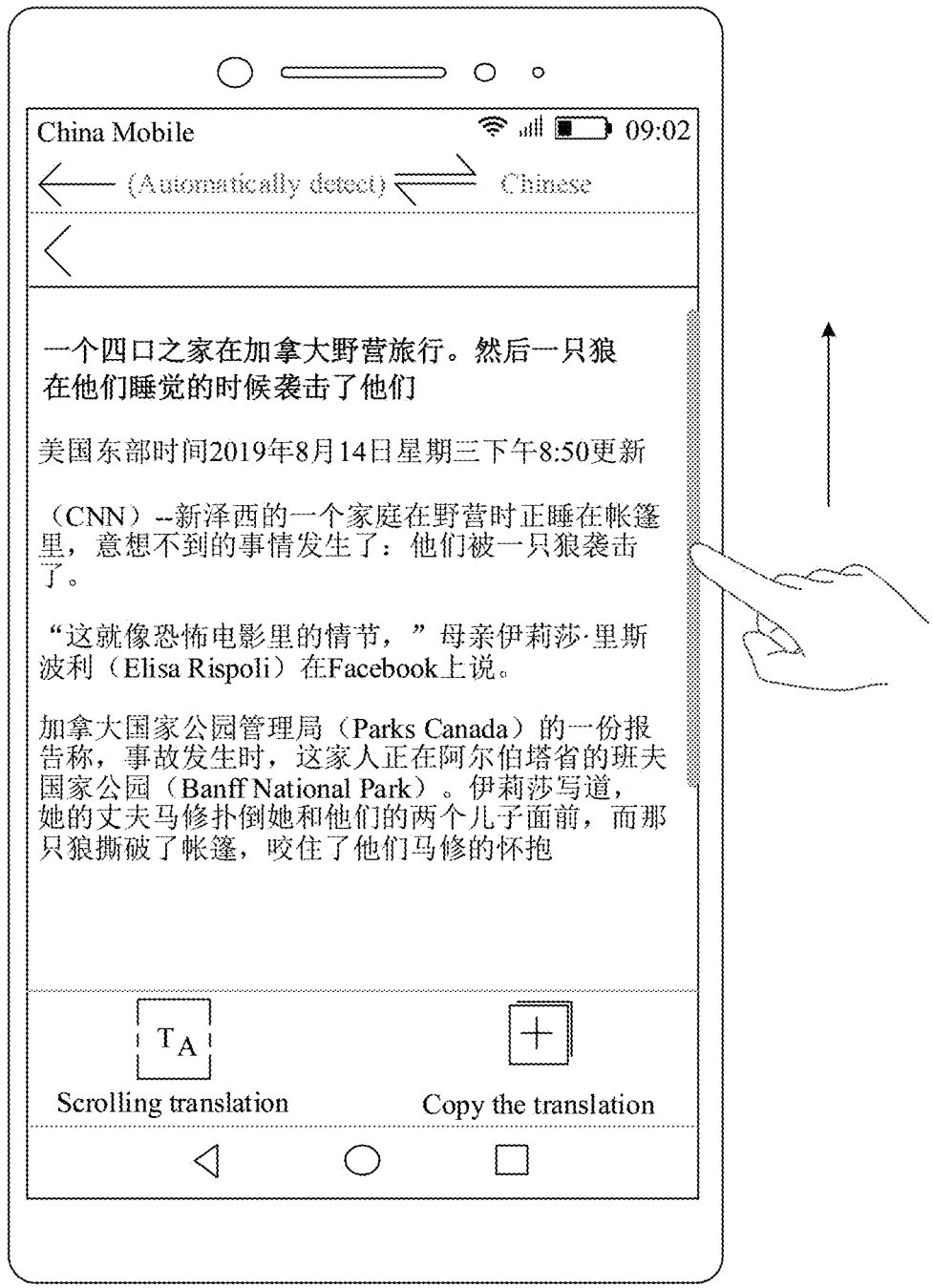

Referring to the GUI shown in FIG. 4(f), the GUI is a translation interface of scrolling translation. The mobile phone has translated the English essay on the long screenshot into corresponding Chinese. After the mobile phone detects an upward or downward sliding operation of the user on the screen, the mobile phone may display the translation content through scrolling.

Figure 4G:
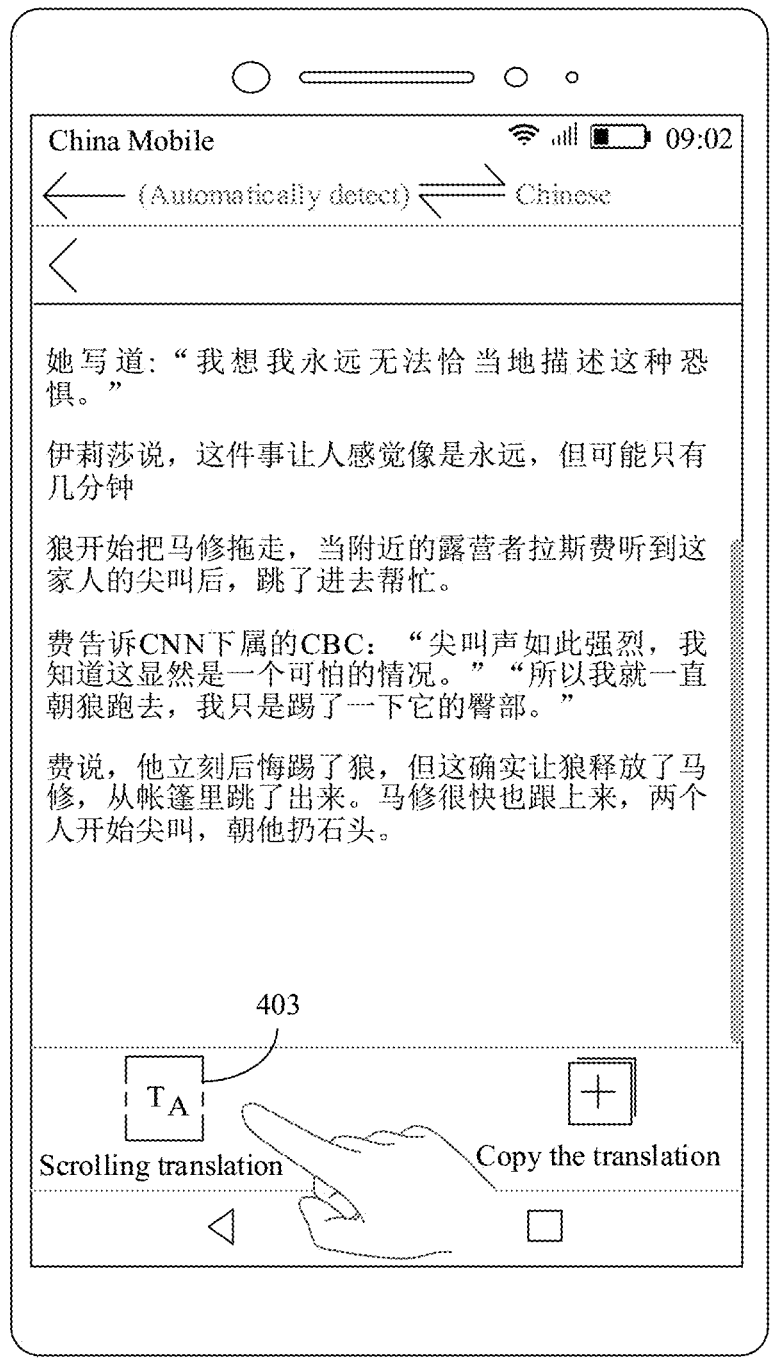

A process of changing from the GUI shown in FIG. 4(f) to a GUI shown in FIG. 4(g) is a process in which the user views a translation corresponding to multi-screen content obtained through the first long screenshot taking. After viewing, if the user expects to continue to view a translation corresponding to a remaining part of source text, the user may tap a "Scrolling translation" control 403. After detecting an operation of tapping the control 403 by the user, the mobile phone may display a GUI shown in FIG. 4(h).

Figure 4H:
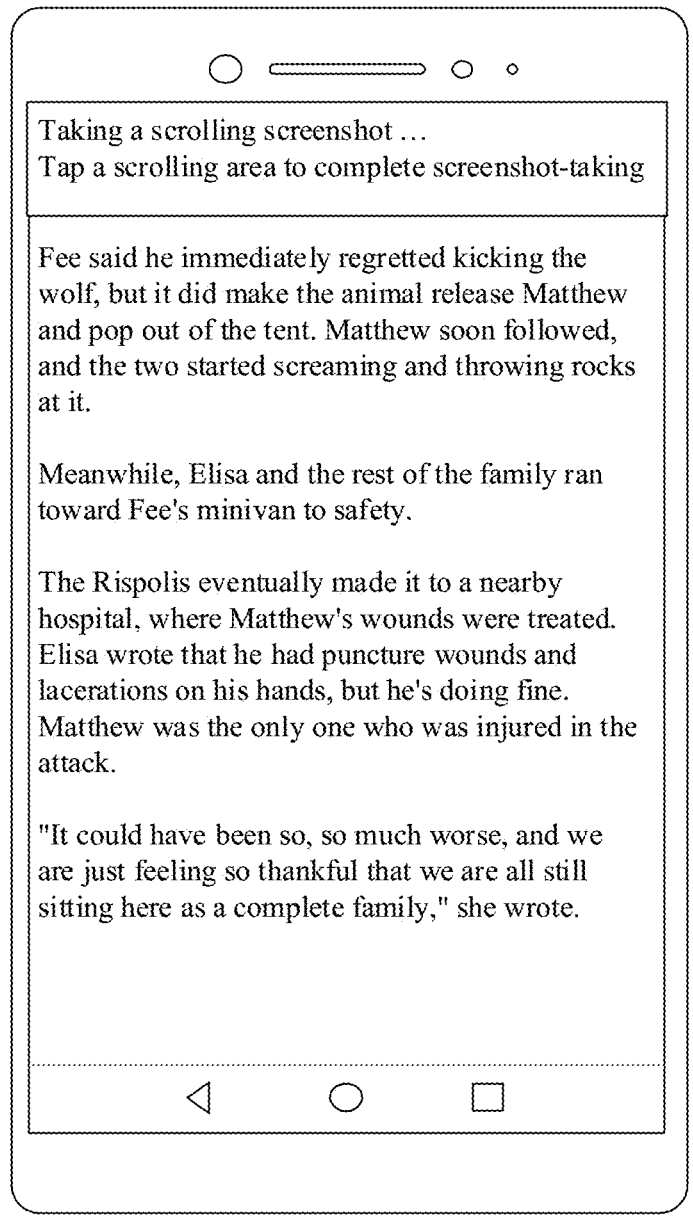

Referring to the GUI shown in FIG. 4(h), the GUI is another display interface of scrolling screenshot taking. The mobile phone may take a long screenshot from "Fee said he immediately . . . rocks at it" (the last paragraph of the first long screenshot taking).

Figure 4I:
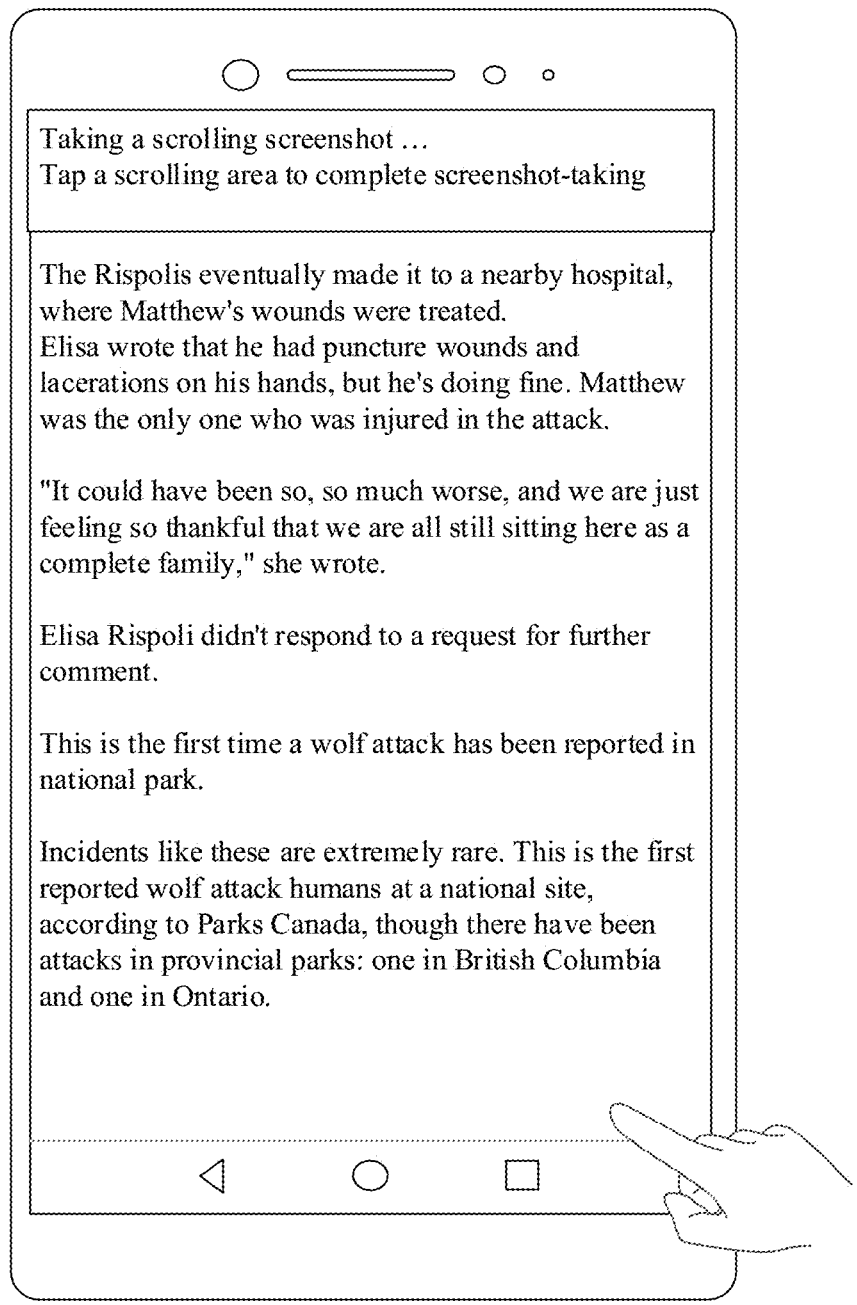

Referring to a GUI shown in FIG. 4(i), when detecting a tap operation of the user on the screen, the mobile phone may complete scrolling translation. The last paragraph of long screenshot taking is "Incidents like these are extremely . . . in Ontario" shown in FIG. 4(i).

It should be understood that FIG. 4(c) and FIG. 4(d) may be a process of the first long screenshot taking, and FIG. 4(h) to FIG. 4(i) may be a process of the second long screenshot taking.

In an embodiment, when the mobile phone takes a long screenshot next time, a start point of the next long screenshot taking may be the last paragraph of current long screenshot taking. As shown in FIG. 4(h), a start point of the second long screenshot taking may be the last paragraph of the first long screenshot taking.

In an embodiment, when the mobile phone takes a long screenshot next time, a start point of the next long screenshot taking may be the last two paragraphs of current long screenshot taking or the like.

For example, the mobile phone may alternatively take a long screenshot starting from ""The screams were so . . . situation," . . . in the back hip area" (the last but one paragraph of the first long screenshot taking).

In an embodiment, when the mobile phone takes a long screenshot next time, a start point of the next long screenshot taking may be last-screen content of current long screenshot taking.

It should be understood that after the mobile phone takes a long screenshot, if content of long screenshot taking exceeds a size of one screen, the mobile phone may segment the content of long screenshot taking into multi-screen content.

For example, for a long picture generated through long screenshot taking, the mobile phone may segment the picture based on a relationship between a height of the picture and a height of the screen of the mobile phone, and determine, at a segmentation location through optical character recognition (optical character recognition, OCR), whether a word or a picture is truncated. If the mobile phone determines that a word or a picture is truncated at the segmentation location, the mobile phone may move the segmentation location up to a blank line location, to obtain several pictures whose heights are slightly less than or equal to the height of the screen. During the next scrolling translation, a long screenshot may be taken starting from the last picture (or last-screen content) in a plurality of pictures (or multi-screen content) obtained through current long screenshot taking. Alternatively, after analyzing the last picture (or last-screen content) obtained through current long screenshot taking, the mobile phone may extract content of the last or the last few paragraphs of the last picture as a start point of long screenshot taking during the next scrolling translation.

In this way, the following advantage is achieved: In terms of reading experience, the user starts reading from the last picture (or last-screen content) or the last few paragraphs of the last picture (or last-screen content) of a previous translation. This has functions of evoking a memory and assisting in continuous reading for the user.

Figure 4J:
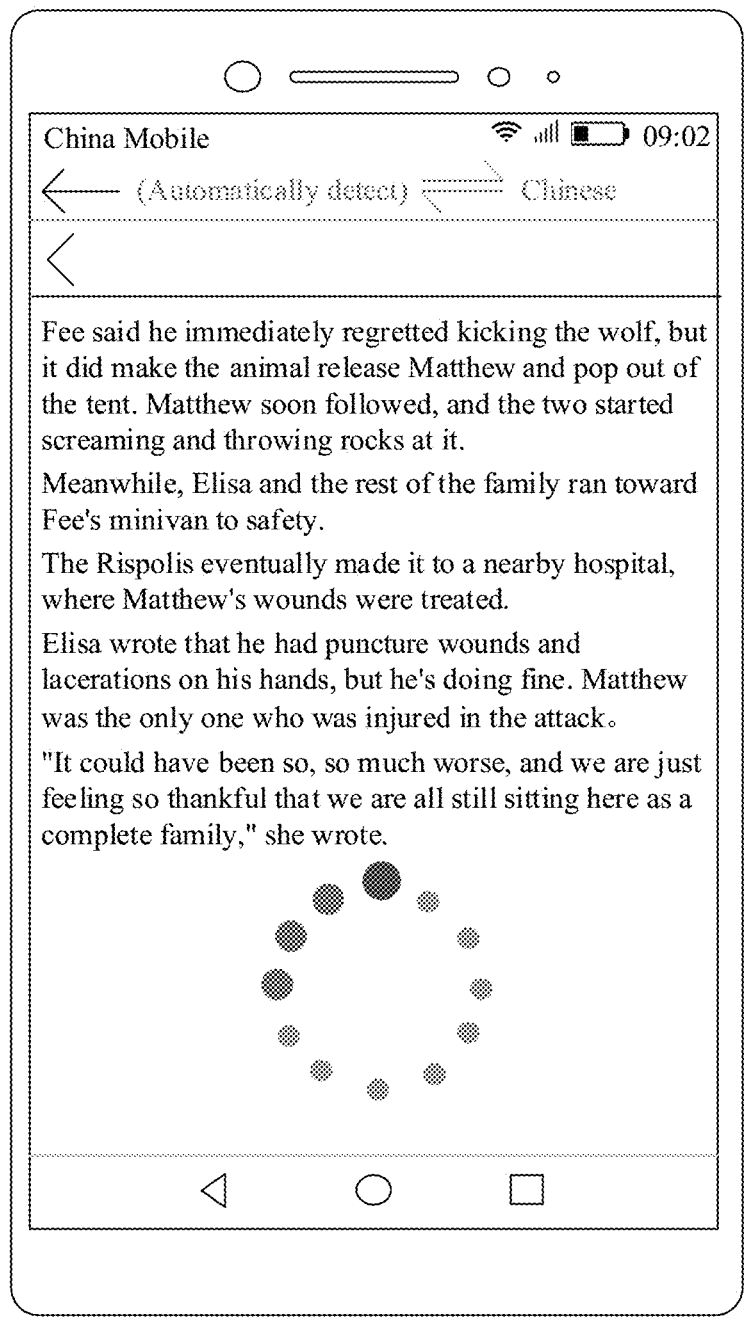

Referring to the GUI shown in FIG. 4(i), when detecting the tap operation of the user on the screen, the mobile phone may automatically display a GUI shown in FIG. 4(j).

Referring to the GUI shown in FIG. 4(j), the GUI is another loading interface of scrolling translation. The mobile phone may translate English on the long screenshot into corresponding Chinese. When translation is completed, the mobile phone may automatically display a GUI shown in FIG. 4(k).

Figure 4K:
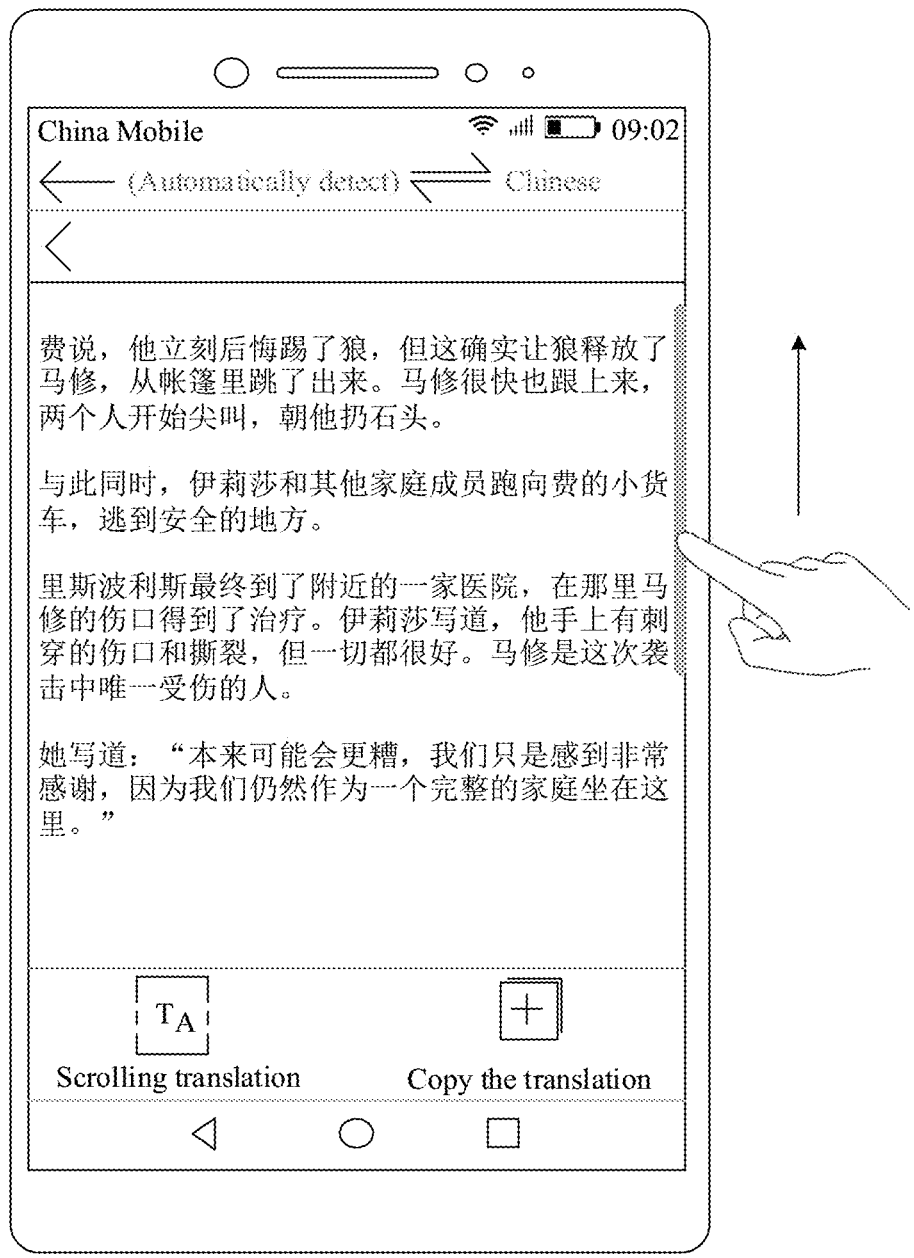

Referring to the GUI shown in FIG. 4(k), the GUI is a translation interface of scrolling translation. The mobile phone has translated the English essay on the long screenshot into corresponding Chinese. After the mobile phone detects an upward or downward sliding operation of the user on the screen, the mobile phone may display the translation content through scrolling.

Figure 4L:
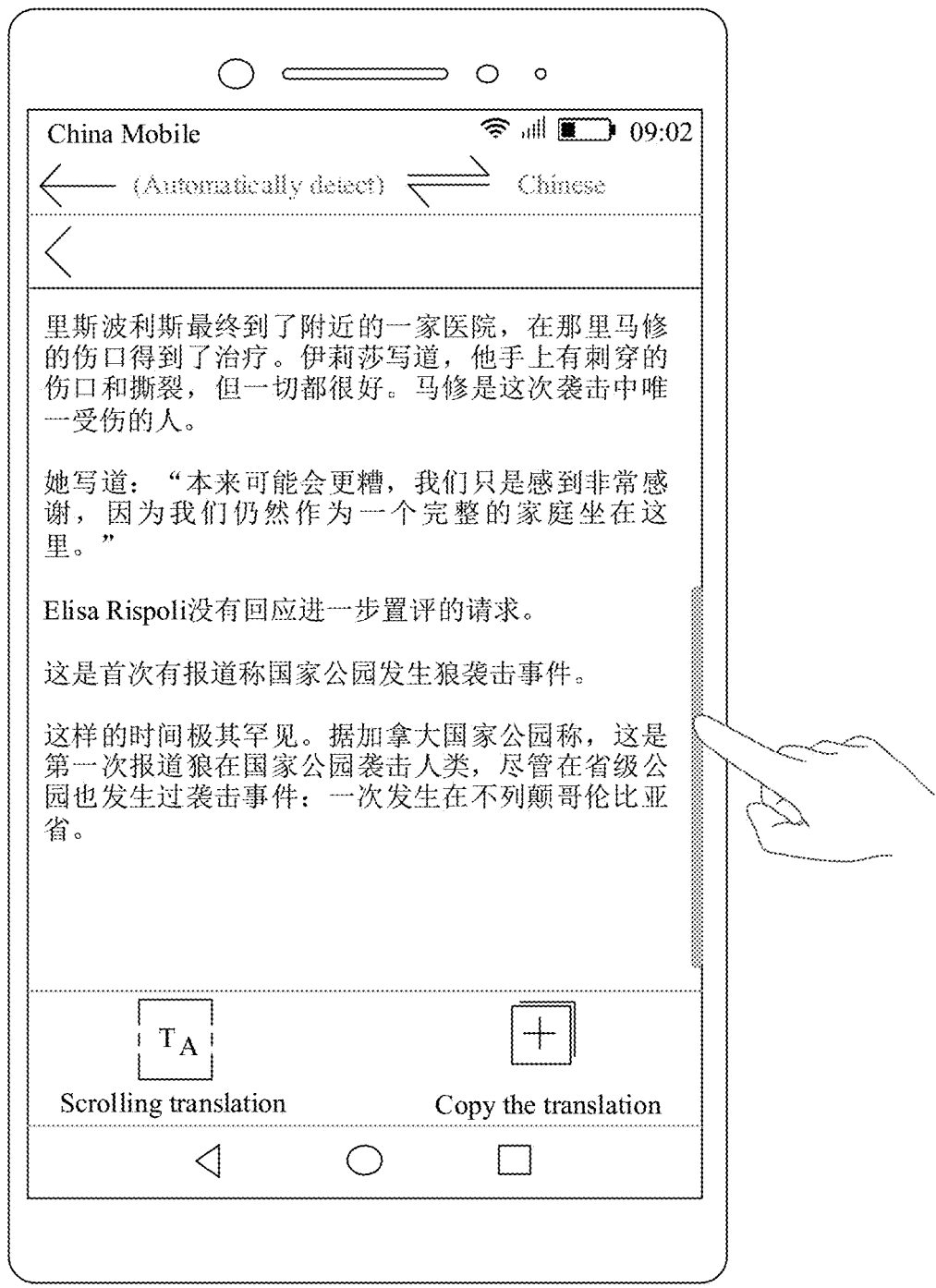

A process of changing from the GUI shown in FIG. 4(k) to a GUI shown in FIG. 4(l) is a process in which the user views a translation corresponding to multi-screen content obtained through the second long screenshot taking. After viewing, if the user expects to continue to view a translation corresponding to a remaining part of source text, the user may tap the "Scrolling translation" control 403. The mobile phone may perform the third scrolling translation. For a process of the third scrolling translation, refer to the foregoing process of the second scrolling translation. For brevity, details are not described herein again.

An embodiment of this application provides a machine translation method. A mobile phone first enables long screenshot taking in an interface that currently displays a first language (which may also be referred to as a source text), and automatically scrolls down a screen, and the mobile phone stops taking a long screenshot when detecting that a user can tap the screen. Then text data translated into a second language (which may also be referred to as a translation) is displayed in a new interface, and the user may view the text data through upward/downward sliding. Then the user may directly choose, in a translation interface, to continue to view subsequent content (a "Scrolling translation" button is provided in the interface for the user to tap). After the user taps the "Scrolling translation" button again, the mobile phone jumps to a source-text interface, and jumps to a location at which previous long screenshot taking is stopped (the mobile phone has memorized the location). The mobile phone may enable long screenshot taking and translation again starting from the location at which the previous long screenshot taking is stopped (or several lines before the location, where by retaining some redundant content, the user can recall where previous reading is stopped), to repeat the foregoing process until the end of the essay is reached. The method is not limited to translation of a web-based browser client, but may be further used in a non-browser scenario such as a third-party information APP, so that applicable scenarios are greatly expanded, and continuity of reading experience of the user is further ensured.

In this embodiment of this application, after the user triggers an operation of translating the source text, the electronic device may display a "Full-screen translation" option and a "Scrolling translation" option, so that a plurality of translation manners are provided for the user for selection, thereby improving user experience of translating the source text by the user.

The foregoing two groups of GUIs shown in FIG. 3(a) to FIG. 3(m) and FIG. 4(a) to FIG. 4(l) are a process of triggering long screenshot taking by tapping the "Scrolling translation" control and then translating one or more pictures obtained through long screenshot taking. With reference to FIG. 5(a) to FIG. 5(f), the following describes a process of first performing a long-screenshot operation and triggering translation of a long-screenshot picture in a processing interface of the obtained long-screenshot picture.

FIG. 5(a) to FIG. 5(f) show another group of GUIs according to an embodiment of this application.

Figure 5A:
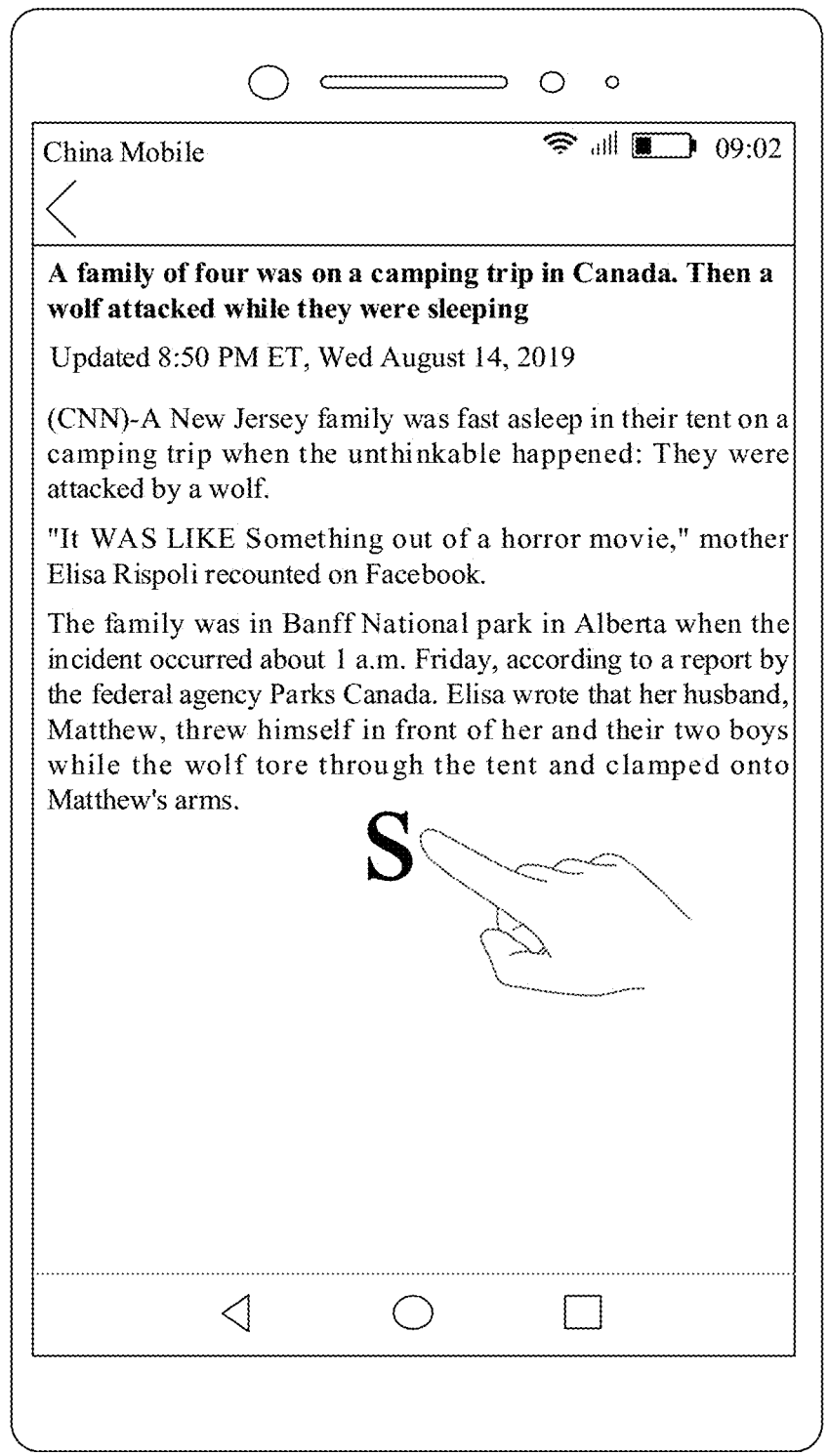
FIG. 5(a) to FIG. 5(f) show another group of GUIs according to an embodiment of this application.

Referring to a GUI shown in FIG. 5(a), the GUI is a display interface of the English essay 303. When the mobile phone detects that the user draws "S" with a knuckle in the interface, the mobile phone may enable a long-screenshot operation, and automatically display a GUI shown in FIG. 5(b).

Figure 5B:
Figure 5C:
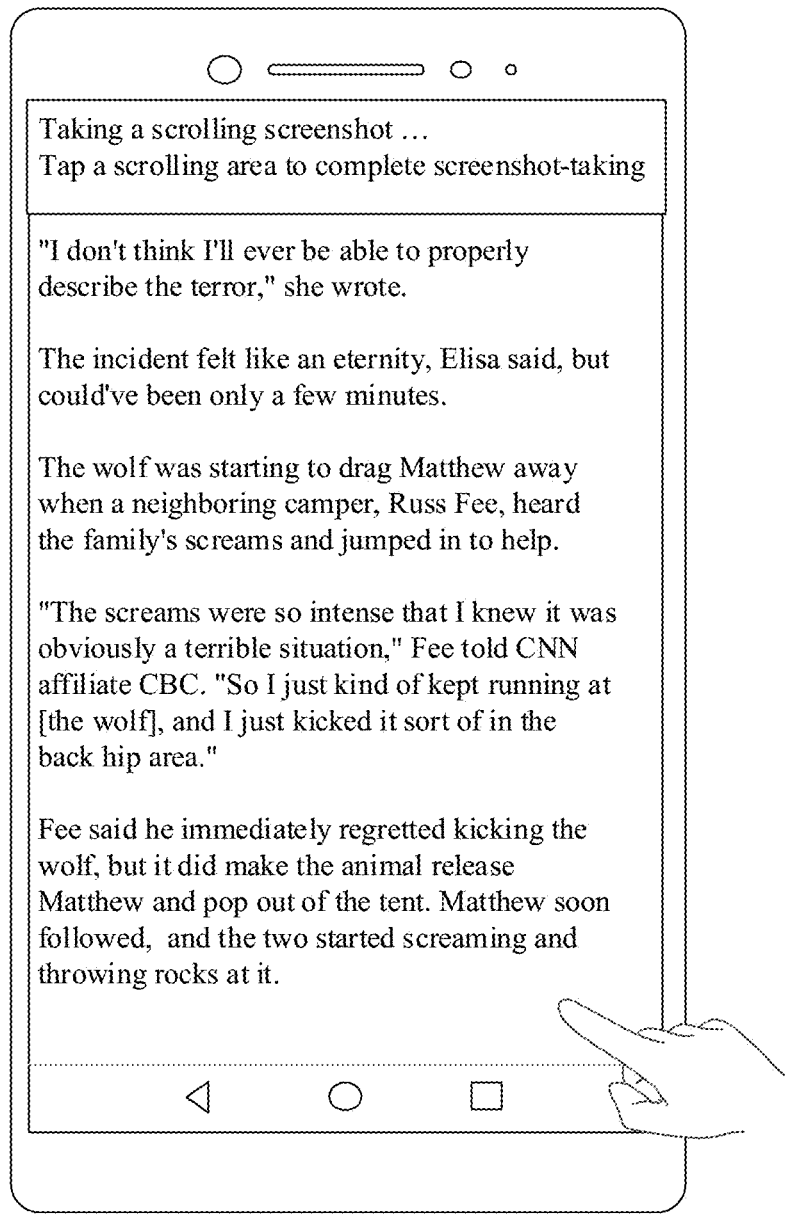
Figure 5D:
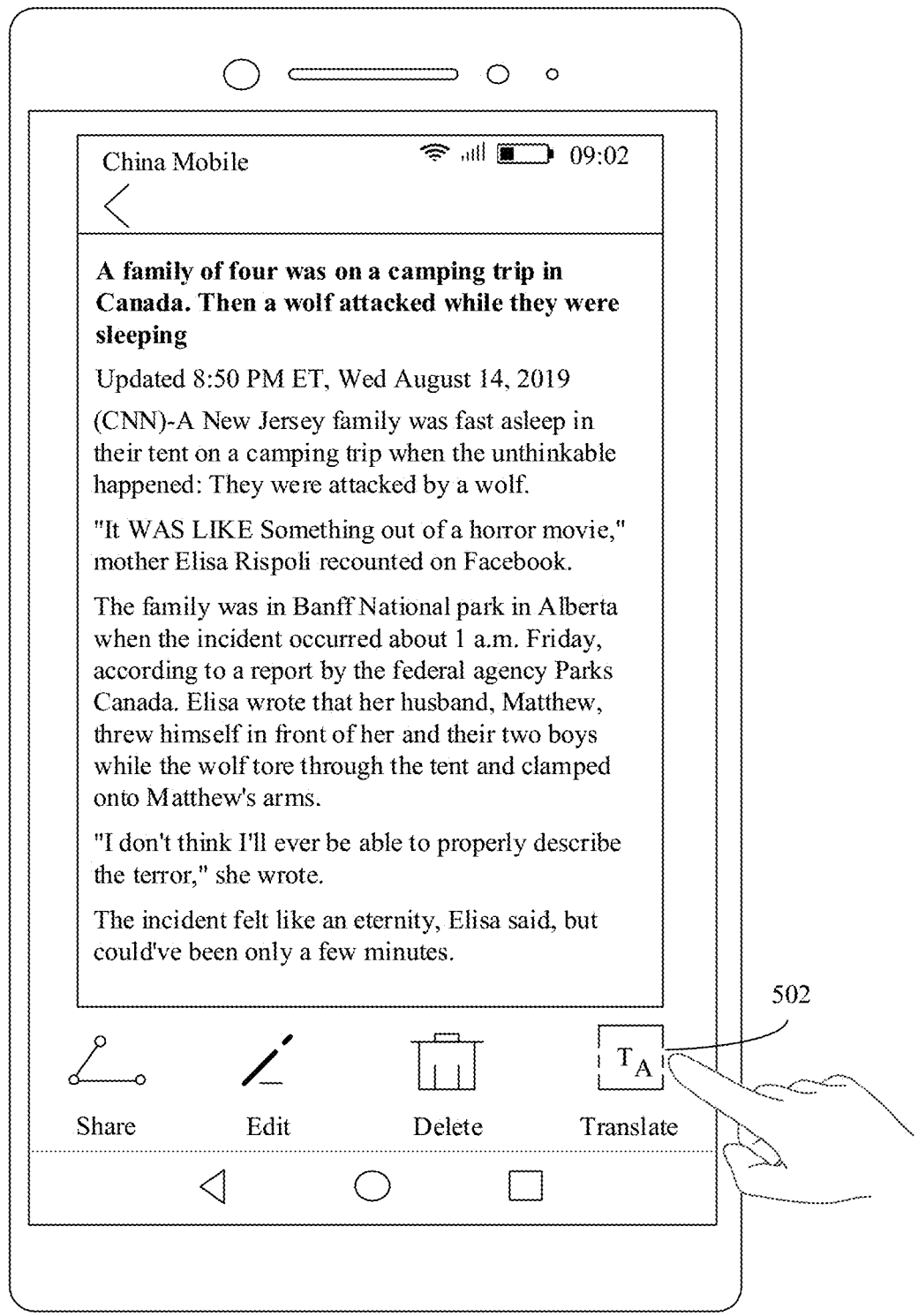
Figure 5E:
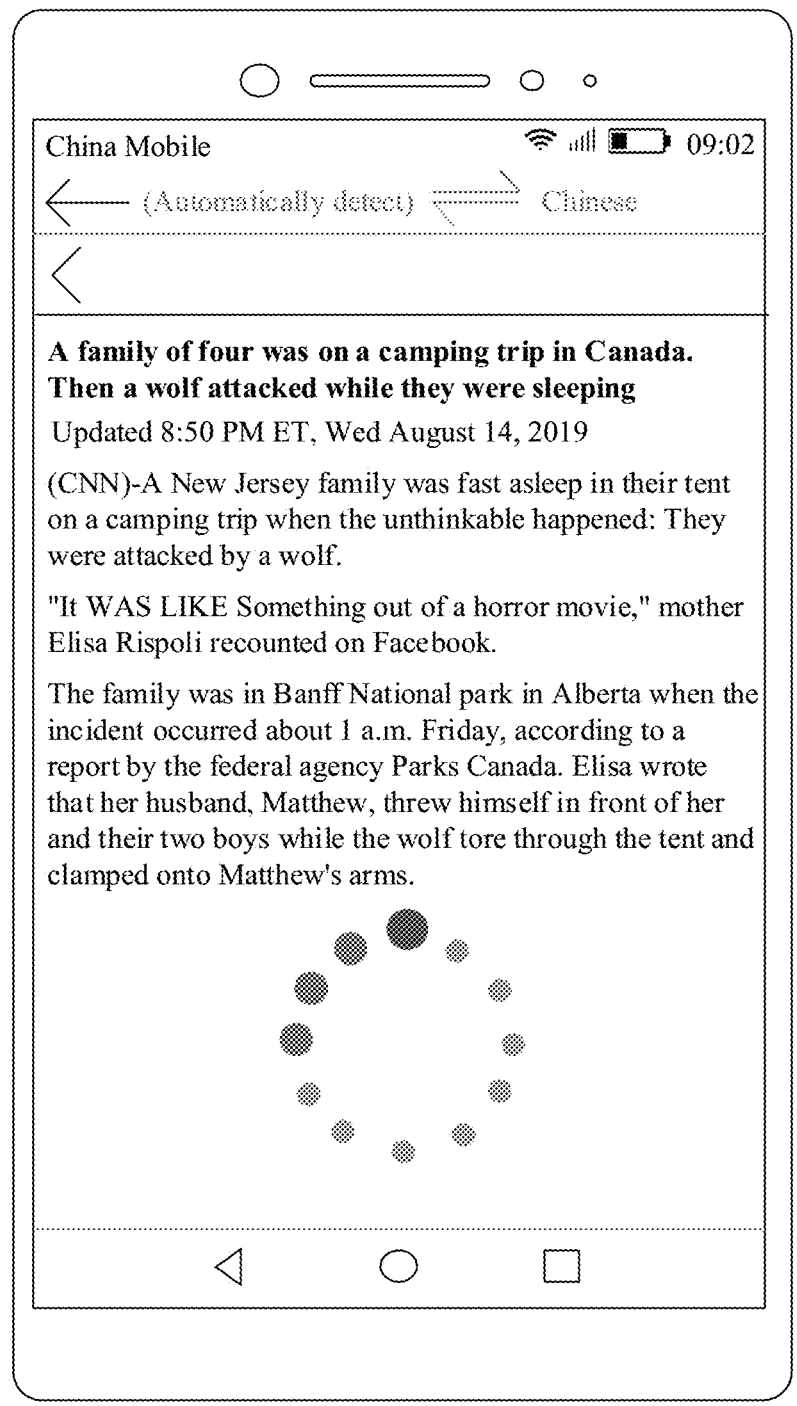
Figure 5F:
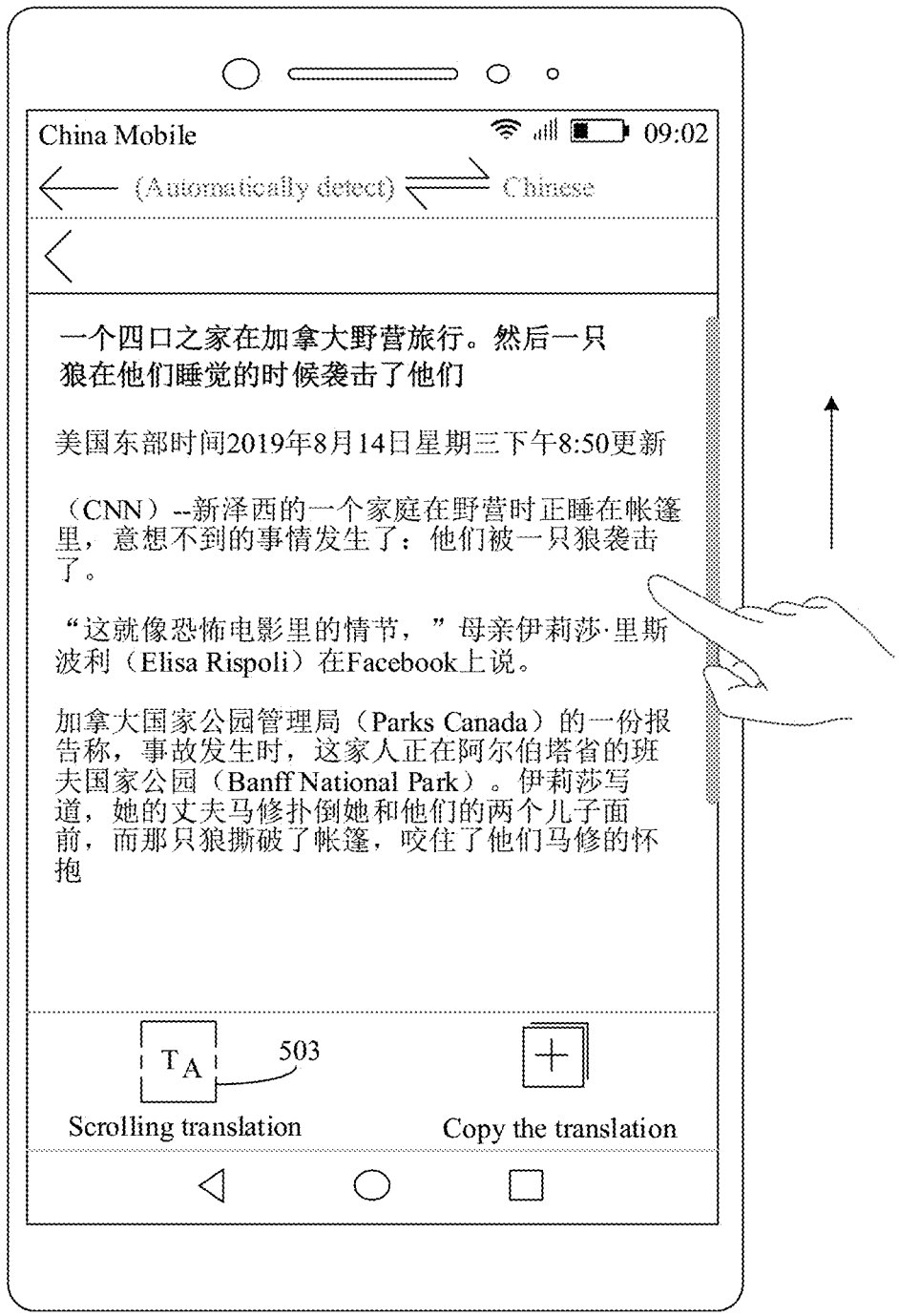
Figure 6A:
FIG. 6(a) to FIG. 6(d) show another group of GUIs according to an embodiment of this application.
Figure 6B:
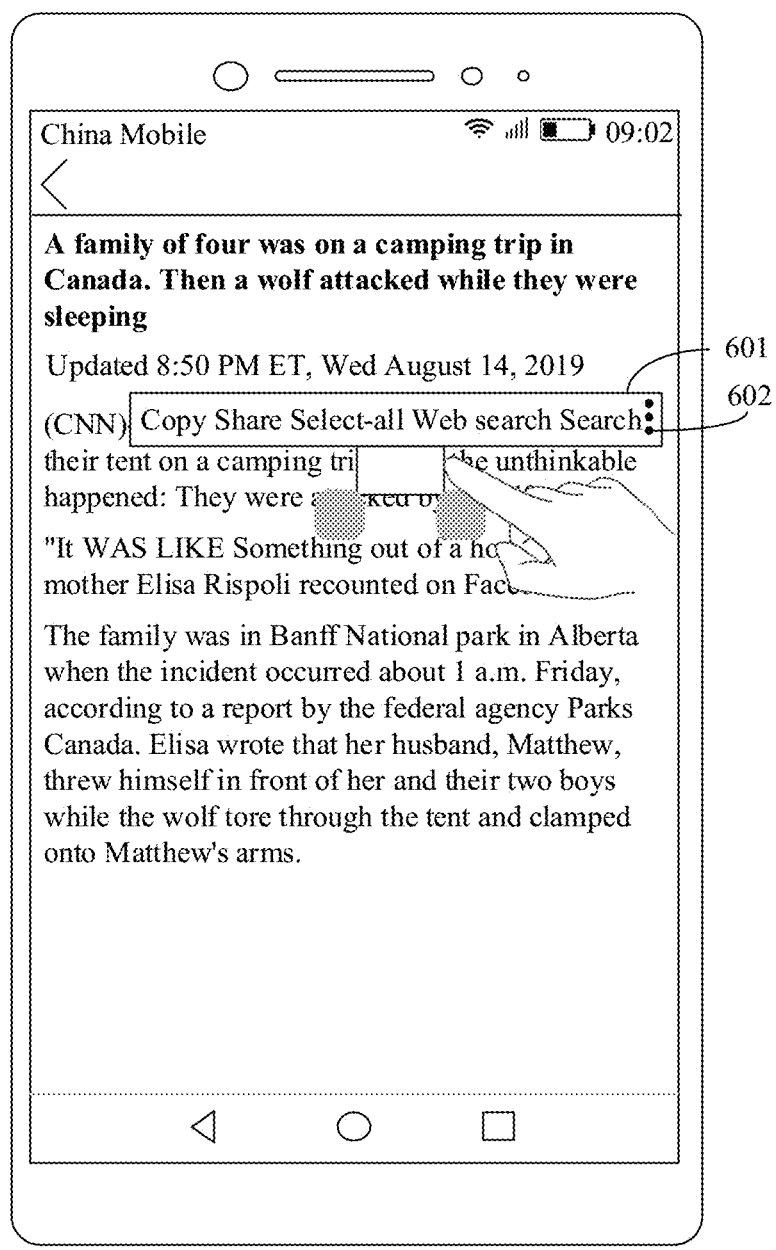
Figure 6C:
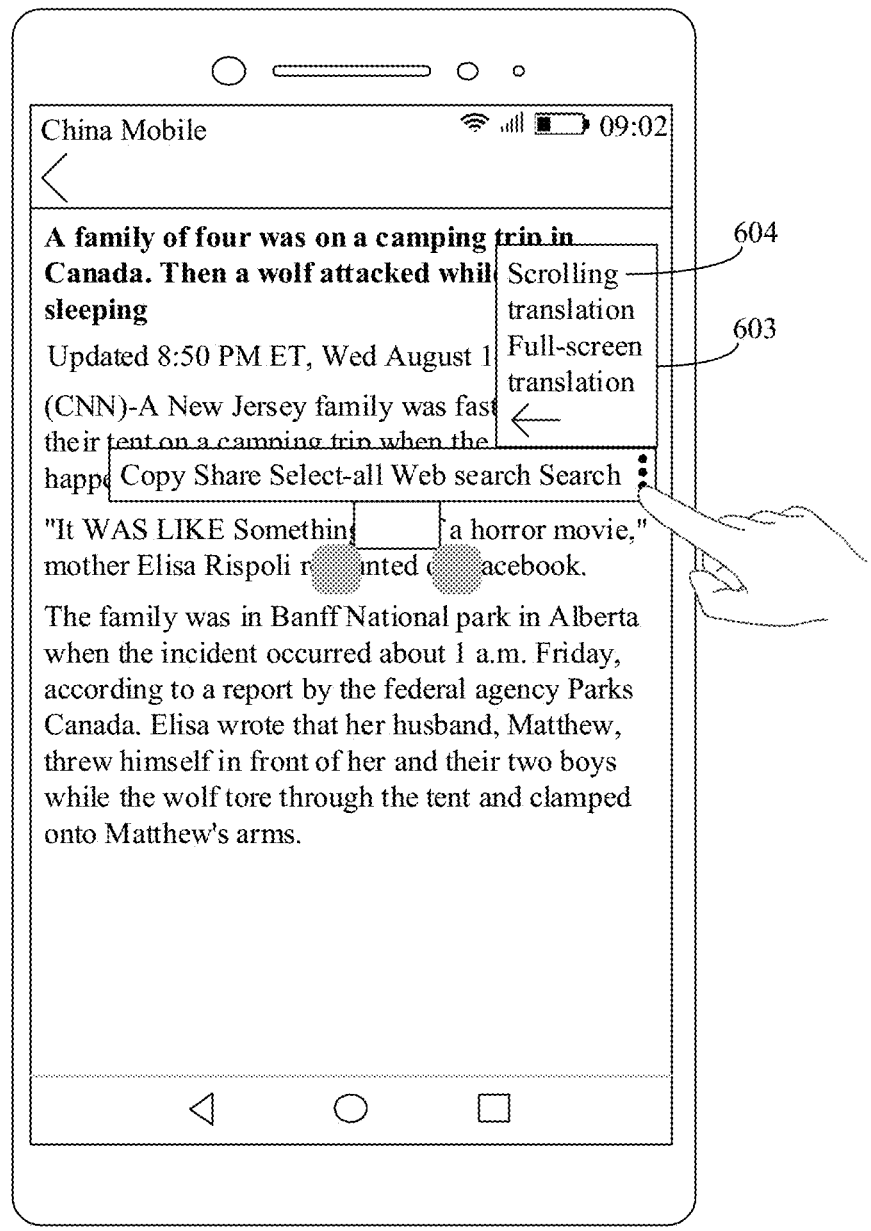
Figure 6D:
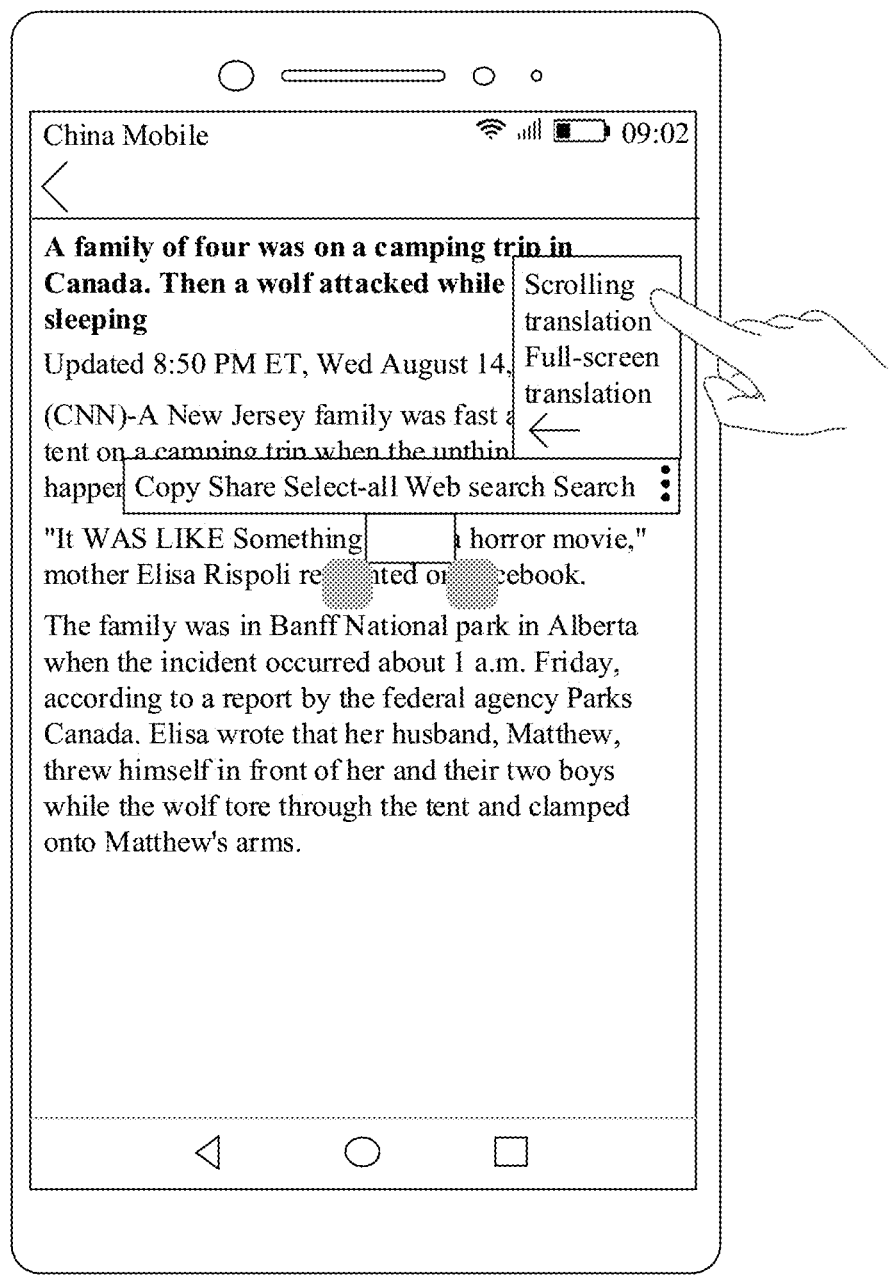
Figure 7A:
FIG. 7(a) to FIG. 7(d) show another group of GUIs according to an embodiment of this application.
Figure 7B:
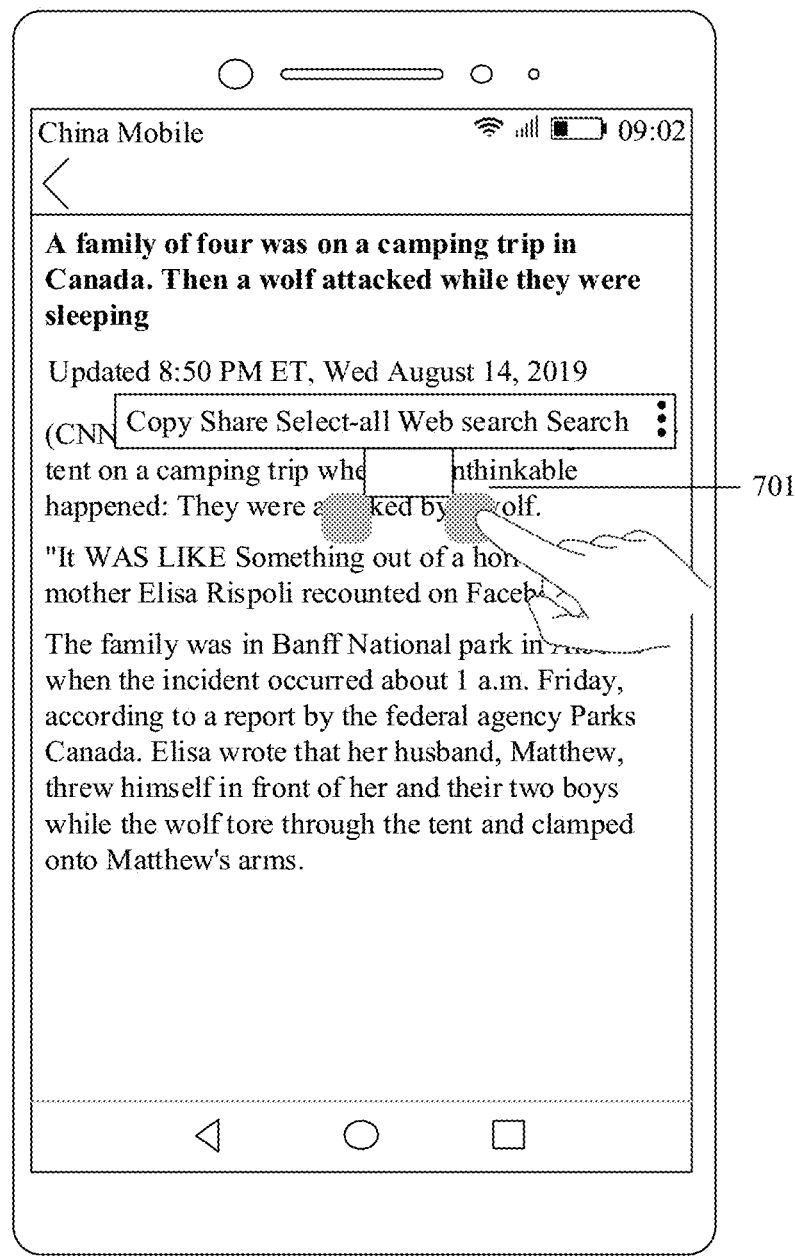
Figure 7C:
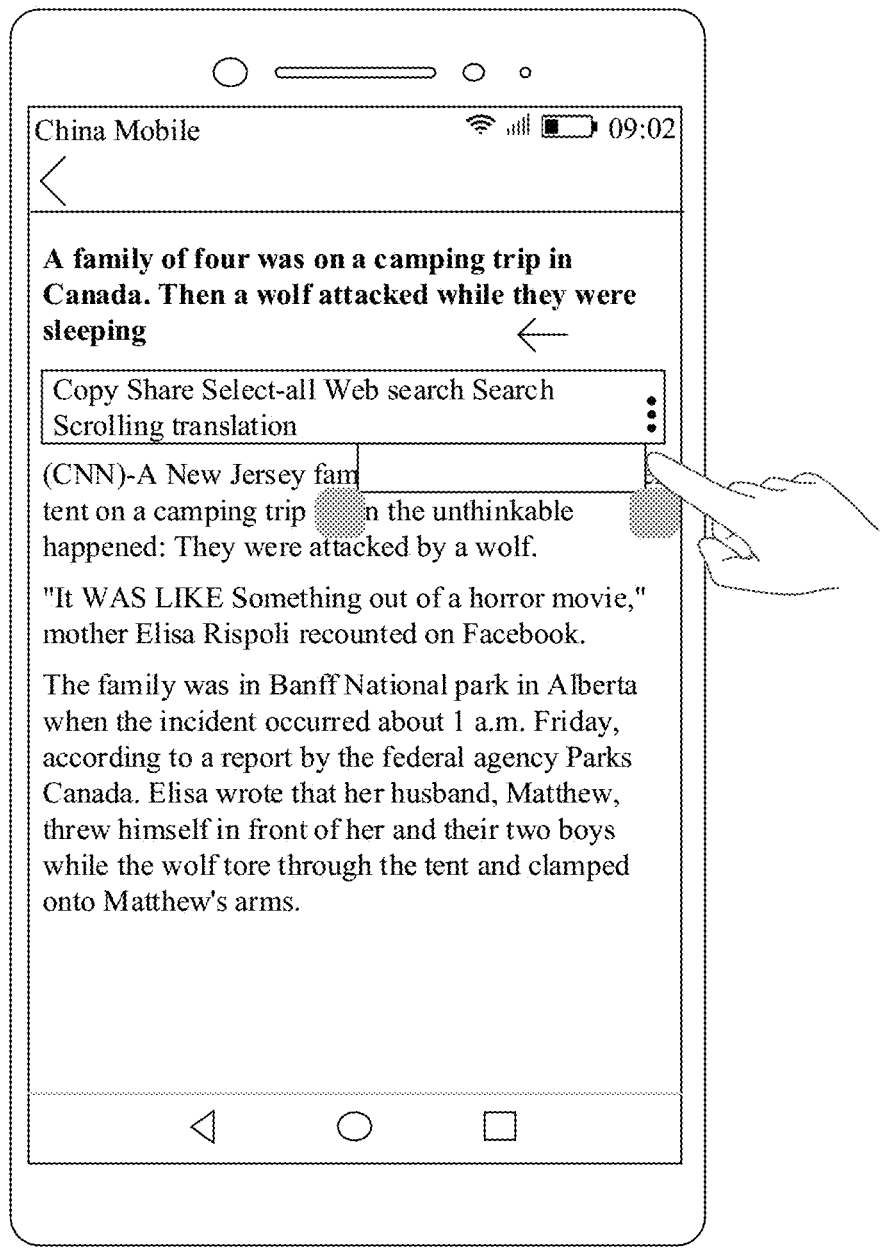
Figure 7D:
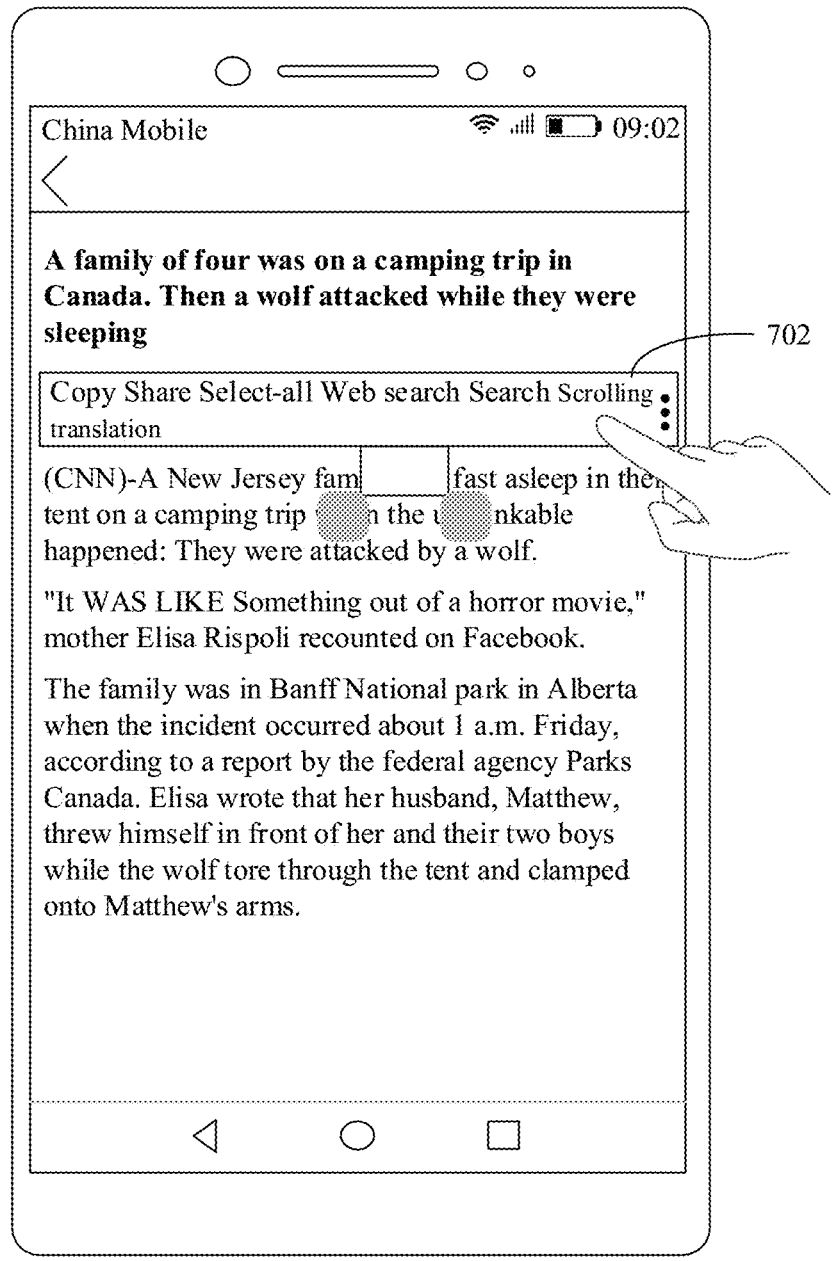

Referring to the GUI shown in FIG. 5(b), the GUI is a scrolling display interface of long screenshot taking. As shown in FIG. 5(b), the scrolling display interface of long screenshot taking may include a prompt box 501. In the prompt box 501, a text "Taking a scrolling screenshot . . . Tap a scrolling area to complete screenshot-taking" may be indicated to the user. The mobile phone may automatically scroll down the screen. For example, FIG. 5(*b*) and FIG. 5(*c*) show a process of automatically scrolling down the English essay.

Referring to a GUI shown in FIG. 5(*c*), the GUI is another scrolling display interface of long screenshot taking. When the mobile phone detects a tap action of the user on the screen, the mobile phone may complete a long-screenshot operation. The mobile phone may automatically display a GUI shown in FIG. 5(*d*).

Referring to the GUI shown in FIG. 5(*d*), the GUI is a processing interface of a picture obtained through long screenshot taking. The processing interface includes a processing manner of the picture obtained through long screenshot taking, and the processing manner includes sharing, edition, deletion, and translation. The user may share the picture obtained through long screenshot taking with another user by tapping "Share". Alternatively, the user may edit, by tapping "Edit", the picture obtained through long screenshot taking. For example, the user may perform edition processing such as brightness edition, exposure edition, and cropping on the picture. Alternatively, the user may delete, by tapping "Delete", the picture obtained through long screenshot taking. When the mobile phone detects an operation of tapping a control 502 corresponding to "Translate" by the user, the mobile phone may display a GUI shown in FIG. 5(*e*).

It should be understood that differences from FIG. 4(*d*) and FIG. 4(*i*) are as follows: In FIG. 4(*d*) and FIG. 4(*i*), translation is automatically performed after scrolling screenshot taking (or long screenshot taking) ends. In other words, after detecting that the user taps the "Scrolling translation" control, the mobile phone may automatically trigger two actions: scrolling screenshot taking (or long screenshot taking) and machine translation. In FIG. 5(*d*), machine translation is triggered after the operation of tapping the "Translate" control 502 by the user is detected in the processing interface of the picture obtained through long screenshot taking. In other words, the mobile phone needs to detect different trigger operations of the user, to perform long screenshot taking and machine translation.

Referring to the GUI shown in FIG. 5(*e*), the GUI is a translation loading interface of the picture obtained through long screenshot taking. The mobile phone may translate English on the picture obtained through long screenshot taking into corresponding Chinese. When translation is completed, the mobile phone may automatically display a GUI shown in FIG. 5(*f*).

Referring to the GUI shown in FIG. 5(*f*), the GUI is a translation interface of the picture obtained through long screenshot taking. The mobile phone has translated the English essay on the picture obtained through long screenshot taking into corresponding Chinese. After the mobile phone detects an upward or downward sliding operation of the user on the screen, the mobile phone may display the translation content through scrolling.

In an embodiment, if the user expects to continue to view a translation corresponding to remaining content in the English essay, the user may tap a "Scrolling translation" control 503 shown in FIG. 5(*f*), and the mobile phone may continue to perform a scrolling translation process. For the scrolling translation process, refer to the GUIs in FIG. 3(*a*) to FIG. 3(*m*) or FIG. 4(*a*) to FIG. 4(*l*).

FIG. 6(*a*) to FIG. 6(*d*) show another group of GUIs according to an embodiment of this application.

Referring to a GUI shown in FIG. 6(*a*), the GUI is a display interface of the English essay 303. When detecting a pressing operation performed by the user on a word "family" in the interface, the mobile phone may automatically display a GUI shown in FIG. 6(*b*).

Referring to the GUI shown in FIG. 6(*b*), the GUI is another display interface of the English essay 303. A prompt box 601 may automatically pop up in the display interface. The prompt box 601 includes "Copy", "Share", "Select-all", "Web search", "Search", and a control 602.

Referring to a GUI shown in FIG. 6(*c*), the GUI is another display interface of the English essay 303. After detecting an operation of tapping the control 602 by the user, the mobile phone may automatically display a prompt box 603. The prompt box 603 includes "Scrolling translation" and "Full-screen translation".

Referring to a GUI shown in FIG. 6(*d*), the GUI is another display interface of the English essay 303. After detecting an operation of tapping a "Scrolling translation" control 604 by the user, the mobile phone may perform scrolling translation. For subsequent GUI display, refer to FIG. 4(*c*) to FIG. 4(*g*). For brevity, details are not described herein again.

FIG. 7(*a*) to FIG. 7(*d*) show another group of GUIs according to an embodiment of this application.

Referring to a GUI shown in FIG. 7(*a*), the GUI is a display interface of the English essay 303. When detecting a pressing operation performed by the user on the word "family" in the interface, the mobile phone may automatically display a GUI shown in FIG. 7(*b*).

Referring to the GUI shown in FIG. 7(*b*), the GUI is another display interface of the English essay 303. In the display interface, the mobile phone may automatically select the word "family" and automatically display a prompt box 701. The prompt box 701 includes "Copy", "Share", "Select-all", "Web search", "Search", and the like. When the mobile phone detects that the user taps a cursor and slides the cursor to the right, the mobile phone may select more words and display a GUI shown in FIG. 7(*c*).

Referring to the GUI shown in FIG. 7(*c*), the GUI is another display interface of the English essay 303. In the display interface, the mobile phone may automatically select a plurality of words "family was fast asleep" based on a sliding operation of the user, and automatically add a "Scrolling translation" function option to the prompt box 701.

Referring to a GUI shown in FIG. 7(*d*), after detecting an operation of tapping a "Scrolling translation" control 702 by the user, the mobile phone may perform scrolling translation. For subsequent GUI display, refer to FIG. 4(*c*) to FIG. 4(*g*). For brevity, details are not described herein again.

In this embodiment of this application, to provide more prompts for the user, when performing the next scrolling translation (or long-screenshot translation) the mobile phone may further add, to the GUI, prompts for a start location of screenshot taking and a location at which previous reading is stopped.

FIG. 8(*a*) to FIG. 8(*e*) show another group of GUIs according to an embodiment of this application.

Referring to a GUI shown in FIG. 8(*a*), the GUI may be a translation interface of the first scrolling translation. The mobile phone has translated an English essay on a picture obtained through the first long screenshot taking into corresponding Chinese. After the mobile phone detects an upward or downward sliding operation of the user on the screen, the mobile phone may display the translation content through scrolling. When detecting, in the translation interface, an operation of tapping a control 801 by the user, the mobile phone may display a GUI shown in FIG. 8(*b*).

Referring to the GUI shown in FIG. 8(*b*), the GUI may be a display interface of the second scrolling translation. The display interface may include two pieces of prompt information for the user. One piece of prompt information is before a paragraph "Fee said he immediately . . . rocks at it". The mobile phone may indicate "Start location of current screenshot taking" to the user, and then indicate "Here is where previous reading is stopped" to the user after this paragraph.

Figure 8A:
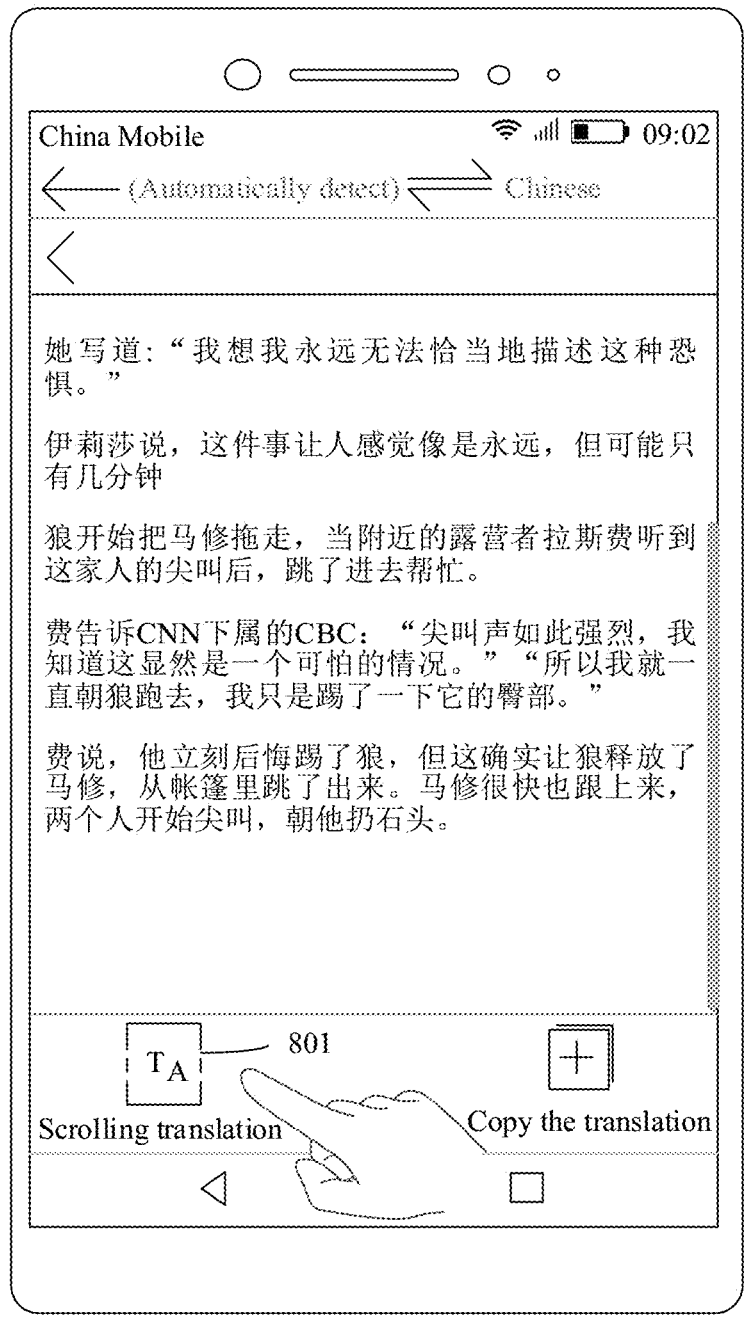
FIG. 8(a) to FIG. 8(e) show another group of GUIs according to an embodiment of this application.
Figure 8B:
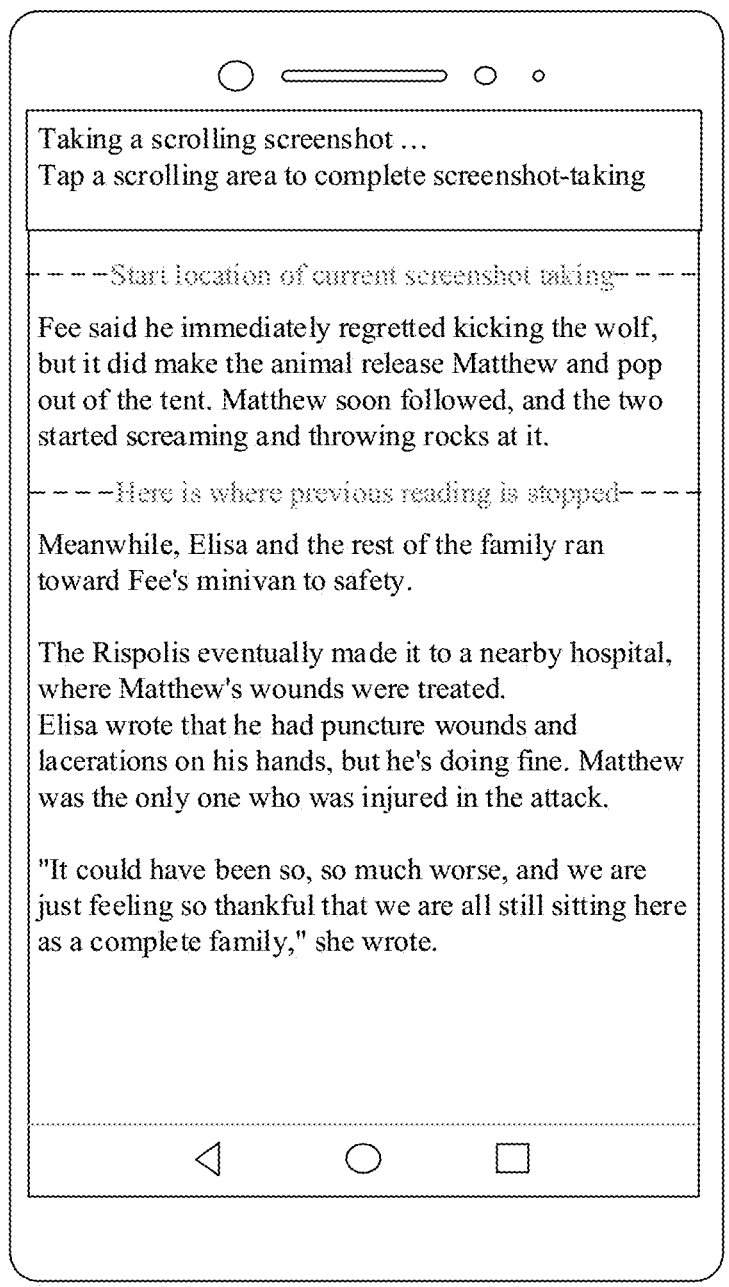
Figure 8C:
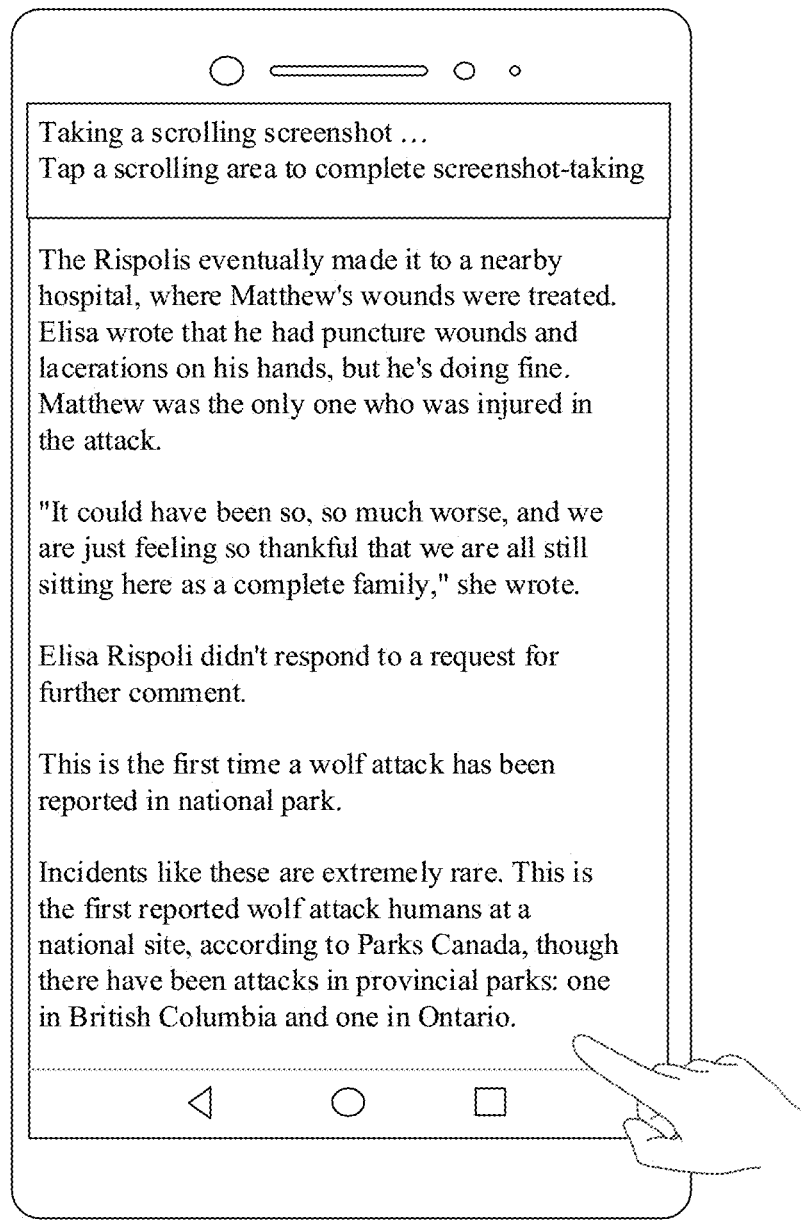

Referring to a GUI shown in FIG. 8(c), the GUI is another display interface of the second scrolling screenshot taking. When the mobile phone detects a tap operation of the user on the screen, the mobile phone may complete the second scrolling screenshot taking, and display a GUI shown in FIG. 8(d).

Figure 8D:
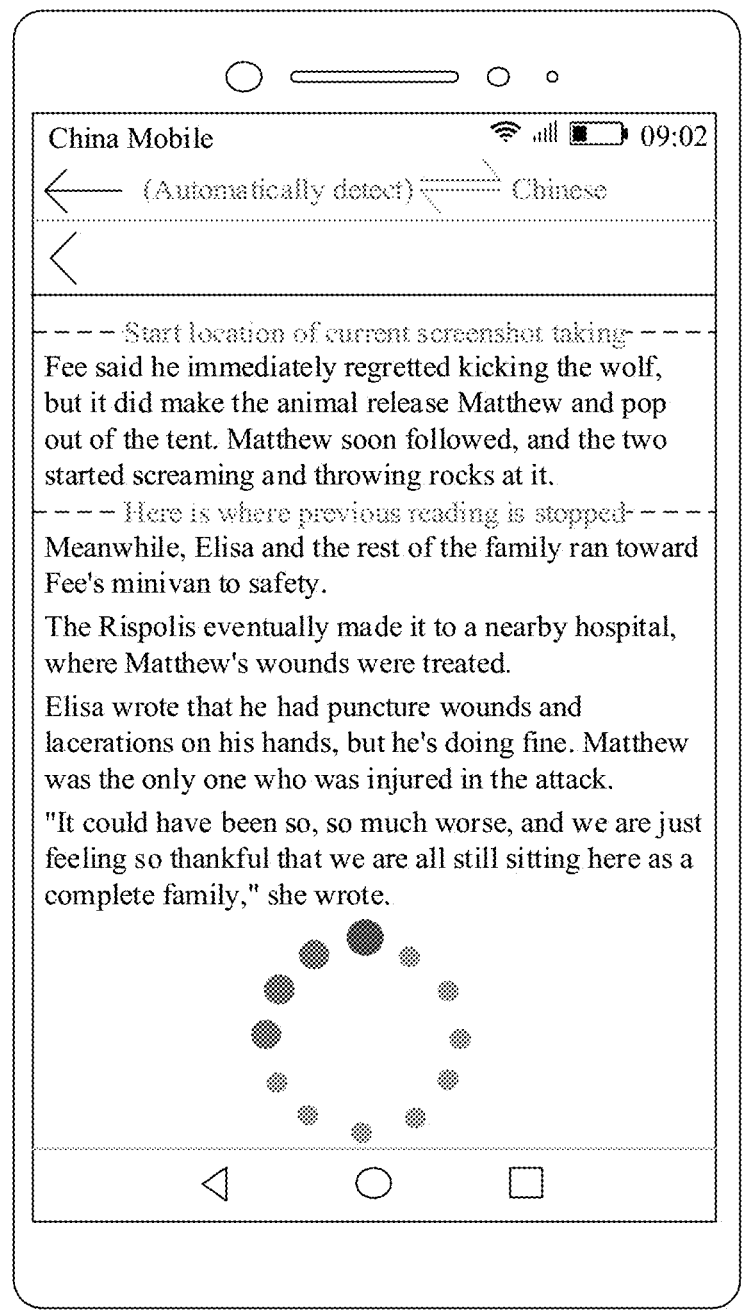

Referring to the GUI shown in FIG. 8(d), the GUI is a translation loading interface of the second scrolling screenshot taking. The foregoing prompt information may also be displayed in the loading interface, so that before reading a translation of the second scrolling screenshot taking, the user may first view a start point of the current scrolling screenshot taking and a location of a source text at which previous reading is stopped. In this way, the following advantage is achieved: Before reading the translation of the second scrolling screenshot taking, the user may be familiar with content of a source text in the second scrolling screenshot taking again. This has functions of evoking a memory and assisting in continuous reading for the user.

Figure 8E:
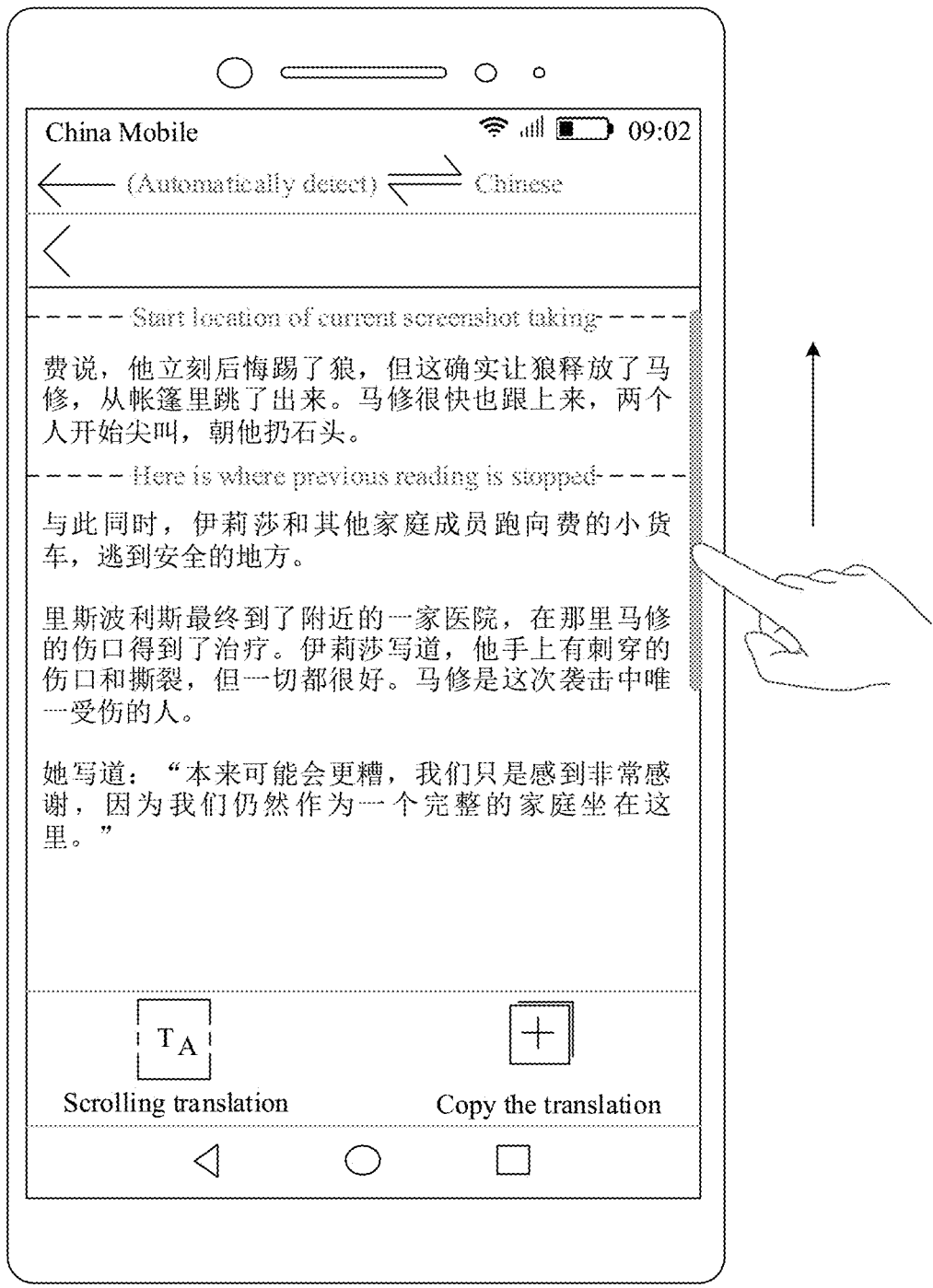

Referring to a GUI shown in FIG. 8(e), the GUI is a translation display interface of the second scrolling screenshot taking. The foregoing prompt information may also be displayed in the translation display interface.

In an embodiment, the mobile phone may display only one of the foregoing two pieces of prompt information.

For example, only the prompt information "Here is where previous reading is stopped" may be displayed in FIG. 8(b), FIG. 8(d), and FIG. 8(e).

For example, only the prompt information "Start location of current screenshot taking" may be displayed in FIG. 8(b), FIG. 8(d), and FIG. 8(e).

FIG. 9(a) to FIG. 9(f) show another group of GUIs according to an embodiment of this application.

Figure 9A:
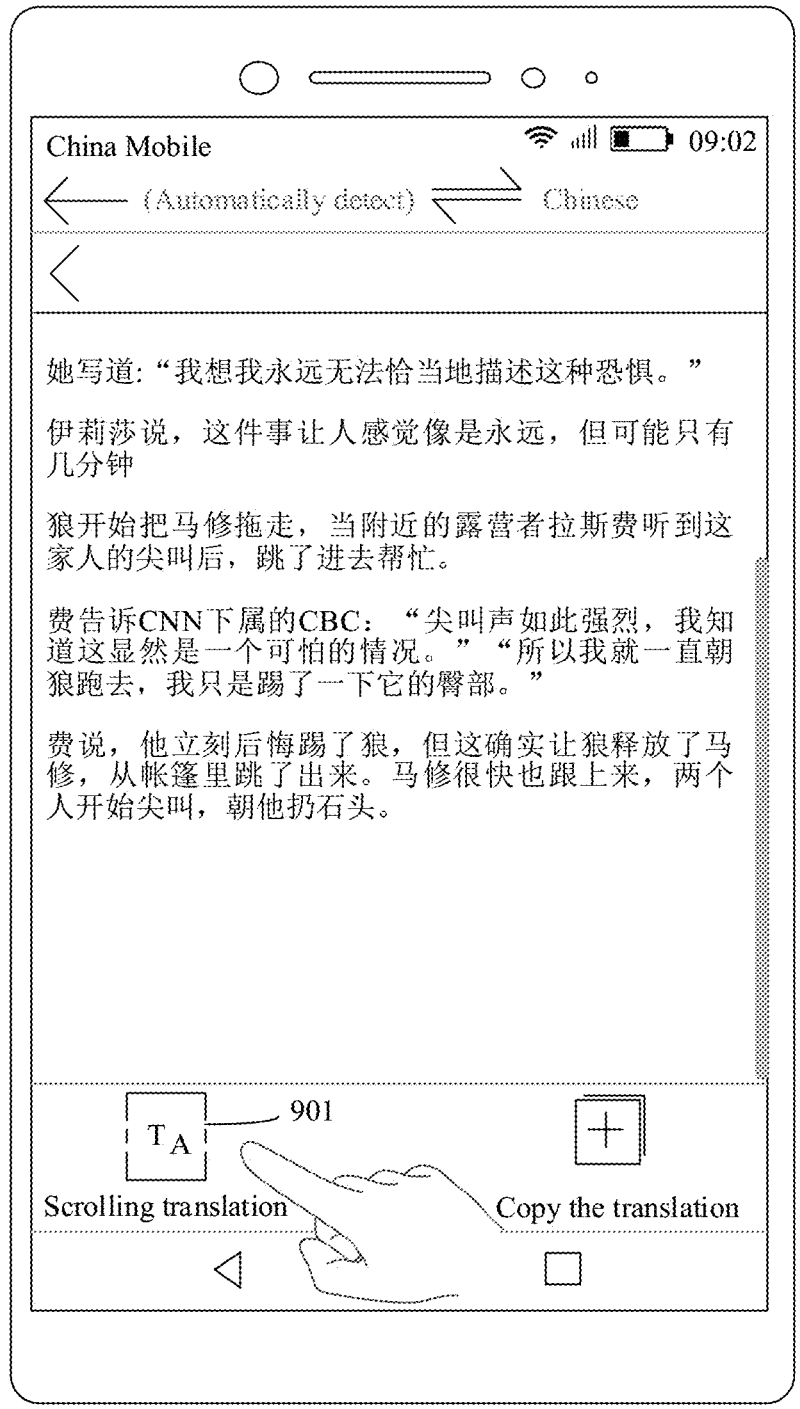
FIG. 9(a) to FIG. 9(f) show another group of GUIs according to an embodiment of this application.

Referring to a GUI shown in FIG. 9(a), the GUI may be a translation interface of the first scrolling translation. When detecting, in the translation interface, an operation of tapping a control 901 by the user, the mobile phone may display a GUI shown in FIG. 9(b).

Figure 9B:
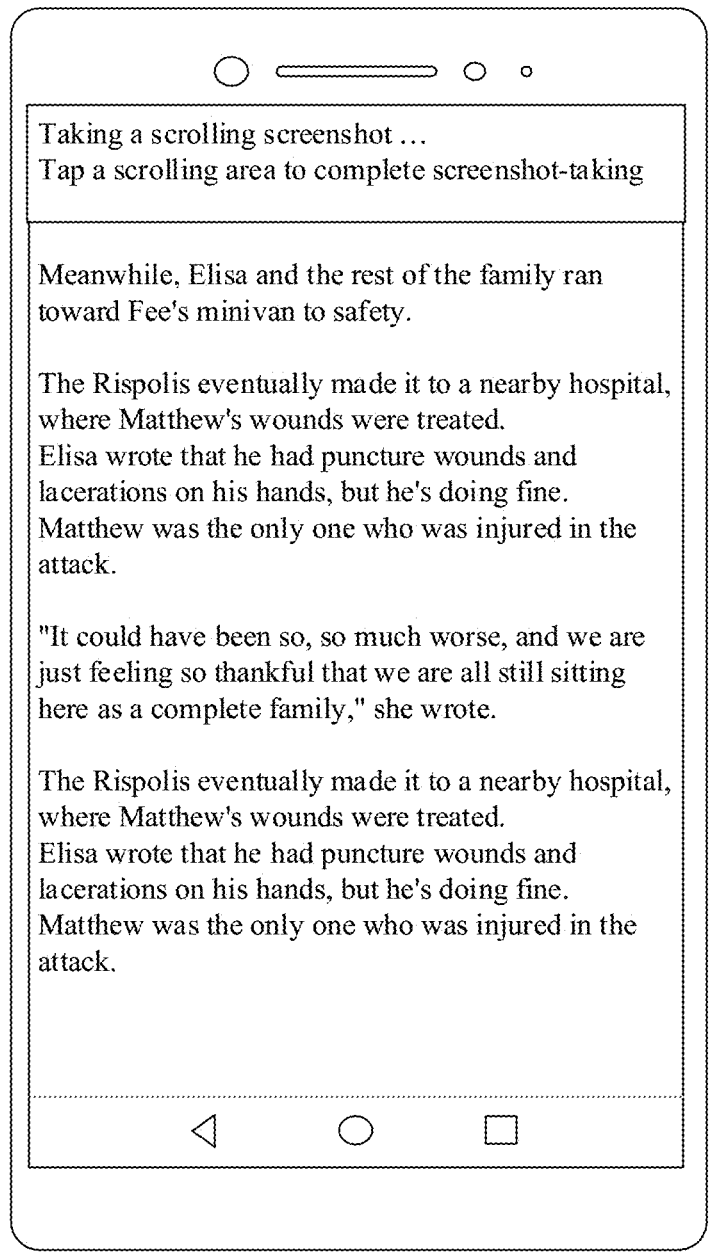

Referring to the GUI shown in FIG. 9(b), the GUI may be a display interface of the second scrolling translation. In comparison with FIG. 4(h), the second scrolling screenshot taking does not include any content in previous scrolling screenshot taking, that is, the second scrolling screenshot taking may not include any redundant source text content.

Figure 9C:
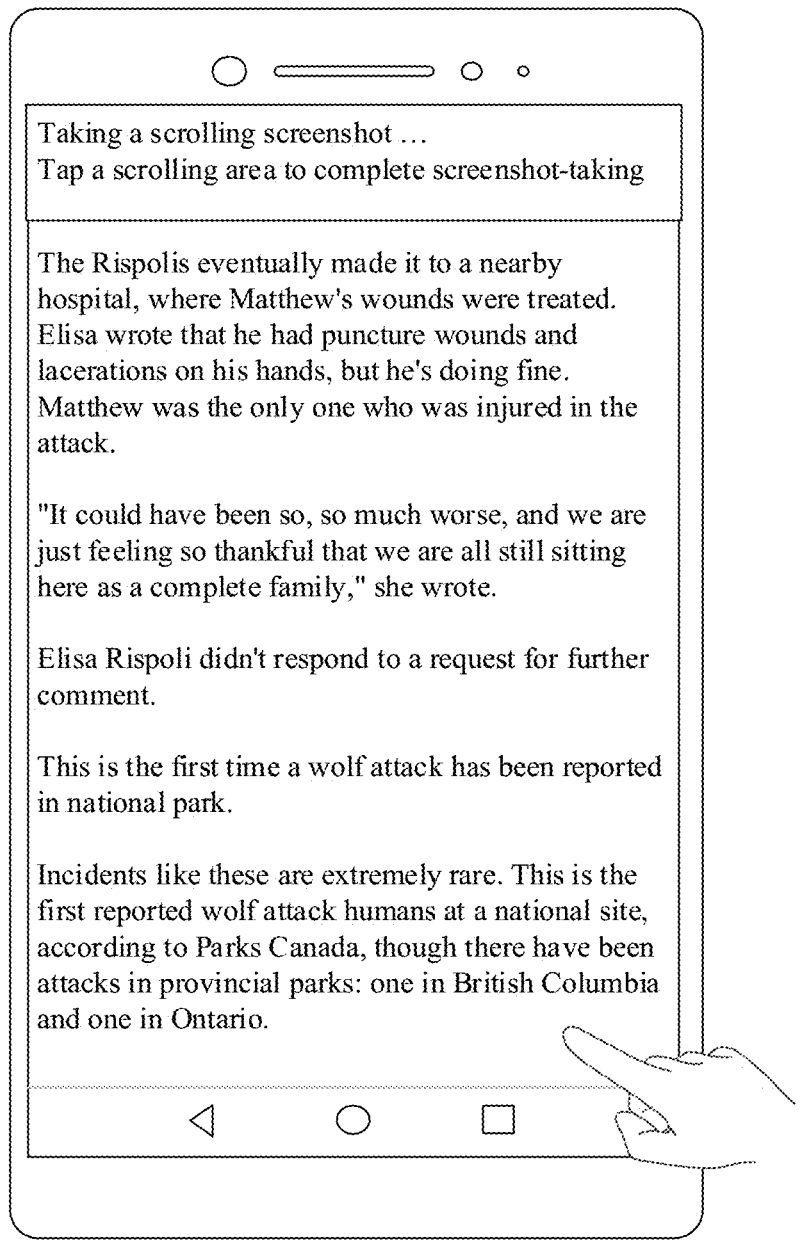

Referring to a GUI shown in FIG. 9(c), the GUI is another display interface of the second scrolling screenshot taking. When the mobile phone detects a tap operation of the user on the screen, the mobile phone may complete the second scrolling screenshot taking, and display a GUI shown in FIG. 9(d).

Figure 9D:
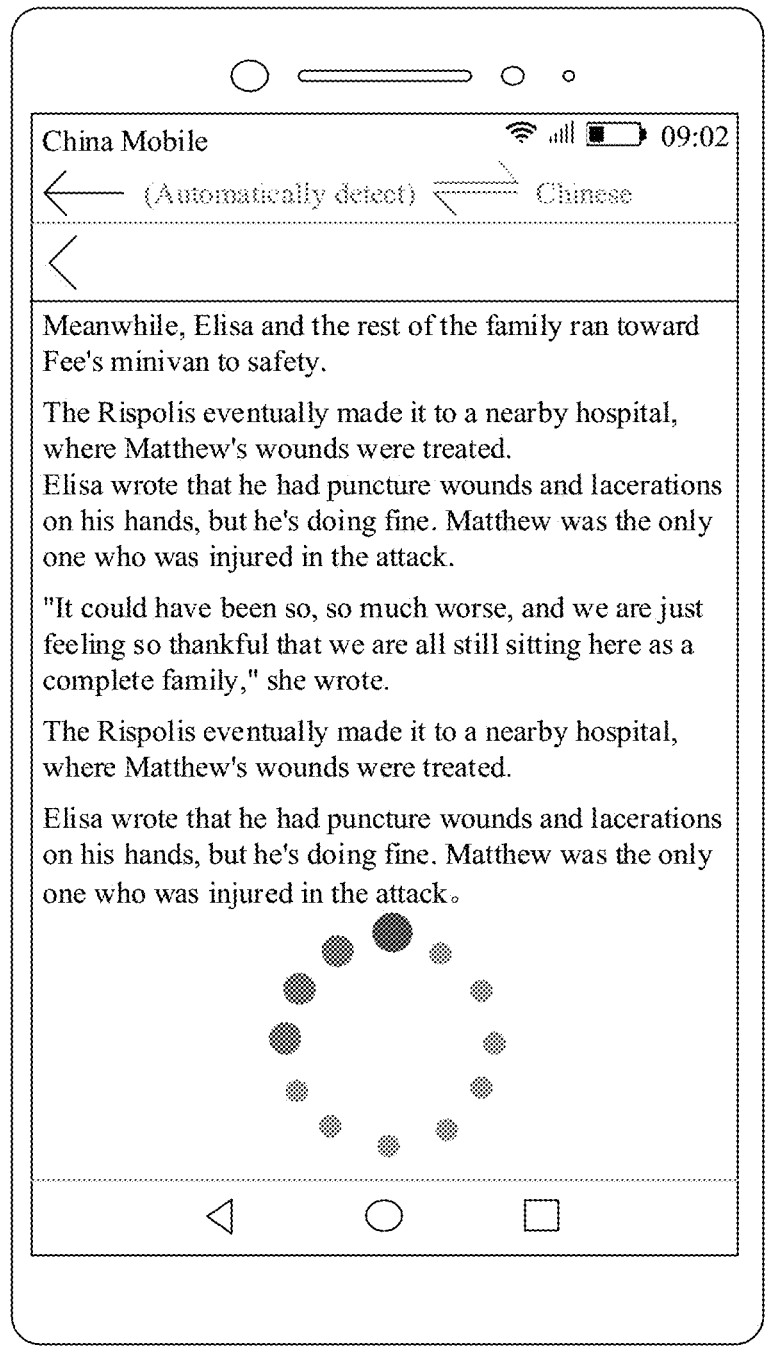

Referring to the GUI shown in FIG. 9(d), the GUI is a translation loading interface of the second scrolling screenshot taking.

Figure 9E:
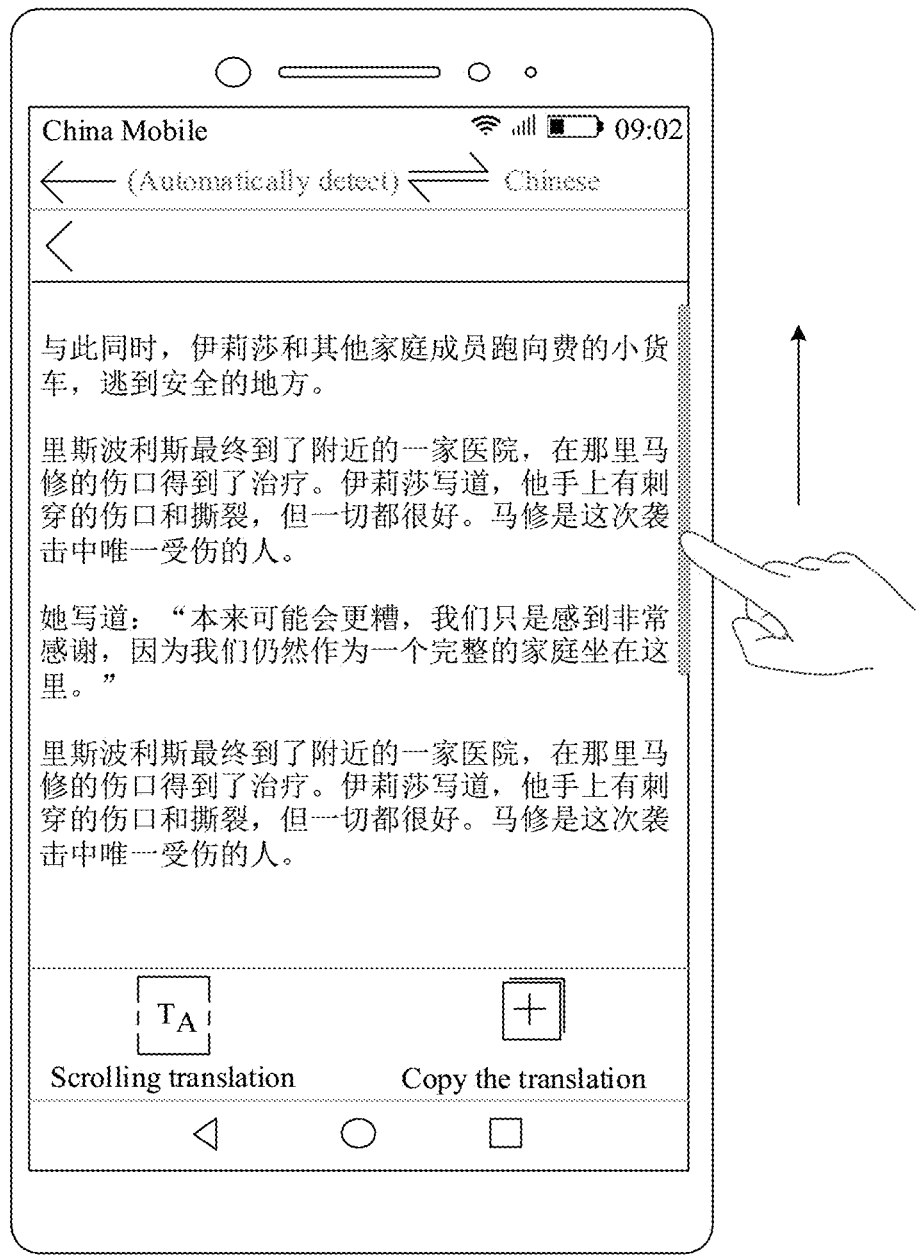

Referring to a GUI shown in FIG. 9(e), the GUI is a translation display interface of the second scrolling screenshot taking. Translation content displayed in the translation display interface does not include translation content of the first scrolling screenshot taking, either.

Figure 9F:
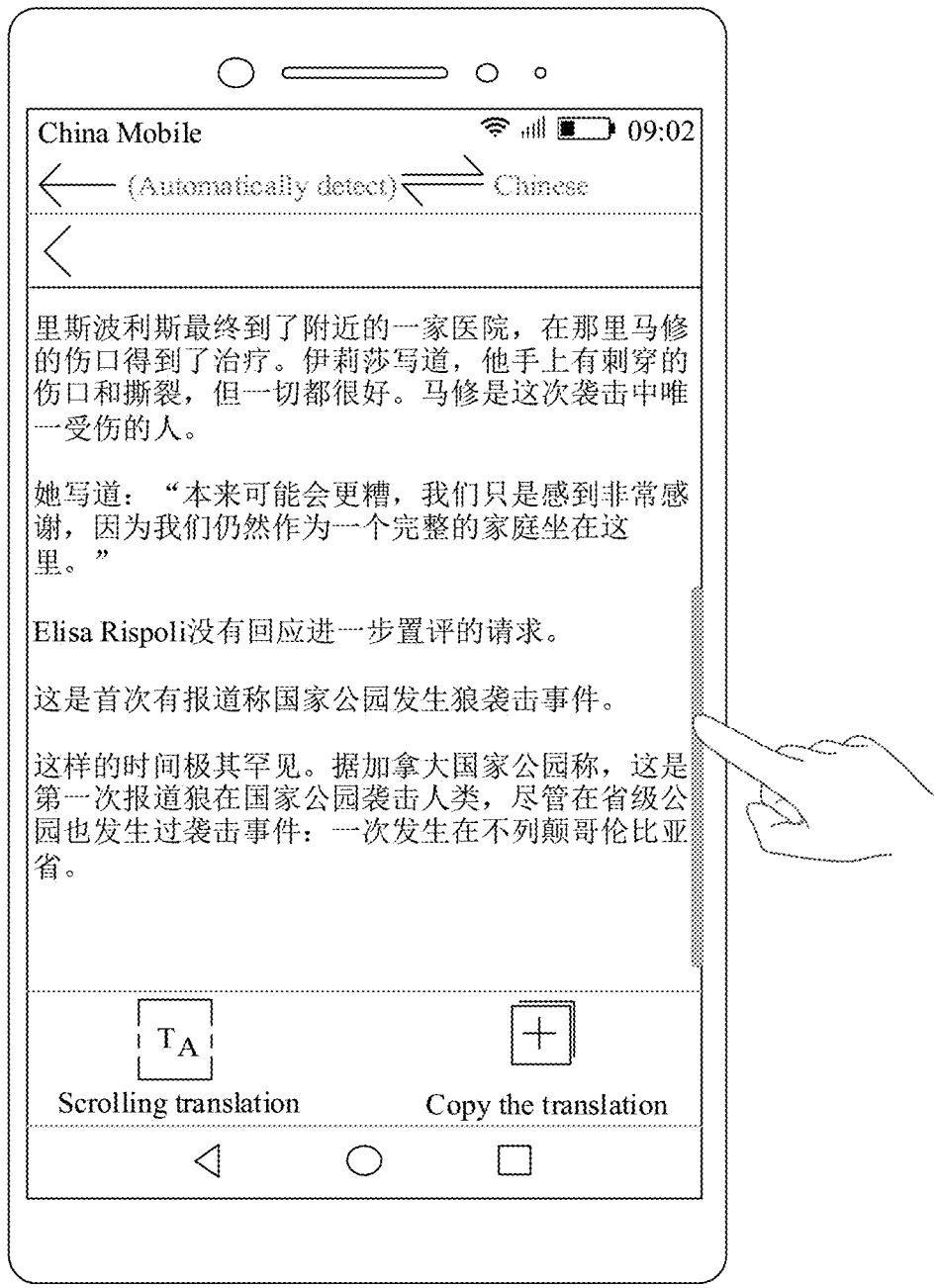

FIG. 9(e) to FIG. 9(f) show a process in which the mobile phone displays the translation content through scrolling. When the mobile phone detects an upward or downward sliding operation of the user, the mobile phone may display the translation content through scrolling.

In the GUIs shown in FIG. 3(a) to FIG. 9(f), when the first full-screen translation is completed and the next scrolling translation is performed, the electronic device needs to switch back to a display interface of a source text for scrolling translation, and then switch back to a translation interface, so that the user can view desired translation content. In this embodiment of this application, after the electronic device performs full-screen translation or scrolling translation once, if the electronic device detects an operation of tapping a "Scrolling translation" control by the user, the electronic device may not switch to a source-text interface, but may directly load a remaining part of source text in the background, take a scrolling screenshot of the remaining part of source text, and obtain a part or all of a translation of the remaining part of source text. The user may continue to read a subsequent translation in a translation interface without switching between a plurality of interfaces, so that continuity of reading experience of the user is improved.

FIG. 10(a) to FIG. 10(e) show another group of GUIs according to an embodiment of this application.

Figure 10A:
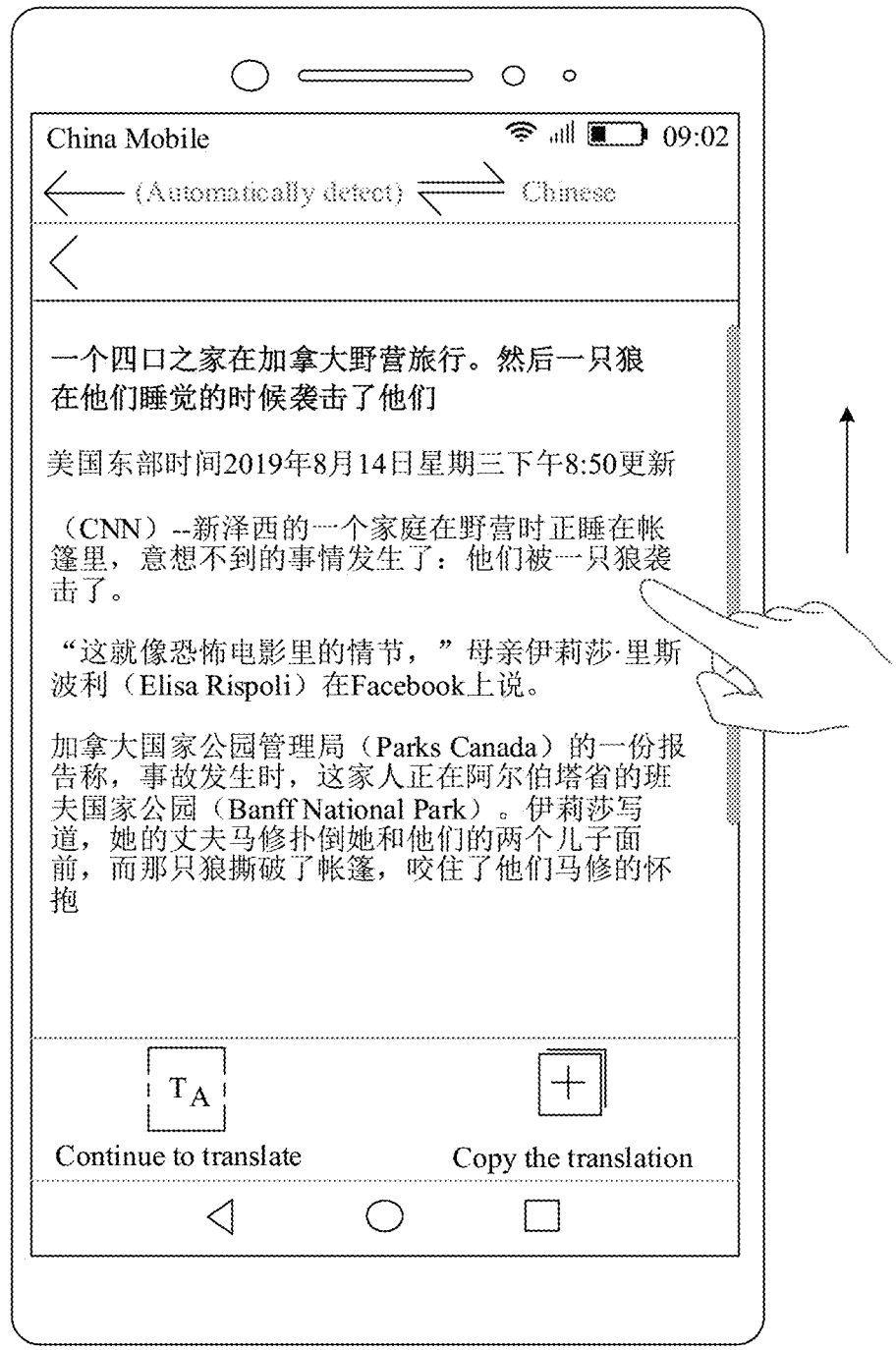
FIG. 10(a) to FIG. 10(e) show another group of GUIs according to an embodiment of this application.

Referring to a GUI shown in FIG. 10(a), the GUI is a translation display interface obtained after the user performs the first scrolling translation, and the user may view translation content of the first scrolling translation by performing upward sliding with a finger.

For example, FIG. 10(a) may show a GUI obtained based on FIG. 4(a) to FIG. 4(f).

Figure 10B:
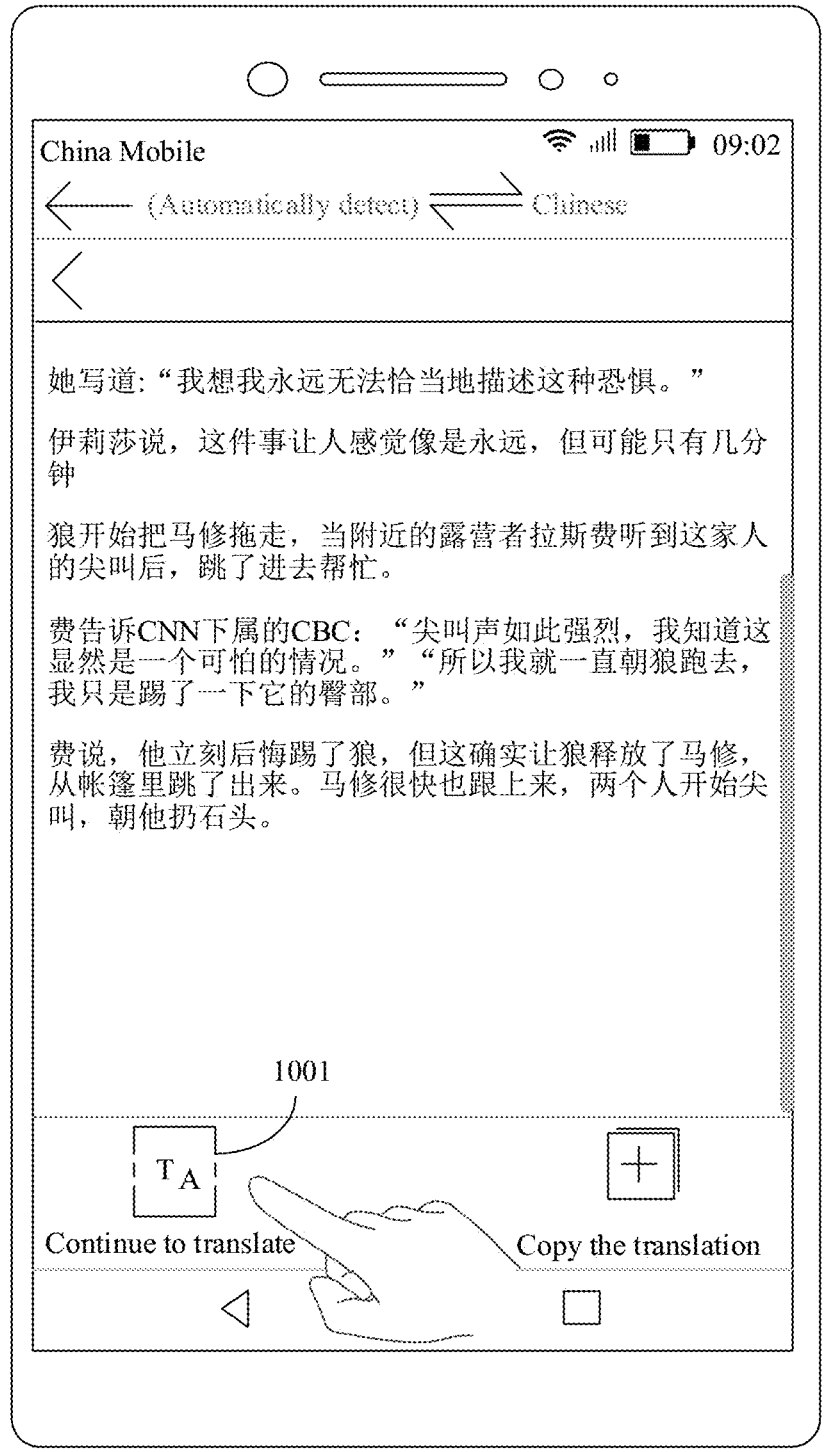

Referring to a GUI shown in FIG. 10(b), the GUI is a translation display interface obtained after the user performs the first scrolling translation. It can be learned that an end paragraph of the first scrolling translation is "费说 . . . 朝他扔石头,". After the mobile phone detects an operation of tapping a control 1001 by the user, the mobile phone may display a GUI shown in FIG. 10(c).

Figure 10C:
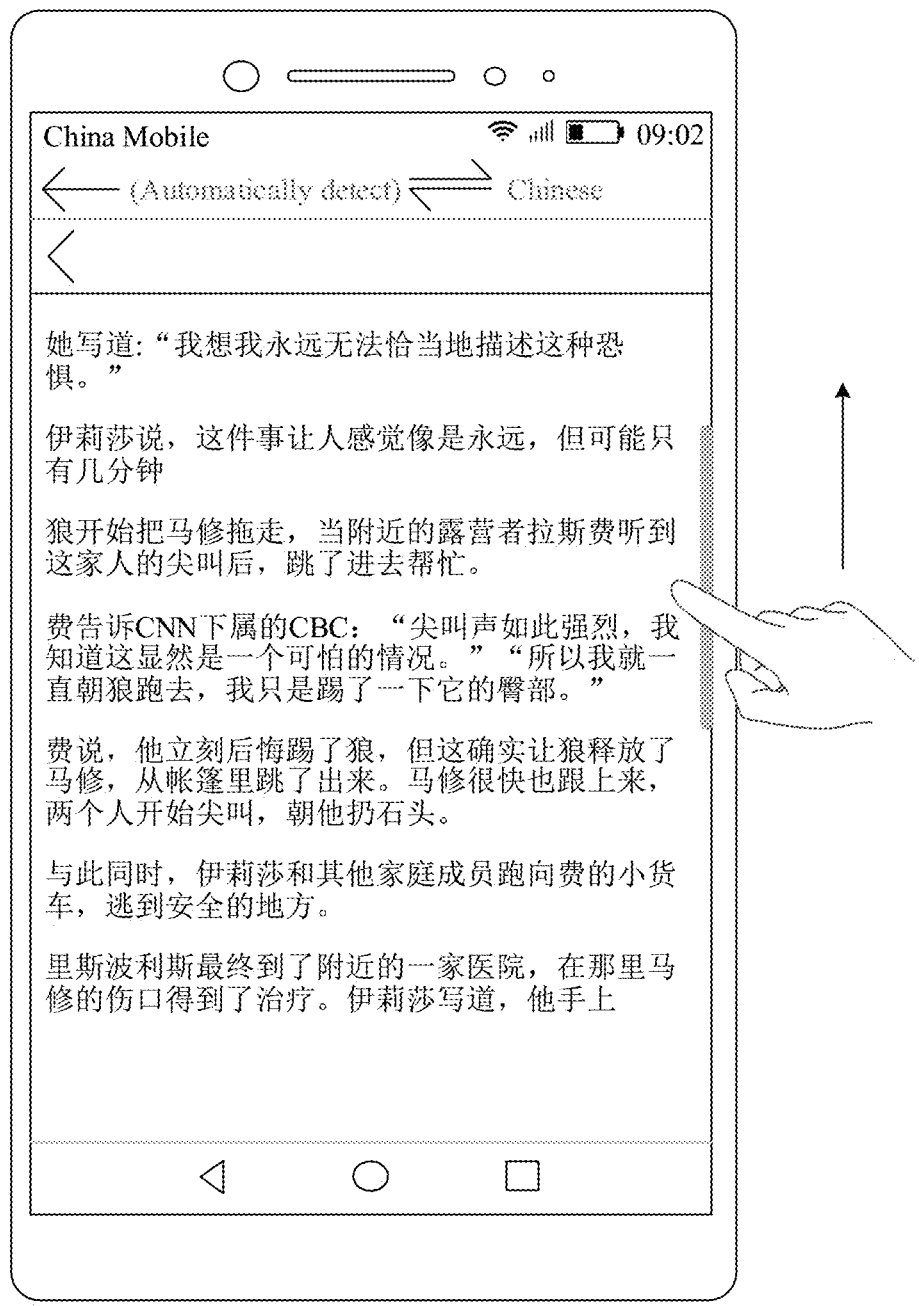
Figure 10D:
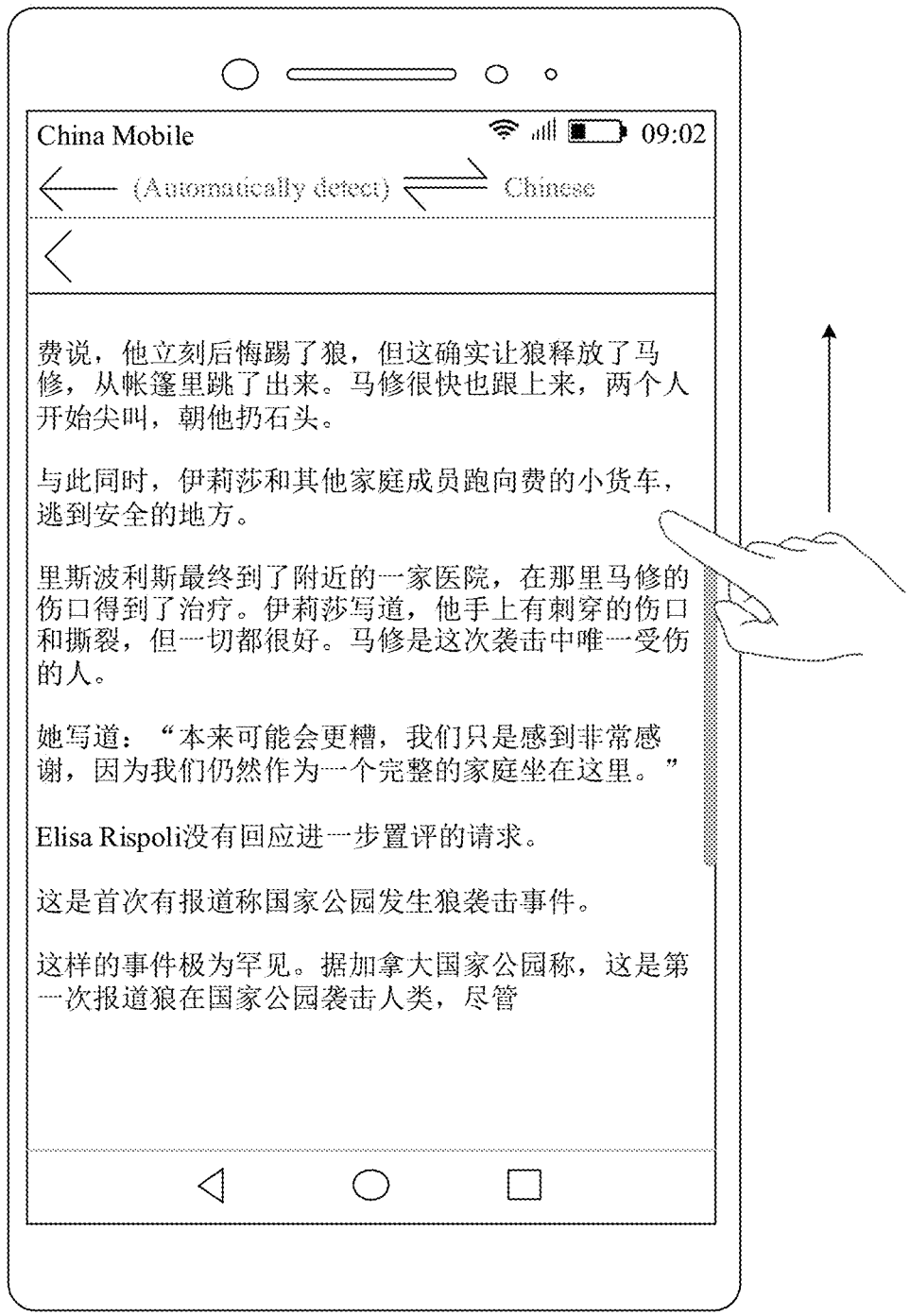
Figure 10E:
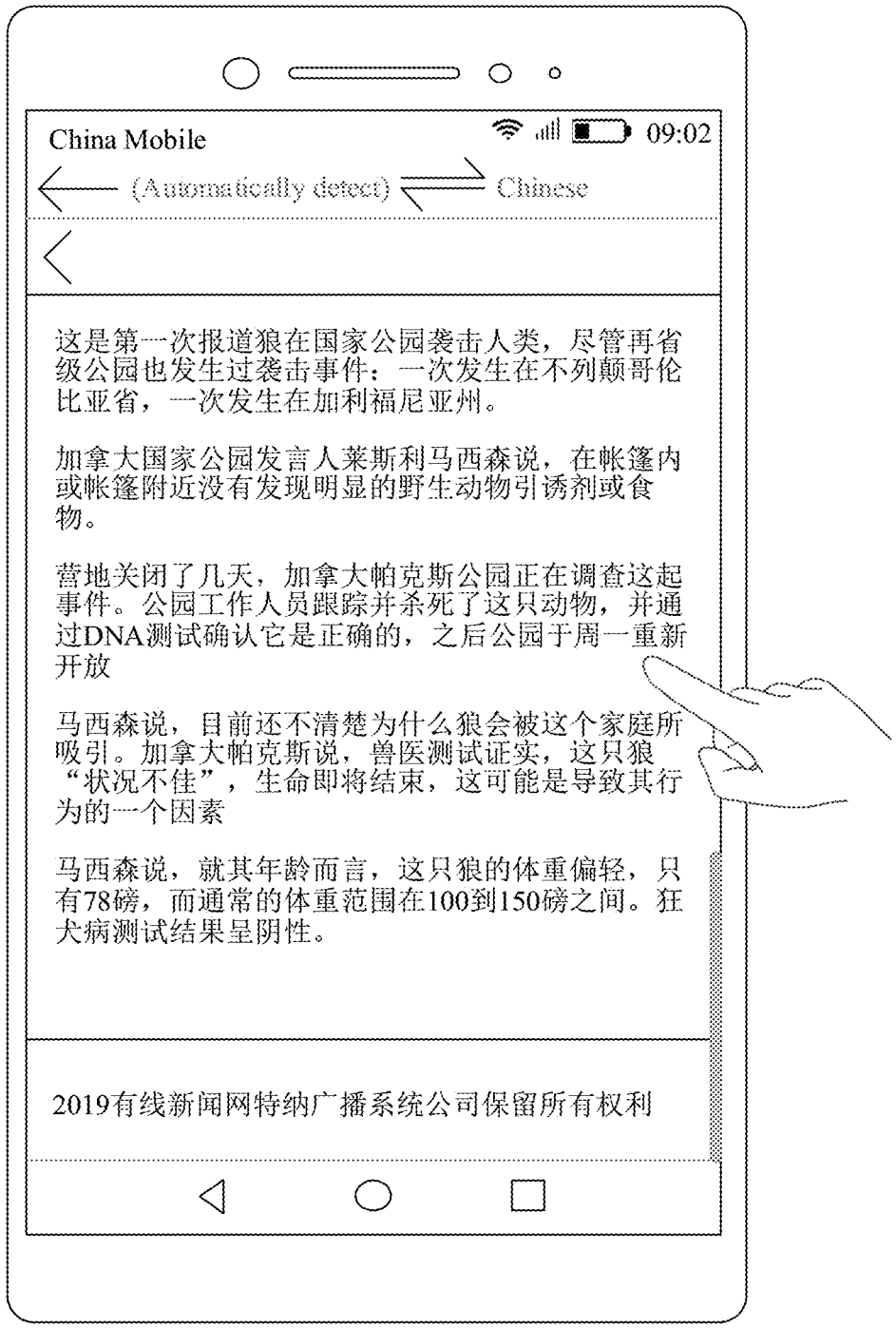

Referring to a GUI shown in FIG. 10(c) to FIG. 10(e), the GUI is another translation display interface. After the mobile phone detects the operation of tapping the control 1001 by the user, the mobile phone may automatically load a translation corresponding to a remaining part of source text in the background, and display the translation to the user.

It should be understood that after the user taps the control 1001, the mobile phone may translate all of the remaining part of source text, and then present the translation corresponding to all of the remaining part of source text to the user. When all remaining translation content is displayed to the user, the "Continue to translate" 1001 and a "Copy the translation" control may not be displayed in the translation display interface.

In an embodiment, after the control 1001 is tapped on the mobile phone, the mobile phone may further prompt the user to select a percentage of the remaining part of source text for translation. For example, the mobile phone may prompt the user to select 20%, 40%, 60%, 80%, or 100% of the remaining part of source text for translation. After the mobile phone detects that the user taps a percentage, the mobile phone may take a screenshot of a remaining part of source text based on the percentage, and then obtain a translation of content corresponding to the screenshot, to present the translation to the user.

In an embodiment, after the control 1001 is tapped on the mobile phone, the mobile phone may automatically capture one or more screens of the remaining part of source text, and then obtain a translation of content corresponding to the screenshot, to present the translation to the user. For example, there may be a default case in which the mobile phone automatically captures two screens of the remaining part of source text when the user taps the control 1001 once.

In an embodiment, the user may tap a "Continue to translate" control in a translation interface obtained after the first full-screen translation, and then the mobile phone may automatically present a translation corresponding to all of a remaining part of source text to the user. Specifically, in this case, after the user taps the "Continue to translate" control, the mobile phone may automatically take a scrolling screenshot of the remaining part of source text. Captured content may include all of the remaining part of source text. The scrolling screenshot process is visible or invisible to the user. For example, as shown in FIG. 3(*f*), after the user taps the control 306 (which may be referred to as "Scrolling translation" or "Continue to translate"), the mobile phone may directly display the translation interfaces shown in FIG. 3(*k*) to FIG. 3(*m*) without switching to the interface shown in FIG. 3(*g*) to take a scrolling screenshot. Alternatively, a "Scrolling screenshot" control and a "Copy the translation" control may not be displayed in the GUIs shown in FIG. 3(*k*) to FIG. 3(*m*).

In the GUIs shown in FIG. 10(*a*) to FIG. 10(*e*), if the user expects to view more translations, after the mobile phone detects that the user taps the "Continue to translate" control, the electronic device may automatically obtain more translation results of the source text after taking a screenshot (which may be a full-screen screenshot or a long screenshot) in the background, and present the translation results to the user, so that switching between the source text and the translation is avoided, thereby further improving user experience of viewing the translation by the user.

Figure 11A:
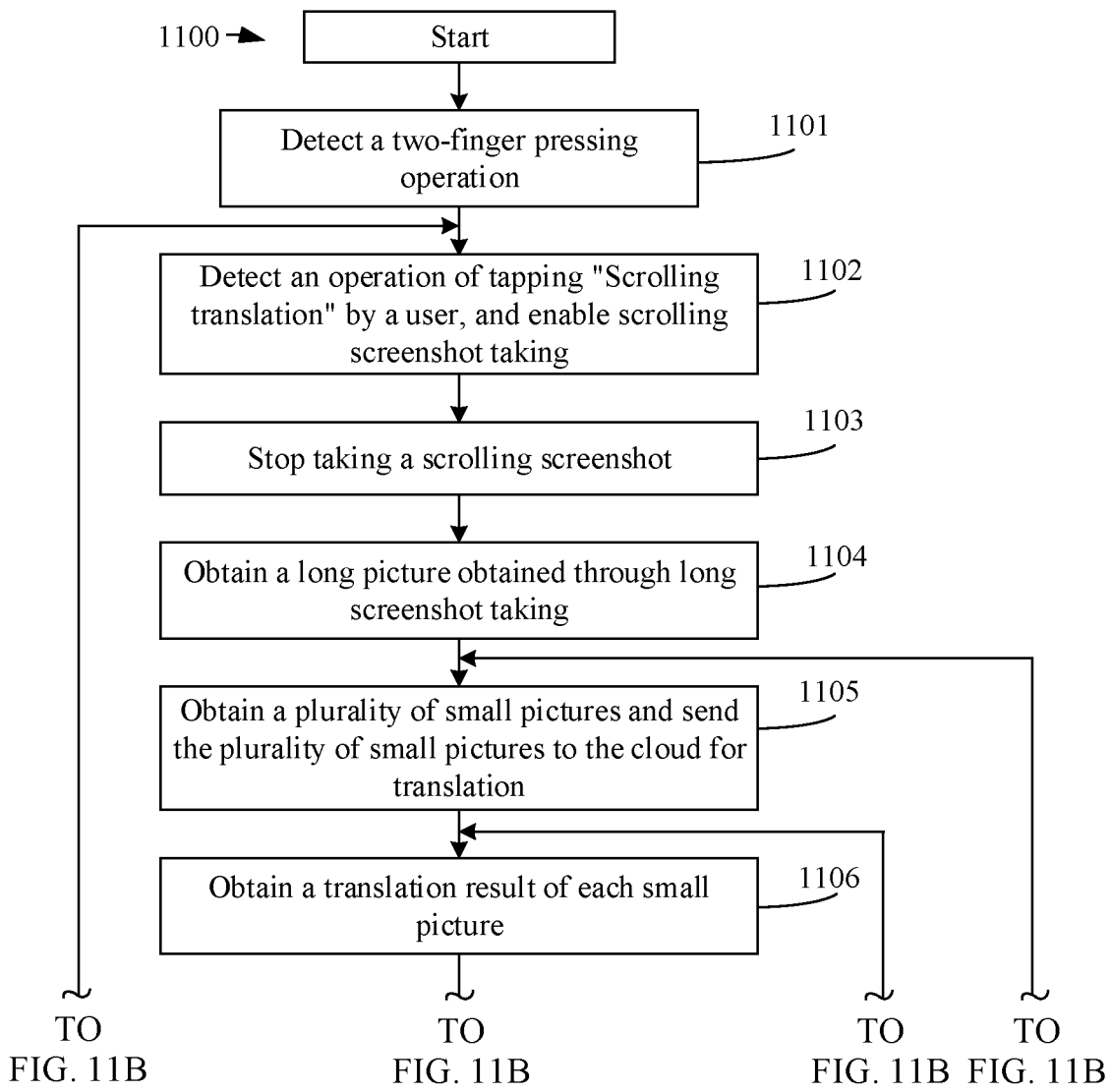
FIG. 11A and FIG. 11B are a schematic flowchart of a machine translation method according to an embodiment of this application.
Figure 11B:
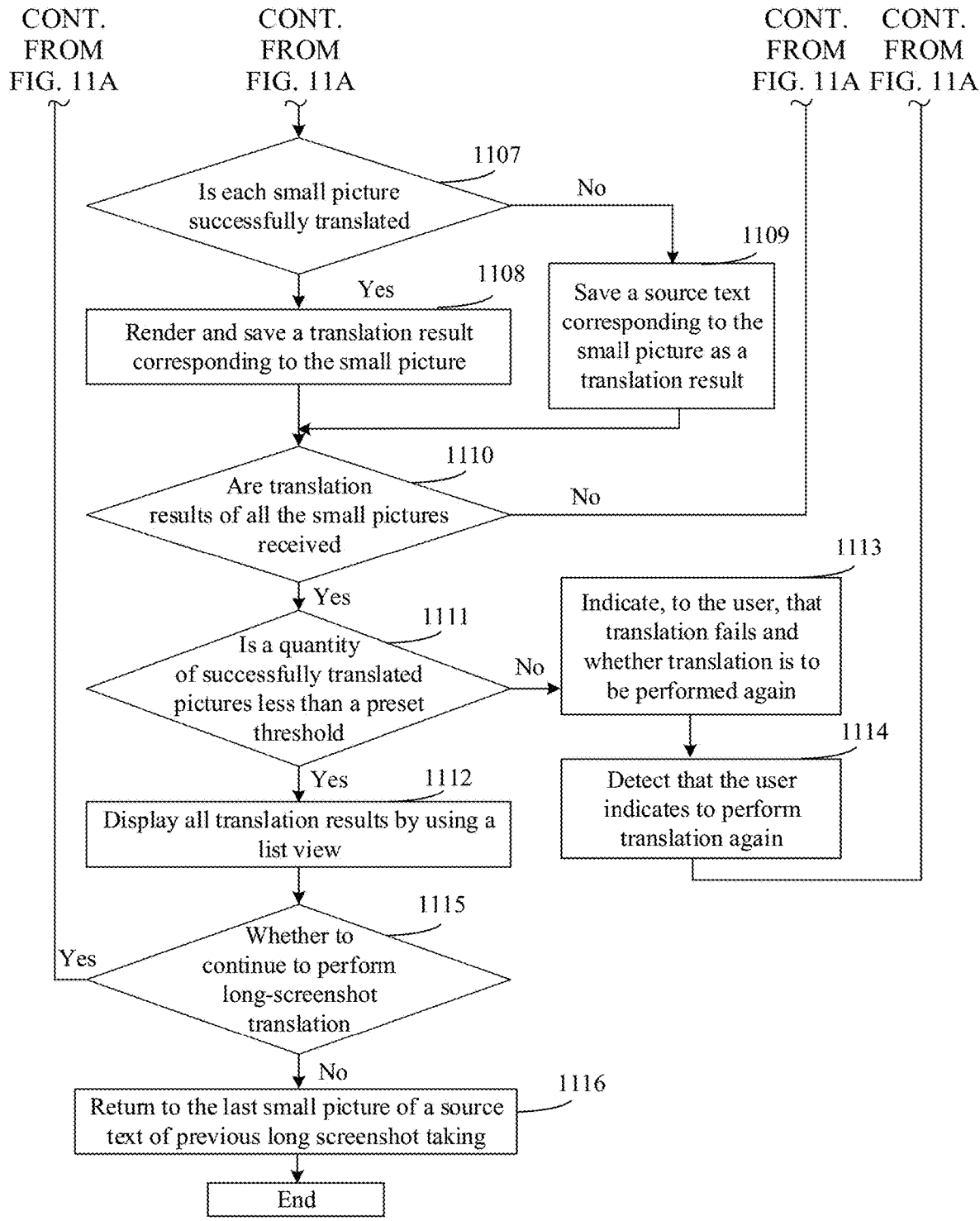

With reference to the GUIs in FIG. 3(*a*) to FIG. 10(*e*), the foregoing describes the GUIs of the machine translation process provided in the embodiments of this application. With reference to FIG. 11A and FIG. 11B, the following describes another machine translation method provided in an embodiment of this application.

FIG. 11A and FIG. 11B are a schematic flowchart of a machine translation method 1100 according to an embodiment of this application. As shown in FIG. 11A and FIG. 11B, the method 1100 may be performed by a mobile phone, and the method includes the following steps.

S1101. The mobile phone detects a two-finger pressing operation in a source text display interface, and enables AI touch.

For example, as shown in FIG. 4(*a*), after detecting a two-finger pressing operation on a display interface of an English essay, the mobile phone enables AI touch. AI touch may include a "Full-screen translation" function option and a "Scrolling translation" function option (the function option may also be referred to as a control).

S1102. The mobile phone detects an operation of tapping "Scrolling translation" by a user, and the mobile phone starts to automatically scroll a screen.

For example, as shown in FIG. 4(*b*), when the mobile phone detects an operation of tapping the control 401 by the user, the mobile phone may enable scrolling translation.

When the user reads a source text and presses the screen with two fingers, the "Scrolling translation" option occurs. The option is tapped to enable a long-screenshot operation, and screen content is automatically slid up at a specific rate and rhythm. There is a prompt above the screen content indicating that the user can stop taking a screenshot through tapping. Alternatively, screenshot taking is automatically stopped when the end of the essay is reached.

For example, FIG. 4(*c*) and FIG. 4(*d*) show a process in which the mobile phone automatically scrolls the screen.

S1103. The mobile phone may stop taking a scrolling screenshot when the mobile phone detects that the user taps a location on the screen, or when the mobile phone detects that the end of the source text is automatically reached through sliding.

For example, as shown in FIG. 4(*d*), when the mobile phone detects that the user taps a location on the screen, the mobile phone may stop taking a scrolling screenshot.

S1104. Obtain a long picture obtained through long screenshot taking.

S1105. Crop the long picture obtained through long screenshot taking to obtain a plurality of small pictures whose heights are less than or equal to a preset height, where a small picture may be sent to the cloud for translation each time the small picture is obtained through cropping.

In an embodiment, the preset height is a height of the screen of the mobile phone.

In an embodiment, the preset height is a preset value less than a height of the screen of the mobile phone.

For example, for the long picture generated through long screenshot taking, the mobile phone may segment the picture based on a relationship between a height of the picture and the height of the screen of the mobile phone, and determine, at a segmentation location through OCR, whether a word or a picture is truncated. If it is found that a word or a picture is truncated at the segmentation location, the mobile phone moves the segmentation location up to a blank line location, to obtain several pictures whose heights are slightly less than or equal to the height of the screen.

In the segmentation process, the plurality of generated small pictures may be numbered based on an order of source texts, and a small picture is sent to the translation cloud for translation each time the small picture is generated.

It should be understood that when the mobile phone segments the long picture into the plurality of small pictures, the small pictures may be numbered based on the order of the source texts, or label information may be added to each small picture by the mobile phone, and these small pictures are sent to the translation cloud for translation.

S1106. The mobile phone obtains a translation result of each small picture from the cloud.

S1107. The mobile phone determines whether each small picture is successfully translated.

It should be understood that the mobile phone may determine, based on a flag bit indicating whether the translation result of each small picture is successfully saved, whether each small picture is successfully translated.

S1108. If a received small picture is successfully translated, the mobile phone renders and saves a translation result corresponding to the small picture.

S1109. If a received small picture is unsuccessfully translated, the mobile phone saves a source text corresponding to the small picture as a translation result.

S1110. The mobile phone determines whether translation results of all the small pictures are received.

S1111. If the mobile phone receives the translation results of all the small pictures, the mobile phone may continue to determine whether a quantity of successfully translated pictures in all the small pictures is less than a preset threshold.

If the mobile phone has not received the translation results of all the small pictures, the mobile phone may continue to perform S1106.

S1112. If the mobile phone determines that the quantity of successfully translated pictures in all the small pictures is less than the preset threshold, the mobile phone may display all the translation results by using a list view.

S1113. If the mobile phone determines that the quantity of successfully translated pictures in all the small pictures is greater than or equal to the preset threshold, the mobile phone may indicate, to the user, that translation fails and whether translation is to be performed again.

In an embodiment, after obtaining a translation result returned by the cloud, the mobile phone determines whether a small picture corresponding to the translation result is successfully translated. If the small picture is successfully translated, the mobile phone renders and saves the translation result. If the small picture is unsuccessfully translated, the mobile phone saves a source text as a translation result. After receiving the translation results of all the small pictures, the mobile phone calculates a proportion of unsuccessfully translated pages and determines whether the proportion exceeds a specified threshold (for example, a total proportion of unsuccessfully translated pages is greater than or equal to 60%), and prompts the user to retry (a probability of this case is relatively low). If translation succeeds, the mobile phone sorts the translation results based on an order of numbers of returned pages or labels of returned pages (namely, the order of the source texts) and displays sorted translation results. Translation display content starts from the first small picture in the long picture.

For example, the mobile phone segments the long picture obtained through long screenshot taking to obtain 10 small pictures, and the small pictures are numbered in order and then sent to the cloud. The mobile phone obtains translation results of the 10 small pictures from the cloud, where eight small pictures are successfully translated, and two small pictures are unsuccessfully translated, and in this case, the mobile phone may also determine that current scrolling translation succeeds. When displaying the translation results, the mobile phone may splice the translation results of the 10 small pictures based on numbers. Source texts may be displayed at locations of the two unsuccessfully translated small pictures, and corresponding translations may be displayed at locations of the other eight successfully translated small pictures.

It should be understood that in S1106, the mobile phone may send the plurality of small pictures to the cloud in order, and when obtaining the translation results of the plurality of small pictures from the cloud, the mobile phone may not obtain the translation results of the small pictures based on the sending order. Because content of each small picture is different, duration for performing translation processing on the small pictures by the cloud is also different. Therefore, the mobile phone may not receive the translation results of the small pictures based on the sending order. Because each small picture is numbered or labeled, the mobile phone may splice the translation results of the plurality of small pictures based on numbers or labels when receiving the translation results of the plurality of small pictures.

S1114. When detecting that the user indicates to perform translation again, the mobile phone may perform the translation process again from S1106.

S1115. The mobile phone determines whether the user continues to perform a long-screenshot operation.

When detecting, in a translation result interface, an operation of continuing to tap "Scrolling translation" by the user, the mobile phone may perform S1105 to S1114 again.

It should be understood that when performing S1102 to S1114 again, the mobile phone may automatically jump to the last small picture of the long picture obtained through the previous long screenshot taking, and start the next scrolling translation, or may automatically jump to the last small picture of the long picture obtained through the previous long screenshot taking, and take a long screenshot starting from the last or the last few paragraphs of the last small picture.

After viewing translation content of the first long screenshot taking, the user may choose to continue to view subsequent content, in other words, continue to use a scrolling translation function, or may exit the translation result interface. If the user exits the translation result interface, the mobile phone returns to a location of source text content of the last small picture or the last or the last few paragraphs of the last small picture at which the previous long screenshot taking is stopped. If the user continues to use scrolling translation (in other words, the user expects to continue to read subsequent content), the mobile phone displays the source text content of the last small picture at which the previous long screenshot taking is stopped, or displays source text content of the last or the last few paragraphs of the last picture at which the previous long screenshot taking is stopped, and also enables a new long-screenshot operation to enter a new cycle until the end of the essay is reached.

In an embodiment, if the user expects to continue to read subsequent content from a translation result interface of current long screenshot taking, the mobile phone needs to return to source text content of the last small picture at which the current long screenshot taking is stopped, and enable a next scrolling translation operation starting from the content of the small picture. In this way, the following advantage is achieved: In terms of reading experience, the user starts reading from the last page of a previous translation. This has functions of evoking a memory and assisting in continuous reading. If the current long screenshot taking is stopped because the end of the essay is reached through scrolling, the "Scrolling translation" option that the user can continue to tap is hidden in a translation result interface.

S1116. When the mobile phone detects that the user exits the translation result interface of long screenshot taking, the mobile phone may display the last small picture of the long picture obtained through the previous long screenshot taking.

In an embodiment, the mobile phone may alternatively display the last or the last few paragraphs of the last small picture of the long picture obtained through the previous long screenshot taking.

Compared with browser-based web translation, the machine translation method in this embodiment of this application has a broader application scope, and is not limited to a case in which a user needs to view news by using a browser. Especially when mobile phones are used, many users view a third-party information APP, for example, NetEase News or Today's Headlines. A browser-based web full-text translation method cannot be used in a third-party APP scenario, but the machine translation method provided in this embodiment is applicable.

Similarly, during use of single picture—based translation, operations are cumbersome. To be specific, the user needs to tap a "Translate" button once for each screen if the user wants to view translation content of multi-screen content. Therefore, operations are cumbersome and time-consuming, and continuous reading of the user is interrupted. In the machine translation method provided in this embodiment, the user only needs to tap a "Translate" button once, and then continue to trigger scrolling translation in a previous translation result interface, to read a translation of subsequent content.

The machine translation method in this embodiment of this application can reduce cumbersome operations performed when the user views a translation corresponding to a source text, improve intelligence of the electronic device, and improve user experience in a process of viewing the translation by the user.

Figure 12:
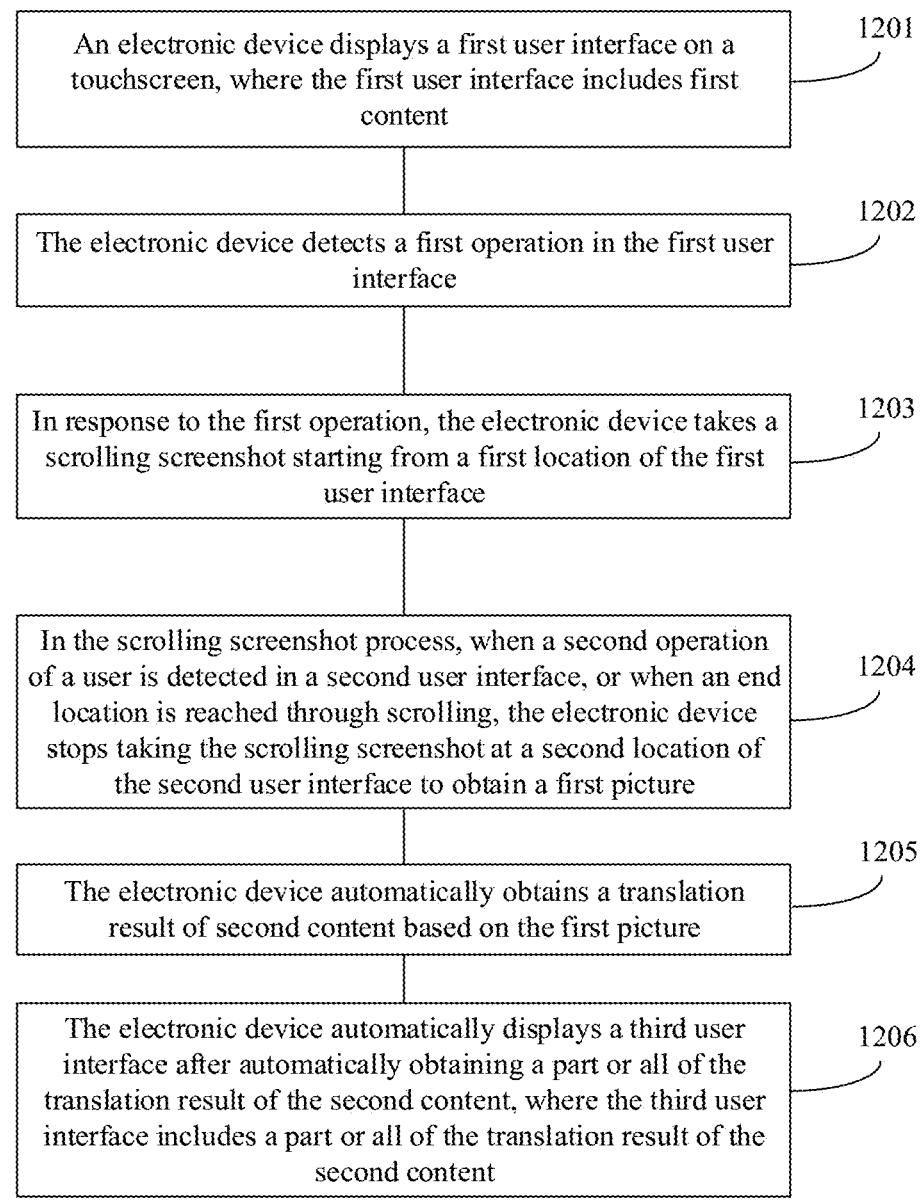
FIG. 12 is a schematic flowchart of a machine translation method according to an embodiment of this application.

With reference to the foregoing embodiments and the related accompanying drawings, an embodiment of this application provides a machine translation method 1200. The method 1200 may be implemented by the electronic device with a touchscreen (for example, a mobile phone or a tablet computer) in FIG. 1 and FIG. 2. As shown in FIG. 12, the method 1200 may include the following steps.

S1201. The electronic device displays a first user interface on the touchscreen, where the first user interface includes first content, and a language of the first content is a first language.

For example, the first user interface may be the GUI shown in FIG. 4(*a*).

S1202. The electronic device detects a first operation in the first user interface, where the first operation includes a user operation of triggering scrolling translation by a user.

For example, in the GUI shown in FIG. 4(*b*), the first operation may be an operation of tapping the control 401 by the user. Alternatively, the first operation may be entering, by the user, a voice instruction used to trigger a scrolling translation function.

S1203. In response to the first operation, the electronic device takes a scrolling screenshot starting from a first location of the first user interface.

For example, in the GUI shown in FIG. 4(*c*), the first location may be a start location of the English essay 303. For example, a scrolling screenshot is taken starting from a title "A family . . . were sleeping".

S1204. In the scrolling screenshot process, when a second operation of the user is detected in a second user interface, or when an end location is reached through scrolling in the second user interface, the electronic device stops taking the scrolling screenshot at a second location of the second user interface to obtain a first picture, where the first picture is a picture corresponding to second content, the second content includes content from the first location to the second location, and a language of the second content is the first language.

For example, in the GUI shown in FIG. 4(*d*), content displayed in the second user interface is from "I don't think . . . she wrote" to "Fee said . . . rocks at it.". After the mobile phone detects a user operation at any location of the second user interface, the mobile phone may stop taking the scrolling screenshot at an end location of the last paragraph in the second user interface. As shown in FIG. 4(*d*), the second location may be an end location of a paragraph "Fee said rocks at it".

In an embodiment, when the end location of the second user interface is not a complete paragraph, the second location may be an end location of the last line that is of the paragraph and that is displayed in the second user interface.

In an embodiment, if the end location of the second user interface is a picture or a part of a picture, the second location may be an end location of a paragraph above the picture or the part of the picture.

S1205. The electronic device automatically obtains a translation result of the second content based on the first picture, where a language of the translation result of the second content is a second language.

For example, after obtaining the first picture, the mobile phone may process the first picture according to the method in the method 1100. For example, the mobile phone may segment the first picture into a plurality of pictures based on a relationship between a height of the first picture and a height of a screen of the mobile phone, and then send the plurality of pictures to a server for translation. The mobile phone may receive a translation result that is of each of the plurality of pictures and that is sent by the server, and generate the translation result of the second content from the translation result of each picture.

For example, the translation result of the second content may be from a translation " 一个四口之家 . . . 袭击了他们" corresponding to the title to a translation "费说，他立刻后悔 . . . 朝他扔石头。" of the last paragraph before the second location.

S1206. The electronic device automatically displays a third user interface after automatically obtaining a part or all of the translation result of the second content, where the third user interface includes a part or all of the translation result of the second content.

In this embodiment of this application, a translation result that is of the second content and that is obtained by the mobile phone may be all of the translation result of the second content, in other words, the mobile phone obtains translation results of the plurality of pictures and each picture is successfully translated; or may be a part of the translation result of the second content. For example, after receiving the plurality of pictures, the server may not successfully translate one of the pictures, and the mobile phone may also display a translation corresponding to a successfully translated picture. The mobile phone may generate the translation result of the second content from source text content corresponding to the unsuccessfully translated picture and translation content corresponding to another picture.

For example, the third user interface may be the GUI shown in FIG. 4(*f*), and a part of the second content, "一个四口之家 . . . 袭击了他们" to "加拿大国家公园 . . . 咬住了他们马修的怀抱", may be displayed in the GUI.

After detecting an upward sliding operation of the user in the third user interface, the electronic device may display a remaining part of the translation result of the second content. As shown in FIG. 4(*g*), after detecting the upward sliding operation of the user on the touchscreen, the mobile phone may display a remaining translation result (from "她写道 . . . 这种恐惧" to "费说 . . . 朝他扔石头。").

In an embodiment, the method 1200 further includes:

The electronic device detects a third operation in a fourth user interface, where the fourth user interface includes an end part of the translation result of the second content, and the third operation includes a user operation of triggering scrolling translation by the user.

For example, the fourth user interface may be the GUI shown in FIG. 4(*g*). The GUI includes the end part of the translation result of the second content. The end part may be "费说，他立刻后悔 . . . 朝他扔石头。". The third operation may be an operation of tapping the "Scrolling translation" control 403 by the user.

In response to the third operation, the electronic device automatically displays a fifth user interface and takes a scrolling screenshot starting from a third location of the fifth user interface, where the fifth user interface includes third content, the third location is associated with the second location, and a language of the third content is the first language.

For example, the fifth user interface may be the GUI shown in FIG. 4(h), and the third content may be English content from "费说 . . . 朝他扔石头" to "她写道 . . . 坐在这里。". The GUI shows that the mobile phone takes a scrolling screenshot starting from the paragraph "Fee said . . . rocks at it".

In the scrolling screenshot process, when a fourth operation of the user is detected in a sixth user interface, or when an end location is reached through scrolling, the electronic device stops taking the scrolling screenshot at a fourth location of the sixth user interface to obtain a second picture, where the second picture is a picture corresponding to fourth content, the fourth content includes content from the third location to the fourth location, and a language of the fourth content is the first language.

For example, the sixth user interface may be the GUI shown in FIG. 4(i). After the mobile phone detects any operation performed by the user in the GUI, the mobile phone may stop taking the scrolling screenshot. The fourth location may be an end location "Incidents like these . . . and one in Ontario." of the last paragraph of the GUI shown in FIG. 4(i). In this case, the fourth content included in the second picture may be English content from "Fee said . . . rocks at it." to "Incidents like these . . . and one in Ontario.".

The electronic device automatically obtains a translation result of the fourth content based on the second picture, where a language of the translation result of the fourth content is the second language.

For example, the electronic device may segment the second picture into a plurality of pictures, and then send the plurality of pictures to the server for translation; and obtain translation results of the plurality of pictures from the server. The electronic device may generate the translation result of the fourth content from the translation results of the plurality of pictures.

The electronic device automatically displays a seventh user interface after automatically obtaining a part or all of the translation result of the fourth content, where the seventh user interface includes a part or all of the translation result of the fourth content.

For example, the seventh user interface may be the GUI shown in FIG. 4(k), and the GUI includes a part of the translation result of the fourth content. For example, a translation result displayed in the GUI is from "Fee said . . . rocks at it" to "It could . . . she wrote.".

After detecting an upward sliding operation of the user in the seventh user interface, the electronic device may display a remaining part of the translation result of the fourth content. As shown in FIG. 4(l), after detecting the upward sliding operation of the user on the touchscreen, the mobile phone may display a remaining translation result (from "Elisa Rispoli 没 有 . . . 的请求" to "这样的时间 . . . 在不列颠哥伦比亚省").

In an embodiment, the method 1200 further includes:

The electronic device detects a fifth operation in an eighth user interface, where the eighth user interface includes an end part of the translation result of the second content, and the fifth operation includes a user operation of triggering further translation by the user.

For example, the eighth user interface may be the GUI shown in FIG. 10(b), and the GUI may be obtained through full-screen translation, or may be obtained through scrolling translation. The GUI may include the end part of the translation result of the second content, and the end part may be "费说，他立刻后悔 . . . 朝他扔石头。". The fifth operation may be an operation of tapping the "Continue to translate" control 1001 by the user.

The electronic device automatically obtains a translation result of fifth content in response to the fifth operation, where the fifth content includes a part or all of content other than the second content in all content corresponding to the first language, and a language of the translation result of the fifth content is the second language.

For example, after the mobile phone detects the operation of tapping the control 1001 by the user, the mobile phone may obtain a translation result of source text content other than a part of source text from "A family . . . were sleeping" to "Fee said . . . rocks at it." in a source text, in other words, the mobile phone may automatically obtain a translation result of "Meanwhile . . . to safety" to an end location "2019 Cable . . . All rights Reserved." of the English essay 303.

For example, after detecting the operation of tapping the control 1001 by the user, the mobile phone may obtain a third picture. The third picture includes content from "Meanwhile . . . to safety" to an end location "2019 Cable . . . All rights Reserved." of the English essay 303. The mobile phone may segment the third picture into a plurality of pictures, then send the plurality of pictures to the server for translation, and obtain a translation result that is of each picture and that is sent by the server. The mobile phone may combine translation results of the plurality of pictures into the translation result of the fifth content.

For example, the fifth content may alternatively include a part of content other than the second content. For example, after detecting the operation of tapping the control 1001 by the user, the electronic device may segment content other than the second content into a plurality of parts, where the second content may be content of a first part in the plurality of parts.

For example, the fifth content may alternatively include a part of content that has been previously read.

The electronic device automatically displays a ninth user interface after automatically obtaining a part or all of the translation result of the fifth content, or displays the ninth user interface after receiving a sliding operation of the user, where the ninth user interface includes a part or all of the translation result of the fifth content.

For example, the GUI shown in FIG. 10(c) includes a part of the translation result of the fifth content, for example, from "与此同时 . . . 逃到安全的地方" to "里斯波利斯 . . . 他手上".

In an embodiment, the method 1200 further includes: In response to the fifth operation, the electronic device automatically takes a screenshot to obtain a third picture, where the third picture includes fifth content.

For example, the electronic device may obtain the third picture through screenshot taking or scrolling screenshot taking.

After obtaining the third picture, the electronic device may send the third picture or a picture corresponding to a part of the third picture to the server. The electronic device receives a translation result that is of the third picture or the picture corresponding to the part of the third picture and that is returned by the server.

In an embodiment, that the electronic device automatically takes a screenshot to obtain a third picture may be that the electronic device captures content of one or more screens to obtain the third picture. The automatic screenshot process is visible or invisible to the user.

For example, in the process from FIG. 10(b) and FIG. 10(c), the automatic screenshot process is invisible to the user. For another example, in the process from FIG. 4(g) to FIG. 4(k), the automatic screenshot process is visible to the user.

In an embodiment, after automatically obtaining the translation result of the fifth content, the electronic device may further continue to display the third user interface. However, when the user performs upward sliding on the touchscreen, the mobile phone may display a part or all of the translation result of the fifth content.

In an embodiment, before the automatically obtaining a translation result of the second content, the method further includes: The electronic device automatically segments the first picture into a plurality of pictures. The third location is related to a specific location in the last picture in the plurality of pictures, and the specific location is a start location, an end location, an intermediate location, or a predetermined-proportion location of the last picture; or a start location of the last paragraph or a start location of the last n lines in the last picture, where n is a positive integer, and n is greater than or equal to 1.

For example, the first picture includes source text content from "A family . . . were sleeping" to "Fee said . . . rocks at it.". The mobile phone may segment the first picture to obtain a plurality of pictures. For example, two pictures are obtained after segmentation, the first picture includes source text content from "A family . . . were sleeping" to "The family was . . . clamped onto Matthew's arms.", and the second picture includes source text content from "I don't . . . she wrote" to "Fee said . . . rocks at it.".

For example, the third location may be a start location of the second picture, and in this case, a start location of scrolling screenshot taking shown in FIG. 4(h) may be "I don't . . . she wrote".

For another example, the third location may be an intermediate location of the second picture, for example, "The wolf was . . . jumped into help.", and in this case, a start location of scrolling screenshot taking shown in FIG. 4(h) may be "The wolf was . . . jumped into help.".

For another example, the third location may be a predetermined-proportion location. For example, the third location may be a two-thirds location of the second picture. For example, a scrolling screenshot is taken starting from a line "[the wolf] . . . in the back". In this case, a start location of scrolling screenshot taking shown in FIG. 4(h) may be "[the wolf] . . . in the back".

The third location may be alternatively a start location of the last paragraph of the second picture. As shown in FIG. 4(h), a scrolling screenshot may be taken starting from the last paragraph "Fee said . . . rocks at it." of the second picture.

For another example, the third location may be the last n lines of the last paragraph of the second picture. For example, when n is 2, the mobile phone may take a scrolling screenshot starting from a line "and the two . . . throwing rocks".

In an embodiment, the automatically obtaining a translation result of the second content includes: The electronic device sends the plurality of pictures to the server. The electronic device receives a translation result of the server for each of the plurality of pictures. The electronic device generates a part of the translation result of the second content from translation results of some of the plurality of pictures, or generates the translation result of the second content from translation results of all of the plurality of pictures.

It should be understood that for a process in which the electronic device segments the first picture and the second picture into a plurality of pictures and a process in which the electronic device sends the plurality of pictures to the server for translation and obtains translation results, refer to the descriptions in the method 1100. For brevity, details are not described herein again.

In an embodiment, that the third location is associated with the first picture includes: The third location is related to a specific location in the first picture. The specific location is an end location, an intermediate location, or a predetermined-proportion location of the first picture; or a start location of the last paragraph or a start location of the last n lines in the first picture, where n is a positive integer, and n is greater than or equal to 1.

In an embodiment, the third location is related to an end location, an intermediate location, or a predetermined-proportion location of the second content; or the third location is related to a start location of the last paragraph or a start location of the last n lines in the second content, where n is a positive integer, and n is greater than or equal to 1.

In this embodiment of this application, the electronic device may segment the first picture into a plurality of pictures, and the third location may be related to the last picture in the plurality of pictures or the last few pictures in the plurality of pictures. Alternatively, the electronic device may not segment the first picture, and the third location may be related to a specific location in the first picture, or the third location may be related to the second content displayed on the first picture.

In this embodiment of this application, the electronic device jumps to a vicinity of a location at which previous long screenshot taking is stopped in the source text (the electronic device has memorized the location), and the electronic device may enable scrolling screenshot taking again starting from the vicinity of the location at which the previous long screenshot taking is stopped (the location is associated with the first picture, and by retaining some redundant content, the user can recall where previous reading is stopped), and send a picture obtained through scrolling screenshot taking to the server for translation. The method is not limited to translation of a web-based browser client, but may be further used in a non-browser scenario such as a third-party information APP, so that applicable scenarios are greatly expanded, and continuity of reading experience of the user is further ensured.

In an embodiment, the automatically obtaining a translation result of the second content includes: The electronic device sends the first picture or a picture corresponding to a part of the first picture to the server. The electronic device receives a translation result that is of the first picture or the picture corresponding to the part of the first picture and that is returned by the server.

For example, after obtaining the first picture, the electronic device may directly send the first picture to the server for translation without performing segmentation; or after the electronic device sends the first picture to the server, the electronic device segments the first picture into a plurality of pictures, and the server returns a translation result of each picture to the electronic device after translating the plurality of pictures.

For example, after obtaining the first picture, the electronic device may segment the first picture into a plurality of pictures, and send the first picture or the first few pictures in the plurality of pictures to the server for translation. Then the electronic device obtains a translation result that is of the first picture or the first few pictures and that is returned by the server.

In an embodiment, the translation result of the second content includes content obtained after text content obtained by performing optical character recognition (OCR) text recognition on the first picture is translated from the first language to the second language.

In an embodiment, the method further includes: displaying first prompt information at the third location or near the third location, where the first prompt information is used to indicate a start location of scrolling screenshot taking to the user; and/or displaying second prompt information at the second location or near the second location, where the second prompt information is used to indicate, to the user, that previous reading is stopped at the second location.

For example, in the GUI shown in FIG. 8(b), first prompt information may be included at a start location of "Fee said . . . rocks at it.", and the first prompt information may be "Start location of current screenshot taking". Second prompt information may be included at an end location of "Fee said . . . rocks at it.", and the second prompt information may be "Here is where previous reading is stopped".

In an embodiment, the first operation includes tapping, by the user, a first control that can trigger a scrolling translation function or entering, by the user, a voice instruction that can trigger a scrolling translation function.

For example, the first operation may be an operation of tapping the control 401 by the user, or the first operation may be a voice instruction "Scrolling translation" entered by the user.

In an embodiment, the third operation includes tapping, by the user, a first control that can trigger a scrolling translation function or entering, by the user, a voice instruction that can trigger a scrolling translation function.

For example, the third operation may be an operation of tapping the control 403 by the user, or the first operation may be a voice instruction "Scrolling translation" entered by the user.

In an embodiment, the method further includes: displaying a tenth user interface after a sliding operation of the user is received in the third user interface, where the tenth user interface includes a subsequent translation result associated with the translation result included in the third user interface.

For example, as shown in FIG. 10(d) and FIG. 10(e), after the mobile phone detects an upward sliding operation of the user, the mobile phone may display a subsequent translation result.

In an embodiment, before the detecting a third operation, the method further includes: displaying, in the fourth user interface, a control that can trigger scrolling translation.

For example, as shown in FIG. 4(g), the mobile phone may display the control 403 by using a display screen.

In an embodiment, before the detecting a fifth operation, the method further includes: displaying, in the eighth user interface, a control that can trigger further translation.

For example, as shown in FIG. 10(b), the mobile phone may display the control 1001 by using the display screen.

In an embodiment, the detecting a first operation in the first user interface includes: The electronic device displays a plurality of function controls after detecting a multi-finger pressing operation of the user in the first user interface. The plurality of function controls include a first control that can trigger scrolling translation. The electronic device detects that the user taps the first control or the user enters a voice instruction that can trigger a scrolling translation function.

For example, in the GUI shown in FIG. 4(a), after detecting a two-finger pressing operation of the user, the mobile phone may display the GUI shown in FIG. 4(b). A plurality of function controls may be displayed in the GUI, and the plurality of function controls include the control 401.

In an embodiment, the second content includes the first content and a part or all of content other than the first content in all content corresponding to the first language.

In an embodiment, the third content includes a part of content other than the second content in all the content corresponding to the first language, and the fourth content includes a part or all of the content other than the second content in all the content corresponding to the first language.

In an embodiment, the third content may also include a part or all of the second content, and the fourth content may also include a part or all of the second content.

In an embodiment, the method further includes: displaying an eleventh user interface after a sliding operation of the user is received in the ninth user interface, where the eleventh user interface includes a subsequent translation result associated with the translation result included in the ninth user interface.

For example, in the GUI shown in FIG. 4(k), after detecting a sliding operation of the user, the mobile phone may display a subsequent translation result.

Figure 13:
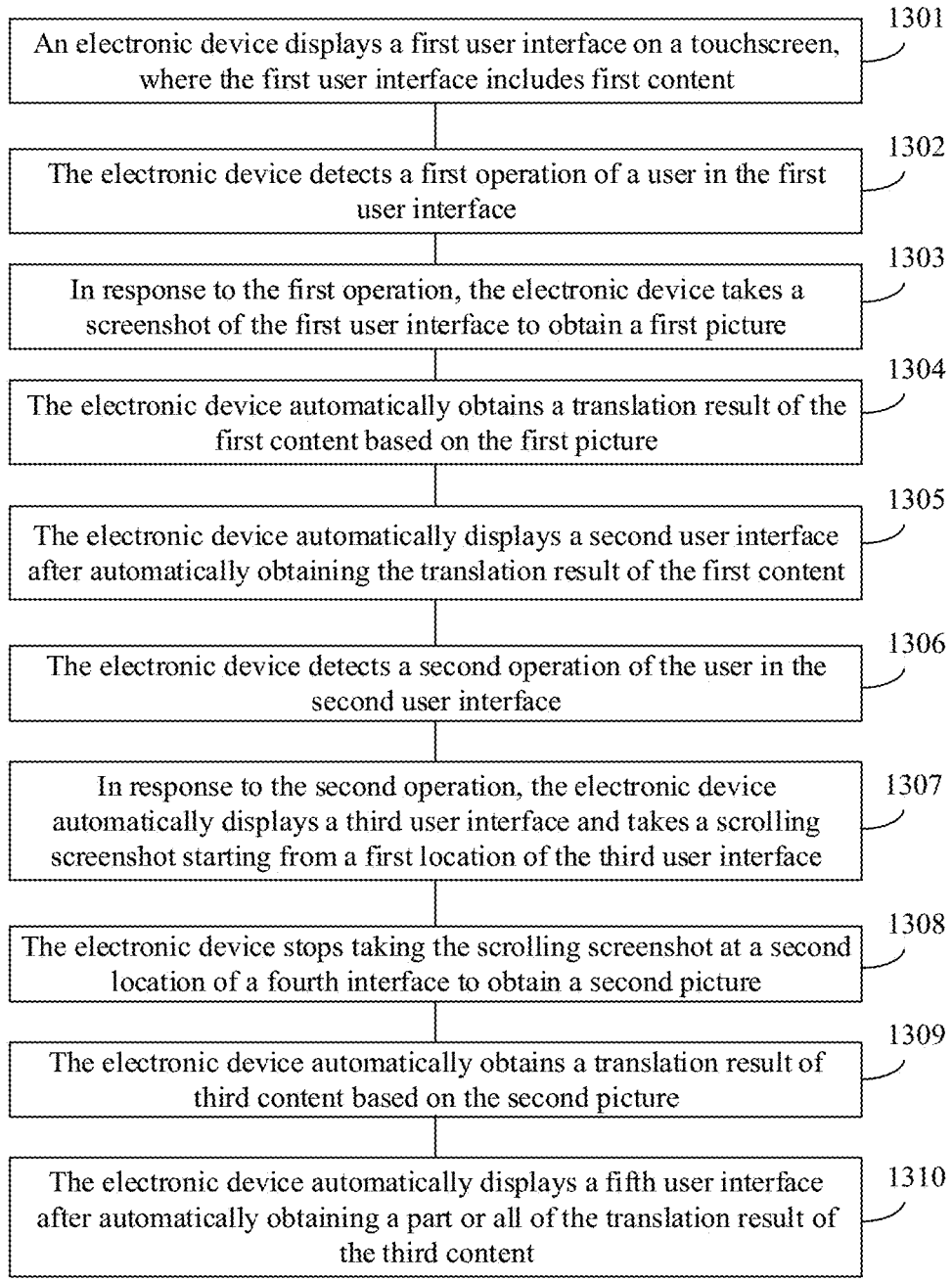
FIG. 13 is a schematic flowchart of a machine translation method according to an embodiment of this application.

FIG. 13 is a schematic flowchart of a machine translation method 1300 according to an embodiment of this application. As shown in FIG. 13, the method 1300 includes the following steps.

S1301. An electronic device displays a first user interface on a touchscreen, where the first user interface includes first content, and a language of the first content is a first language.

For example, the first user interface may be the GUI shown in FIG. 3(c), and the GUI includes English content from a title "A family . . . were sleeping" to "The family was . . . clamped onto Matthew's arms".

S1302. The electronic device detects a first operation of a user in the first user interface, where the first operation includes a user operation of triggering full-screen translation by the user.

For example, referring to the GUI shown in FIG. 3(d), the first operation may be an operation of tapping the control 305 by the user. After detecting the operation of tapping the control 305 by the user, the mobile phone may be first triggered to perform a screenshot operation.

S1303. In response to the first operation, the electronic device takes a screenshot of the first user interface to obtain a first picture.

For example, referring to the GUI shown in FIG. 3(d), the first picture may be obtained by the mobile phone by taking a screenshot of source text content displayed on a current screen, and English content from the title "A family . . . were sleeping" to "The family was . . . clamped onto Matthew's arms" is displayed on the first picture.

S1304. The electronic device automatically obtains a translation result of the first content based on the first picture, where a language of the translation result of the first content is a second language.

For example, the electronic device may send the first picture to a server, and receive a translation result that is of the first picture and that is returned by the server.

The translation result of the first content includes content obtained after text content obtained by performing optical character recognition (OCR) text recognition on the first picture is translated from the first language to the second language.

S1305. The electronic device automatically displays a second user interface after automatically obtaining the translation result of the first content, where the second user interface includes a part or all of the translation result of the first content.

For example, the second user interface may be the GUI shown in FIG. 3(f), and the GUI includes the translation result of the first content. The translation result of the first content is from a title " 一个四口之家 . . . 袭击了他们 " to " 加拿大国家公园 . . . 咬住了他们马修的怀 抱 ".

S1306. The electronic device detects a second operation of the user in the second user interface, where the second operation includes a user operation of triggering scrolling translation by the user.

For example, the second user interface may include the control 306, and the second operation may be an operation of tapping the control 306 by the user. After the mobile phone detects the operation of tapping the control 306 by the user, the mobile phone may perform a scrolling translation operation.

S1307. In response to the second operation, the electronic device automatically displays a third user interface and takes a scrolling screenshot starting from a first location of the third user interface, where the third user interface includes second content, the first location is associated with the first picture, and a language of the second content is the first language.

For example, after detecting, in the GUI shown in FIG. 3(f), the operation of tapping the control 306 by the user, the mobile phone may automatically display the GUI shown in FIG. 3(g). The GUI shown in FIG. 3(g) is a display interface of scrolling screenshot taking, and the first location may be a start location of the title "A family . . . were sleeping".

S1308. In the scrolling screenshot process, when a third operation of the user is detected in a fourth user interface, or when an end location is reached through scrolling in the fourth user interface, the electronic device stops taking the scrolling screenshot at a second location of the fourth interface to obtain a second picture, where the second picture is a picture corresponding to third content, the third content includes content from the first location to the second location, and a language of the third content is the first language.

For example, as shown in FIG. 3(g) to FIG. 3(i), when the end location is reached through scrolling, the electronic device may automatically stop taking a scrolling screenshot, and the second location may be an end location of "2019 Cable News . . . rights Reserved.". When stopping taking the scrolling screenshot, the electronic device may obtain a second picture. Source text content from a start location of the title "A family . . . were sleeping" to the end location of "2019 Cable News . . . rights Reserved." may be displayed on the second picture.

S1309. The electronic device automatically obtains a translation result of the third content based on the second picture, where a language of the translation result of the third content is the second language.

For example, after obtaining the second picture through scrolling screenshot taking, the electronic device may continue to obtain the translation result of the third content on the second picture. For example, the electronic device may segment the second picture into a plurality of pictures, and send the plurality of pictures to the server for translation. The electronic device receives translation results that are of the plurality of pictures and that are returned by the server. The translation results of the plurality of pictures constitute the translation result of the third content.

S1310. The electronic device automatically displays a fifth user interface after automatically obtaining a part or all of the translation result of the third content, where the fifth user interface includes a part or all of the translation result of the third content.

For example, the fifth user interface may be shown in FIG. 3(k), and the GUI shown in FIG. 3(k) includes a part of the translation result of the third content, for example, from the title "一个四口之家 . . . 袭击了他们" to " 加拿大国家公园 . . . 咬住了他们马修的怀抱 ".

In an embodiment, the method further includes: displaying a sixth user interface after a sliding operation of the user is received in the fifth user interface, where the sixth user interface includes a subsequent translation result associated with the translation result included in the fifth user interface.

After the electronic device detects an upward sliding operation of the user on the touchscreen, the electronic device may display more translation content. For example, FIG. 3(k) to FIG. 3(m) show a process of displaying a subsequent translation after the user performs sliding.

In an embodiment, before the automatically obtaining a translation result of the third content, the method further includes: The electronic device automatically segments the second picture into a plurality of pictures. The electronic device sends the plurality of pictures to the server. The electronic device receives a translation result of the server for each of the plurality of pictures. The electronic device generates a part of the translation result of the third content from translation results of some of the plurality of pictures, or generates the translation result of the third content from translation results of all of the plurality of pictures.

In an embodiment, the translation result of the third content includes content obtained after text content obtained by performing OCR text recognition on the second picture is translated from the first language to the second language.

It should be understood that for a process in which the electronic device segments the second picture into a plurality of pictures, refer to the descriptions in the method 1100. For brevity, details are not described herein again.

In an embodiment, the method further includes: displaying first prompt information at the first location or near the first location, where the first prompt information is used to indicate a start location of scrolling screenshot taking to the user; and/or displaying second prompt information at an end location of the first picture, where the second prompt information is used to indicate, to the user, that previous reading is stopped at the end location.

It should be understood that for the first prompt information and the second prompt information, refer to the GUIs shown in FIG. 8(a) to FIG. 8(e). When full-screen translation is completed, the mobile phone may display the first prompt information and/or the second prompt information in a scrolling screenshot interface when performing scrolling translation.

In an embodiment, the second operation includes tapping, by the user, a first control that can trigger a scrolling translation function or entering, by the user, a voice instruction that can trigger a scrolling translation function.

For example, as shown in FIG. 3(f), the second operation may be an operation of tapping the control 306 by the user.

In an embodiment, that the first location is associated with the first picture includes: The first location is related to a specific location in the first picture. The specific location is an end location, an intermediate location, or a predetermined-proportion location of the first picture; or a start location of the last paragraph or a start location of the last n lines in the first picture, where n is a positive integer, and n is greater than or equal to 1.

For example, as shown in FIG. 3(g), a scrolling screenshot may be taken starting from a paragraph "It was like . . . on Facebook".

For example, the predetermined-proportion location may be a two-thirds location of the first picture. For example, a scrolling screenshot is taken starting from a line "when the incident . . . Friday,".

In an embodiment, that the first location is associated with the first picture includes: The first location is related to an end location, an intermediate location, or a predetermined-proportion location of the first content; or the first location is related to a start location of the last paragraph or a start location of the last n lines in the first content, where n is a positive integer, and n is greater than or equal to 1.

For example, a scrolling screenshot may be taken starting from a line or a paragraph in English content from the title "A family . . . were sleeping" to "The family was . . . clamped onto Matthew's arms".

In an embodiment, before the detecting a second operation of the user in the second user interface, the method further includes: displaying, in the second user interface, a control that can trigger scrolling translation.

For example, the control 306 may be displayed in the GUI shown in FIG. 3(f).

In an embodiment, the detecting a first operation of a user in the first user interface includes: displaying a plurality of function controls after a multi-finger pressing operation of the user is detected in the first user interface, where the plurality of function controls include a first control that can trigger full-screen translation; and detecting that the user taps the first control or the user enters a voice instruction that can trigger a full-screen translation function.

For example, before the user taps the control 305, the user may press the GUI shown in FIG. 3(c) with two fingers. After detecting the two-finger pressing operation of the user, the mobile phone may display a plurality of controls. The plurality of controls include the control 305.

In an embodiment, the automatically obtaining a translation result of the second content includes: The electronic device sends the second picture or a picture corresponding to a part of the second picture to the server. The electronic device receives a translation result that is of the second picture or the picture corresponding to the part of the second picture and that is returned by the server.

Figure 14:
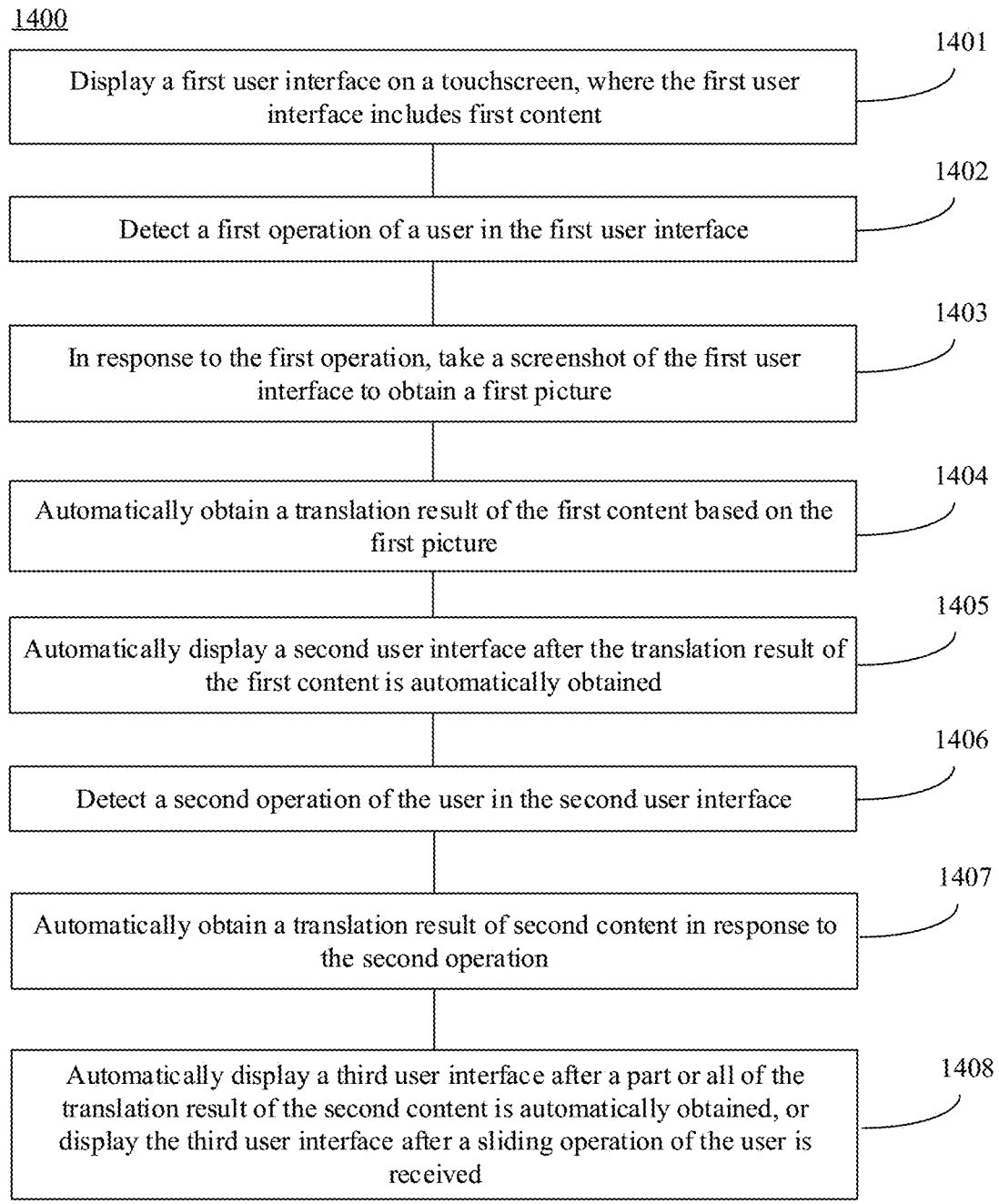
FIG. 14 is a schematic flowchart of a machine translation method according to an embodiment of this application.

FIG. 14 is a schematic flowchart of a machine translation method 1400 according to an embodiment of this application. As shown in FIG. 14, the method 1400 includes the following steps.

S1401. Display a first user interface on a touchscreen, where the first user interface includes first content, and a language of the first content is a first language.

S1402. Detect a first operation of a user in the first user interface, where the first operation includes a user operation of triggering full-screen translation by the user.

S1403. In response to the first operation, take a screenshot of the first user interface to obtain a first picture.

S1404. Automatically obtain a translation result of the first content based on the first picture, where a language of the translation result of the first content is a second language.

S1405. Automatically display a second user interface after the translation result of the first content is automatically obtained, where the second user interface includes a part or all of the translation result of the first content.

It should be understood that for S1401 to S1405, refer to the foregoing descriptions of S1301 to S1305. For brevity, details are not described herein again.

S1406. Detect a second operation of the user in the second user interface, where the second operation includes a user operation of triggering further translation by the user.

S1407. Automatically obtain a translation result of second content in response to the second operation, where the second content includes a part or all of content other than the first content in all content corresponding to the first language, and a language of the translation result of the second content is the second language.

S1408. Automatically display a third user interface after a part or all of the translation result of the second content is automatically obtained, or displaying the third user interface after a sliding operation of the user is received, where the third user interface includes a part or all of the translation result of the second content.

It should be understood that for a process of S1406 to S1408, refer to the related descriptions in the method 1300. For brevity, details are not described herein again.

In this embodiment of this application, after the electronic device performs full-screen translation once, the electronic device may provide a "Continue to translate" control for the user. After detecting that the user taps the "Continue to translate" control, the electronic device may directly load, in the background, all or a part of a translation corresponding to a remaining part of source text. In this way, the electronic device does not need to jump to a source-text interface for scrolling screenshot taking, so that user experience of reading a translation by the user can be further improved.

In an embodiment, in response to the second operation, the electronic device automatically takes a screenshot to obtain a second picture, where the second picture is a picture corresponding to the second content. The automatically obtaining a translation result of the second content includes: automatically obtaining the translation result of the second content based on the second picture.

In an embodiment, the automatically obtaining a translation result of the second content includes: sending the second picture or a picture corresponding to a part of the second picture to a server; and receiving a translation result that is of the second picture or the picture corresponding to the part of the second picture and that is returned by the server.

In an embodiment, that the electronic device automatically takes a screenshot to obtain a second picture includes: The electronic device automatically captures content of one or more screens to obtain the second picture. The automatic screenshot process is visible or invisible to the user.

In an embodiment, that the electronic device automatically obtains a translation result of the second content includes: The electronic device automatically segments the second picture into a plurality of pictures. The electronic device sends the plurality of pictures to the server. The electronic device receives a translation result of the server for each of the plurality of pictures. The electronic device generates a part of the translation result of the second content from translation results of some of the plurality of pictures, or generates the translation result of the second content from translation results of all of the plurality of pictures.

It should be understood that for a process from performing segmentation to obtaining the translation result, refer to the method 1100. For brevity, details are not described herein again.

In an embodiment, the second operation includes tapping, by the user, a first control that can trigger a further translation function or entering, by the user, a voice instruction that can trigger a further translation function.

In an embodiment, the method further includes: The electronic device displays a fourth user interface after receiving a sliding operation of the user in the third user interface, where the fourth user interface includes a subsequent translation result associated with the translation result included in the third user interface.

In an embodiment, before the detecting a first operation of a user in the first user interface, the method further includes: The electronic device displays, in the first user interface, a control that can trigger full-screen translation.

In an embodiment, before the detecting a second operation of the user in the second user interface, the method further includes: The electronic device displays, in the second user interface, a control that can trigger further translation.

In an embodiment, the detecting a first operation of a user in the first user interface includes: The electronic device displays a plurality of function controls after detecting a multi-finger pressing operation of the user in the first user interface, where the plurality of function controls include a first control that can trigger full-screen translation; and detects that the user taps the first control or the user enters a voice instruction that can trigger a full-screen translation function.

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again. The embodiments may be mutually referenced and combined.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the current technology, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
 a touchscreen; and
 one or more processors coupled to the touchscreen and configured to cause the electronic device to:
  display a first user interface on the touchscreen, wherein the first user interface comprises first content, and wherein a language of the first content is a first language;
  detect a first operation of a user on the first user interface, wherein the first operation comprises triggering full-screen translation;
  in response to the first operation:
   obtain a first picture corresponding to a screenshot of the first user interface;
   obtain a first translation result of the first content based on the first picture, wherein a language of the first translation result is a second language; and
   display a second user interface, wherein the second user interface comprises a part or all of the first translation result;
  detect a second operation of the user on the second user interface, wherein the second operation comprises triggering scrolling translation and is different than the first operation;
  in response to the second operation:
   display a third user interface that comprises second content, wherein a language of the second content is the first language;
   taking a scrolling screenshot starting from a first location of the third user interface, wherein the first location is associated with the first picture, the first content, or the first user interface;

stop taking, when detecting a third operation of the user on a fourth user interface or when a first end location is reached through scrolling on the fourth user interface, the scrolling screenshot at a second location of the fourth user interface to obtain a second picture, wherein the second picture corresponds to third content from the first location to the second location, and wherein a language of the third content is the first language;

obtain a second translation result of the third content based on the second picture, wherein a language of the second translation result is the second language; and display a fifth user interface after a part or all of the second translation result is obtained, wherein the fifth user interface comprises a part or all of the second translation result.

2. The electronic device of claim 1, wherein the first location is related to a specific location in the first picture, and wherein the specific location is:
a second end location, an intermediate location, or a predetermined-proportion location of the first picture; or
a start location of a last paragraph in the first picture or a start location of last n lines in the first picture, wherein n is a positive integer, and wherein n is greater than or equal to 1.

3. The electronic device of claim 1, wherein the one or more processors are further configured to cause the electronic device to:
segment the second picture into a plurality of pictures before the second translation result is obtained;
send the plurality of pictures to a server;
receive, from the server, translation results of the plurality of pictures; and
generate a part of the second translation result from some of the translation results of the plurality of pictures or generate the second translation result from all of the translation results of the plurality of pictures.

4. The electronic device of claim 1, wherein the one or more processors are further configured to cause the electronic device to:
display first prompt information at or near the first location, wherein the first prompt information indicates a start location of scrolling screenshot taking to the user; or
display second prompt information at a second end location of the first picture, wherein the second prompt information indicates that previous reading is stopped at the second end location.

5. The electronic device of claim 1, wherein the one or more processors are further configured to cause the electronic device to:
display a plurality of function controls in response to a multi-finger pressing operation of the user on the first user interface, wherein the plurality of function controls comprise a first control that can trigger full-screen translation; and
detect that the user taps the first control or the user enters a voice instruction that can trigger a full-screen translation function.

6. The electronic device of claim 1, wherein after displaying the fifth user interface, the one or more processors are further configured to cause the electronic device to:

in response to an operation on the fifth user interface:
select a third language; and
display, in the fifth user interface, a third translation result of the third content from the first language to the third language.

7. An electronic device, comprising:
a touchscreen;
one or more processors coupled to the touchscreen and configured to cause the electronic device to:
detect a first operation of a user on the first user interface, wherein the first operation comprises triggering full-screen translation;
display a first user interface on the touchscreen, wherein the first user interface comprises first content, and wherein a language of the first content is a first language;
detect a second operation of a user on the first user interface, wherein the second operation comprises triggering scrolling translation and is different than the first operation;
in response to the second operation, take a first scrolling screenshot starting from a first location of the first user interface;
stop taking, when detecting a third operation of the user on a second user interface or when a first end location is reached through scrolling on the second user interface, the first scrolling screenshot at a second location of the second user interface to obtain a first picture, wherein the first picture is a picture corresponding to second content from the first location to the second location, and wherein a language of the second content is the first language;
obtain a first translation result of the second content based on the first picture, wherein a language of the first translation result is a second language; and
display a third user interface after a part or all of the first translation result is obtained, wherein the third user interface comprises a part or all of the first translation result.

8. The electronic device of claim 7, wherein the one or more processors are further configured to cause the electronic device to:
detect a fourth operation of a user on a fourth user interface that comprises an end part of the first translation result, and wherein the fourth operation comprises triggering scrolling translation;
in response to the fourth operation:
display a fifth user interface that comprises third content, wherein a language of the third content is the first language; and
take a second scrolling screenshot starting from a third location of the fifth user interface, wherein the third location is associated with the first picture, the second location, the second content, or the second user interface;
stop taking, when detecting a fifth operation of the user on a sixth user interface or when a second end location is reached through scrolling, the second scrolling screenshot at a fourth location of the sixth user interface to obtain a second picture, wherein the second picture corresponds to fourth content from the third location to the fourth location, and wherein a language of the fourth content is the first language;
obtain a second translation result of the fourth content based on the second picture, wherein a language of the second translation result is the second language; and display a seventh user interface after a part or all of the second translation result is obtained, wherein the seventh user interface comprises a part or all of the second translation result.

9. The electronic device of claim 8, wherein the one or more processors are further configured to cause the electronic device to segment the first picture into a plurality of pictures before the first translation result is obtained, and wherein the third location is related to a specific location in a last picture in the plurality of pictures, and wherein the specific location is:
- a start location, a second end location, an intermediate location, or a predetermined-proportion location of the last picture; or
- a start location of a last paragraph in the last picture or a start location of last n lines in the last picture, wherein n is a positive integer, and wherein n is greater than or equal to 1.

10. The electronic device of claim 8, wherein the one or more processors are further configured to cause the electronic device to:
- display first prompt information at or near the third location, wherein the first prompt information indicates a start location of scrolling screenshot taking to the user; or
- display second prompt information at or near the second location, wherein the second prompt information indicates that previous reading is stopped at the second location.

11. The electronic device of claim 7, wherein the one or more processors are further configured to cause the electronic device to:
- detect a fourth operation of a user on a fifth user interface that comprises an end part of the first translation result, and wherein the fourth operation comprises triggering further translation;
- obtain a second translation result of third content in response to the fourth operation, wherein the third content comprises a part or all of content other than the second content in all content corresponding to the first language, and wherein a language of the second translation result is the second language; and
- display a sixth user interface after a part or all of the second translation result is obtained or display the sixth user interface after a sliding operation of the user is received, wherein the sixth user interface comprises a part or all of the second translation result.

12. The electronic device of claim 7, wherein the one or more processors are further configured to cause the electronic device to:
- segment the first picture into a plurality of pictures before the first translation result is obtained;
- send the plurality of pictures to a server;
- receive, from the server, translation results of the plurality of pictures; and
- generate a part of the first translation result from some of the translation results of the plurality of pictures or generate the first translation result from all of the translation results of the plurality of pictures.

13. The electronic device of claim 7, wherein after displaying a fifth user interface, the one or more processors are further configured to cause the electronic device to:
- in response to an operation on the third user interface:
  - select a third language; and
  - display a second translation result of third content from the first language to the third language in the third user interface.

14. A method, comprising:
- displaying a first user interface on a touchscreen, wherein the first user interface comprises first content, and wherein a language of the first content is a first language;
- detecting a first operation of a user on the first user interface, wherein the first operation comprises triggering full-screen translation;
- in response to the first operation:
  - obtaining a first picture corresponding to a screenshot of the first user interface;
  - obtaining a first translation result of the first content based on the first picture, wherein a language of the first translation result is a second language; and
  - displaying a second user interface, wherein the second user interface comprises a part or all of the first translation result;
- detecting a second operation of the user on the second user interface, wherein the second operation comprises triggering scrolling translation and is different than the first operation;
- in response to the second operation:
  - displaying a third user interface that comprises second content, wherein a language of the second content is the first language;
  - taking a scrolling screenshot starting from a first location of the third user interface, wherein the first location is associated with the first picture, the first content, or the first user interface;
- stop taking, when detecting a third operation of the user on a fourth user interface or when an end location is reached through scrolling on the fourth user interface, the scrolling screenshot at a second location of the fourth user interface to obtain a second picture, wherein the second picture corresponds to third content from the first location to the second location, and wherein a language of the third content is the first language;
- obtaining a second translation result of the third content based on the second picture, wherein a language of the second translation result is the second language; and
- displaying a fifth user interface after a part or all of the second translation result is obtained, wherein the fifth user interface comprises a part or all of the second translation result.

15. The method of claim 14, further comprising:
- segmenting the second picture into a plurality of pictures;
- sending the plurality of pictures to a server;
- receiving, from the server, translation results of the plurality of pictures; and
- generating a part of the second translation result from some of the translation results of the plurality of pictures.

16. The method of claim 14, further comprising:
- segmenting the second picture into a plurality of pictures;
- sending the plurality of pictures to a server;
- receiving, from the server, translation results of the plurality of pictures; and
- generating the second translation result from all of the translation results of the plurality of pictures.

17. The method of claim 14, further comprising:
- displaying a plurality of function controls in response to a multi-finger pressing operation of the user on the first user interface, wherein the plurality of function controls comprises a first control that can trigger full-screen translation; and detecting that the user taps the first control or the user enters a voice instruction that can trigger a full-screen translation function.

18. The method of claim 14, wherein after displaying a fifth user interface, the method further comprises:
    in response to an operation on the third user interface:
       selecting a third language; and
       displaying a third translation result of third content from the first language to the third language in the third user interface.

19. The method of claim 14, further comprising displaying the third user interface after a part or all of the second translation result is obtained.

20. The method of claim 14, further comprising displaying the third user interface after a sliding operation is received.

* * * * *